US010311983B2

(12) United States Patent
Cheatham, III et al.

(10) Patent No.: US 10,311,983 B2
(45) Date of Patent: Jun. 4, 2019

(54) AUTOMATIC HYDROPNEUMATIC ACTUATION DEVICE

(71) Applicant: TerraPower, LLC, Bellevue, WA (US)

(72) Inventors: Jesse R. Cheatham, III, Seattle, WA (US); Robert A. Corbin, North Bend, WA (US); Pavel Hejzlar, Kirkland, WA (US); Christopher J. Johns, Tacoma, WA (US); Jon D. McWhirter, Kirkland, WA (US); Jason Brian Meng, Redmond, WA (US); P. Harley Park, Bellevue, WA (US); Robert C. Petroski, Seattle, WA (US)

(73) Assignee: TerraPower, LLC, Bellevue, WA (US)

( * ) Notice: Subject to any disclaimer, the term of this patent is extended or adjusted under 35 U.S.C. 154(b) by 691 days.

(21) Appl. No.: 14/985,977

(22) Filed: Dec. 31, 2015

(65) Prior Publication Data

US 2016/0189808 A1 Jun. 30, 2016

Related U.S. Application Data

(60) Provisional application No. 62/098,943, filed on Dec. 31, 2014.

(51) Int. Cl.
*G21C 7/16* (2006.01)
*G21C 7/32* (2006.01)
(Continued)

(52) U.S. Cl.
CPC ................ *G21C 7/32* (2013.01); *G21C 7/12* (2013.01); *G21C 7/16* (2013.01); *G21C 15/243* (2013.01);
(Continued)

(58) Field of Classification Search
CPC ............ F15B 2211/42; F15B 2211/421; F15B 2211/428; G21C 7/16; G21C 7/14; G21C 7/08; G21C 7/12; F16K 1/12; F16K 1/126
(Continued)

(56) References Cited

U.S. PATENT DOCUMENTS 2,937,984 A 5/1960 Chapellier
3,347,748 A * 10/1967 Olsson .................... G21C 7/16 376/230

(Continued)

FOREIGN PATENT DOCUMENTS

DE 1169596 B 5/1964
DE 3342838 A1 6/1964
DE 1246135 B 8/1967

OTHER PUBLICATIONS

International Search Report and Written Opinion for PCT Patent Application No. PCT/US2015/068285, dated May 9, 2016, 14 pages.

*Primary Examiner* — F Daniel Lopez
*Assistant Examiner* — Dustin T Nguyen
(74) *Attorney, Agent, or Firm* — Holzer Patel Drennan

(57) ABSTRACT

A control assembly for a nuclear reactor having a pump includes a duct having an inner volume and defining a coolant flow path, a plug fixed to the duct, a rod disposed within the inner volume and having a rod end that is configured to engage a neutron modifying material, a first piston disposed within the inner volume, slidably coupled to the duct, and coupled to the rod, and a biasing member coupled to the rod and the first piston. The biasing member is positioned to apply a biasing force that repositions the first piston, the rod, and the neutron modifying material in response to a loss of pump flow without scram condition.

53 Claims, 51 Drawing Sheets

(51) Int. Cl.

| | |
|---|---|
| ***G21C 21/18*** | (2006.01) |
| ***G21C 15/243*** | (2006.01) |
| ***G21C 7/12*** | (2006.01) |
| *G21C 7/20* | (2006.01) |
| *G21C 9/027* | (2006.01) |

(52) U.S. Cl.
CPC ............... *G21C 21/18* (2013.01); *G21C 7/20* (2013.01); *G21C 9/027* (2013.01); *Y02E 30/39* (2013.01)

(58) Field of Classification Search
USPC ................ 92/110, 143, 181 R, 181 P, 15, 26
See application file for complete search history.

(56) References Cited

U.S. PATENT DOCUMENTS

| | | | | |
|---|---|---|---|---|
| 3,855,049 | A | 12/1974 | Groves et al. | |
| 5,089,211 | A * | 2/1992 | Dillmann ................ | G21C 7/12 376/228 |
| 5,217,677 | A * | 6/1993 | Oosterkamp ............ | G21C 7/12 376/233 |
| 5,778,034 | A * | 7/1998 | Tani ......................... | G21C 7/16 376/230 |
| 2016/0051906 | A1 * | 2/2016 | Dembeck ........... | B01D 19/0063 137/1 |

* cited by examiner

AUTOMATIC HYDROPNEUMATIC ACTUATION DEVICE

CROSS-REFERENCE TO RELATED APPLICATIONS

This application claims priority and benefit under 35 U.S.C. § 119 to U.S. application Ser. No. 62/098,943, entitled "Automatic Hydropneumatic Actuation Device," filed on Dec. 31, 2014, and incorporated herein by reference in its entirety.

BACKGROUND

Light water nuclear fission reactors employ neutron absorbing materials to control the reactivity within the reactor core. The temperature within the reactor core may increase due to a loss of coolant flow. The coolant flow may be provided by a pump, and the loss of coolant flow may occur due to a pump shutting down (e.g., due to a loss of power thereto, due to mechanical failure, etc.). A loss of pump flow may be difficult for the nuclear reactor to control without component damage. Reactor designs that rely on the temperature increase of the coolant (i.e., a thermal feedback, etc.) to insert negative reactivity may be subject to a significant time delay between the temperature increase and the corresponding negative reactivity response.

BRIEF SUMMARY

Disclosed embodiments include a control assembly for a nuclear reactor having a pump, a nuclear reactor, a method of manufacturing a control assembly for a nuclear reactor, and a method of operating a nuclear fission reactor having a reactor core.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
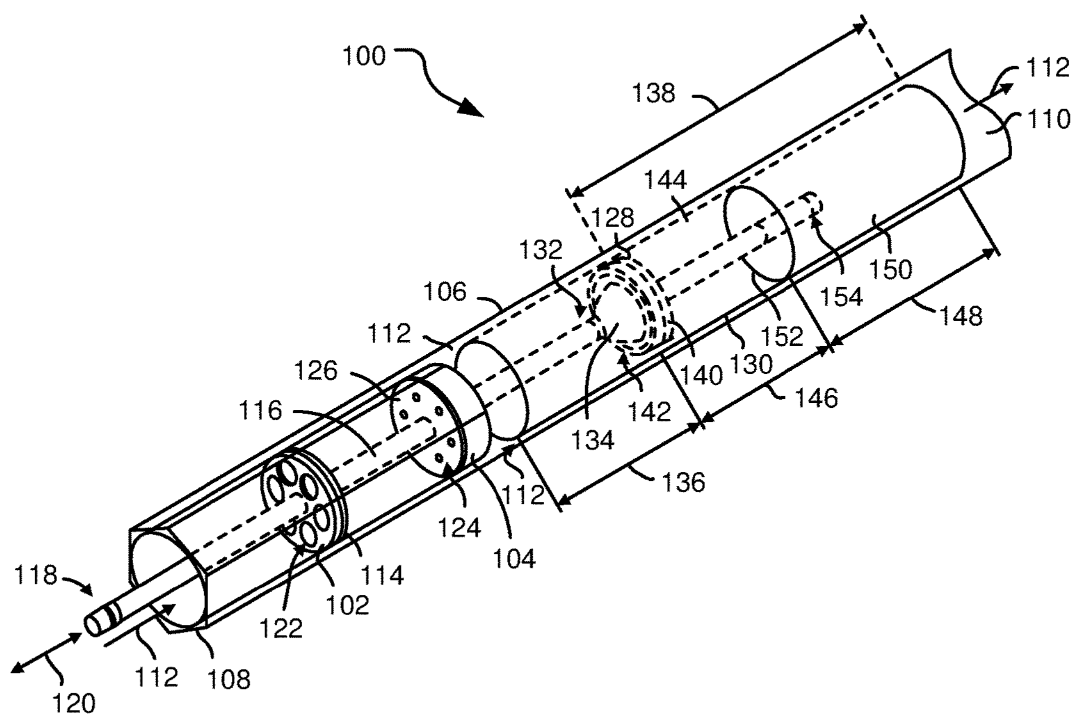
FIG. 1 is a perspective view of a hydropneumatic actuator 100, according to one embodiment.
Figure 2:
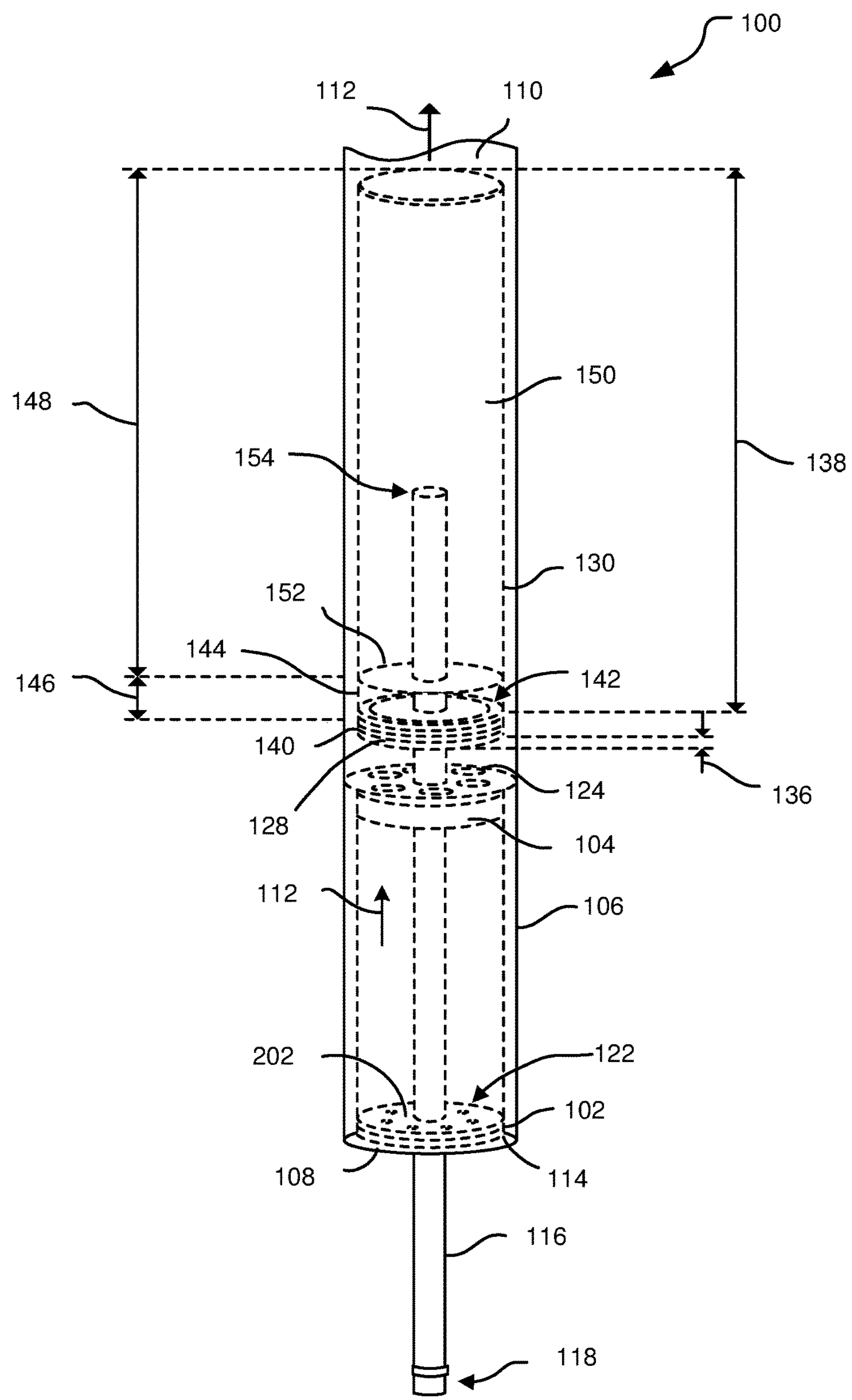
FIG. 2 is a perspective view of a hydropneumatic actuator 100, according to one embodiment.
Figure 3:
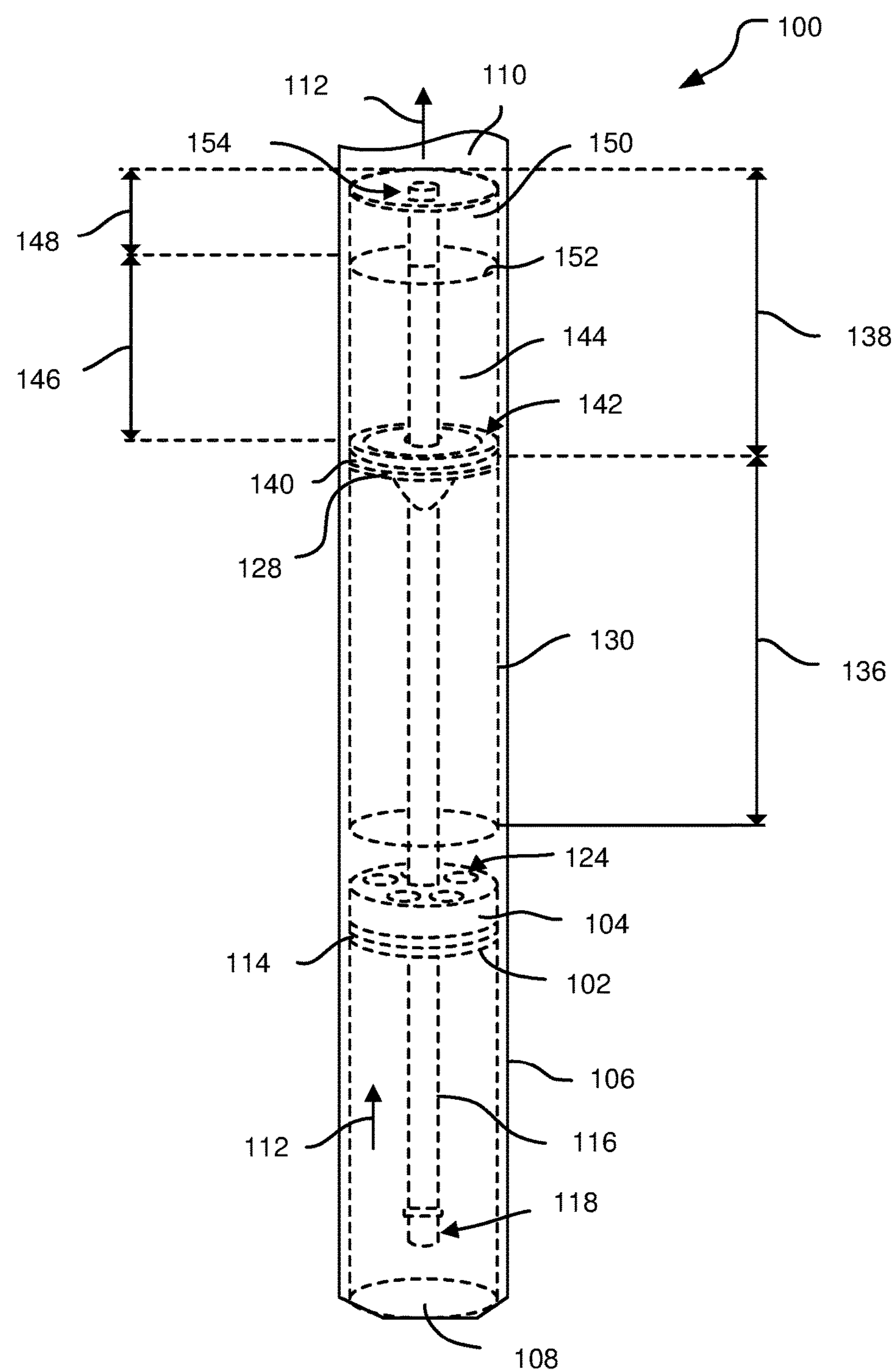
FIG. 3 is a perspective view of a hydropneumatic actuator 100, according to one embodiment.

In the following detailed description, reference is made to the accompanying drawings, which form a part hereof. In the drawings, the use of similar or the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Given by way of overview, illustrative embodiments include: a control assembly for a nuclear reactor having a pump, a nuclear reactor, a method of manufacturing a control assembly for a nuclear reactor, and a method of operating a nuclear fission reactor having a reactor core.

Embodiments of this new hydropneumatic actuator provide a rapid, passive (e.g., without electronic control, etc.) response to an undesirable loss of fluid (e.g., a loss of flow, a loss of pressure) condition (e.g., due to a pump or other fluid flow device shutting down, leak in the system, etc.). The hydropneumatic actuator directly reacts to the loss of flow rather than reacting directly to applied higher pressures or reacting indirectly (and in a delayed manner) to an input such as a sensor sensing the desired (or undesired condition) and sending a signal through a controller to actuate the actuator or waiting for a material property to physically react to a thermal condition such as in the thermally-responsive actuator. Accordingly, the hydropneumatic actuator provides a mechanical motion directly in response to loss of fluid condition (e.g., flow, pressure, etc.). By way of example, the hydropneumatic actuator may be provided as part of a control assembly for a nuclear reactor having a pump, the hydropneumatic actuator providing a rapid, passive response to an undesirable loss of flow without scram event. In one embodiment, the nuclear reactor is a large fast spectrum, sodium-cooled reactor. The loss of flow without scram event may be particularly difficult for such reactors to endure due to the rapid rise in temperature that occurs.

Embodiments of the hydropneumatic actuator respond to pump flow within the cooling system of the nuclear reactor to fully withdraw a neutron modifying material when the pump flow reaches a minimum flow rate and then rapidly insert the neutron modifying material upon loss of flow below a firing condition flow rate. The hydropneumatic actuator may thereby rapidly insert negative reactivity to avoid adverse temperature effects (e.g., sodium boiling, etc.) when a loss of flow occurs without triggering a scram (e.g., in response to a loss of pump flow without scram condition, etc.).

In other embodiments the hydropneumatic actuator responds to insert a neutron modifying material when the pump flow reaches a reduced flow rate and then rapidly withdraws the neutron modifying material upon loss of flow. The hydropneumatic actuator may thereby rapidly remove positive reactivity to avoid adverse temperature effects when loss of flow occurs without triggering a scram. In some embodiments the neutron modifying material includes a fissionable material. In some embodiments the neutron modifying material includes an absorber and a fissionable material.

Figure 44:
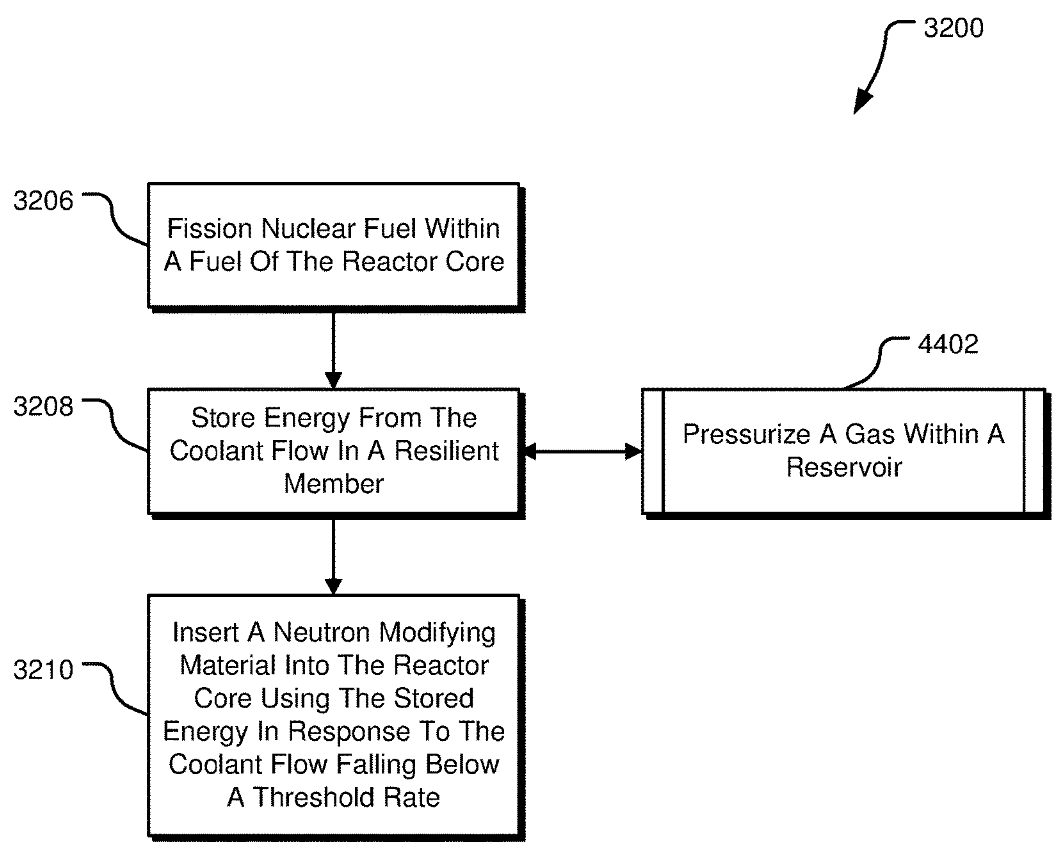
FIG. 44 is schematic diagram of a method 3200 of operating a nuclear fission reactor having a reactor core, according to one embodiment.
Figure 45:
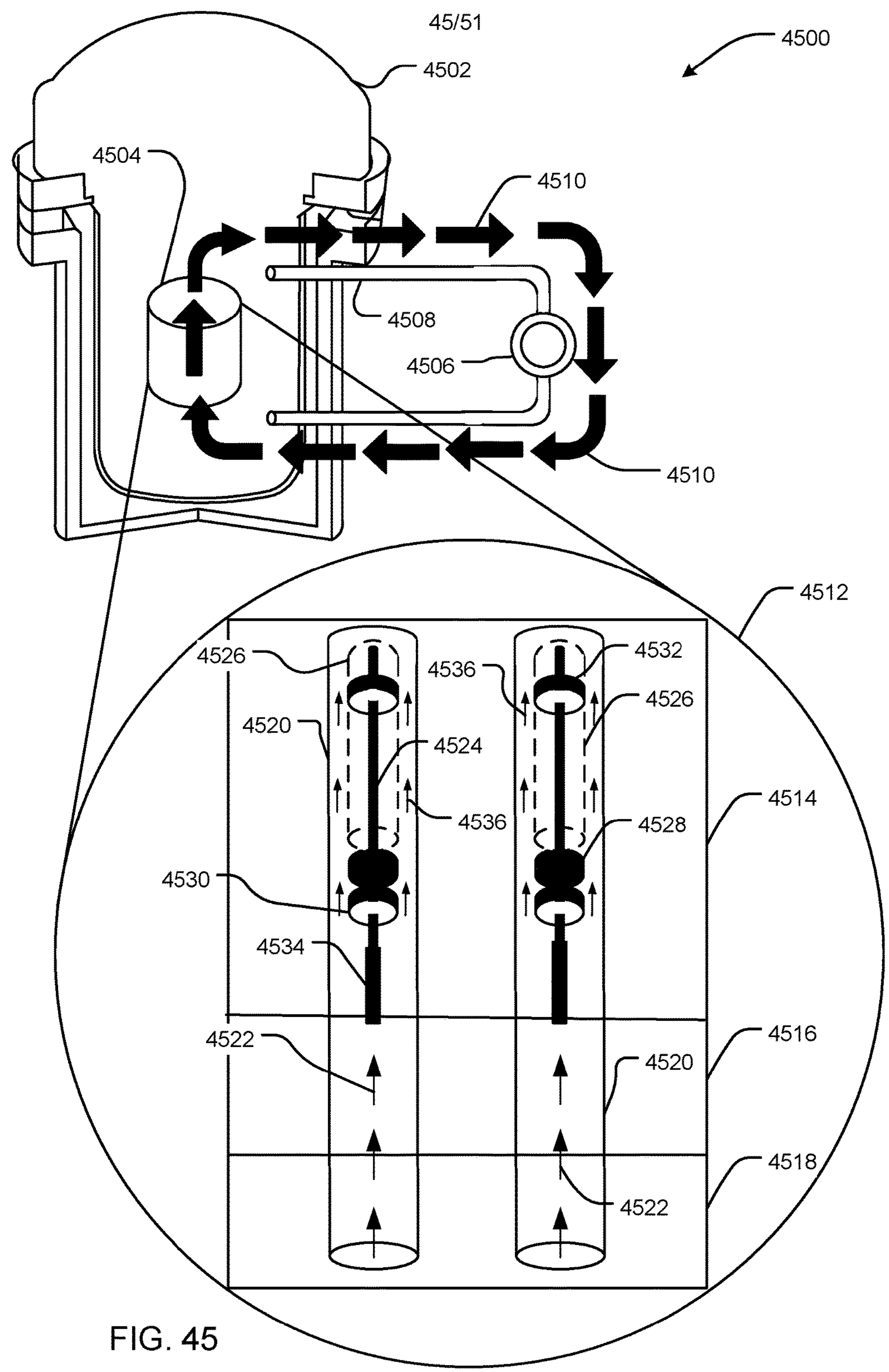
FIG. 45 is a schematic diagram of a nuclear reaction including hydropneumatic actuators with control rods.

A description of FIGS. 45-51 is provided before FIGS. 1-44 in order to provide an introduction and context to the disclosure contained herein. The subsequent description of FIGS. 1-44 provides additional details of the present implementations. FIG. 45 illustrates an apparatus 4500 including a nuclear reactor 4502 with a reactor core 4504. Nuclear reactor 4502 further includes a fluid pump 4506 configured to pump a fluid through fluid flow path 4508. The fluid may include without limitation a compressible fluid or a coolant fluid. The fluid pressure in fluid flow path 4508 is indicated by fluid pressure indicators 4510. In FIG. 45, fluid pressure indicators 4510 represent a high fluid flow pressure. In an implementation, high fluid flow pressure 4510 corresponds to normal operation of pump 4506, such as when nuclear reactor 4502 is undergoing normal operation.

Expanded view 4512 illustrates the interior of reactor core 4504 and is divided into three regions: a control assembly region 4514, a fuel region 4516, and a lower region 4518. In an implementation, fuel region 4516 contains at least some nuclear fissile material capable of sustaining a nuclear fission reaction. Regions 4514, 4516, and 4518 are not necessarily drawn to scale in FIGS. 45-50, and may be relatively larger or smaller with respect to each other than the scale depicted herein. Expanded view 4512 depicts two ducts 4520 with similar or identical structures contained therein as described in more detail below. Housings 4520 are merely illustrative, and core 4504 may have any number of ducts 4520, including ducts 4520 that contain the same or different components with respect to each other. Further, in FIGS. 45-50, like elements are referred to with the same numerals where convenient, but not all like elements are labeled in FIGS. 45-50 to enhance clarity and readability.

Ducts 4520 are in fluid communication with fluid flow path 4508. In an implementation, fluid flowing from pump 4506 may enter ducts 4520 from the bottom as indicated by fluid flow arrows 4522. In an implementation, fluid flow arrows 4522 indicate a fluid pressure consistent with normal operation of pump 4506. Ducts 4520 contain a cup 4526 disposed therein with an open end oriented toward the fluid flow 4522 and an opposing closed end. Disposed within the cup 4526 is a member 4524 slidably moveable along the axis of fluid flow 4522 and through a plug 4528. In implementations, member 4524 further includes a first piston 4530 disposed below plug 4528 and a second piston 4532 disposed within, and slideably coupled to, cup 4526. In an implementation, member 4524 includes a neutron modifying material, such as a neutron absorption bundle 4534 on its distal end. In an implementation, a loading assembly includes cup 4526, plug 4528, and first piston 4530. As explained in more detail below, when fluid flow 4522 increases to satisfy a loading condition (e.g., a minimum flow rate or flow pressure), the fluid passes through plug 4528 and first piston 4530 to force member 4524 in a loaded position shown in FIG. 45. As fluid flow 4522 increases, compressed fluid, and therefore energy, is stored in a firing assembly, which cooperates with the loading assembly. In an implementation, fluid flow 4536 passes between cup 4526 and inner wall of duct 4520 to return to fluid flow path 4508 and into pump 4506 when the member is in the loaded position shown in FIG. 45.

Figure 46:
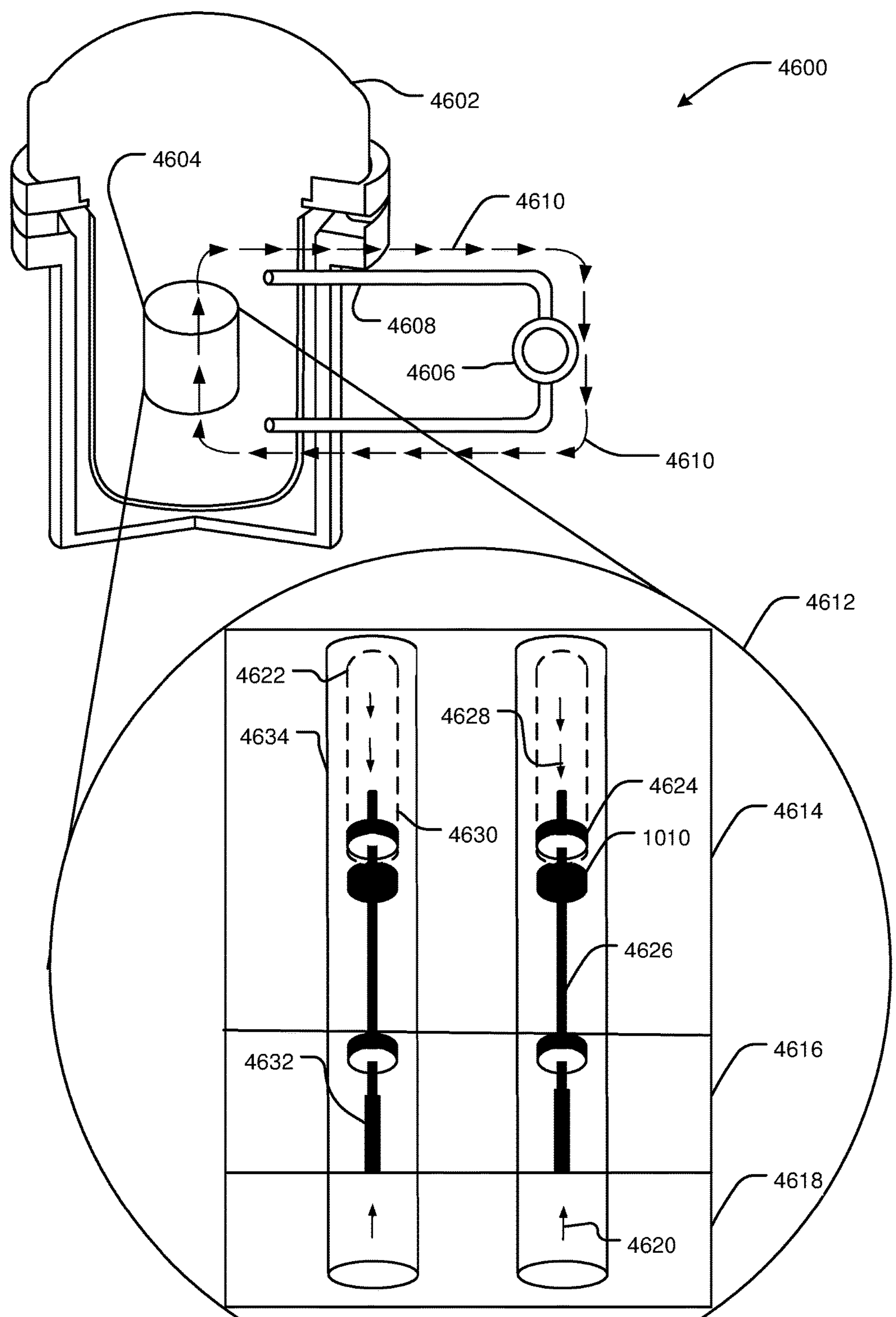
FIG. 46 is a schematic diagram of a nuclear reaction including hydropneumatic actuators with control rods.

FIG. 46 illustrates an apparatus 4600 including a nuclear reactor 4602 with a reactor core 4604. Nuclear reactor 4602 further includes a fluid pump 4606 configured to pump a fluid through fluid flow path 4608. The fluid may include without limitation a compressible fluid or a coolant fluid. The fluid pressure in fluid flow path 4608 is indicated by fluid pressure indicators 4610. In FIG. 46, fluid pressure indicators 4610 represent a reduced fluid flow pressure. In an implementation, reduced fluid flow pressure 4610 corresponds to impaired or diminished operation of pump 4606, such as when nuclear reactor 4602 is not undergoing normal operation.

Expanded view 4612 illustrates the interior of reactor core 4604 and is divided into three regions: a control assembly region 4614, a fuel region 4616, and a lower region 4618. In an implementation, a firing assembly includes second piston 4624 and cup 4622. In FIG. 46, reduced fluid flow 4620 satisfies a firing condition for the firing assembly such that member 4626 is forced downward out of the loaded position by the expansion of fluid 4628 against cup 4630. The firing condition may be satisfied by any fluid pressure in duct 4634 below a predetermined amount. When member 4626 is fired out of the loaded position, neutron modifying materials 4632 are forced downward by the release of stored energy into fuel region 4616. In some implementations, neutron modifying materials 4632 are neutron absorption bundles.

Figure 47:
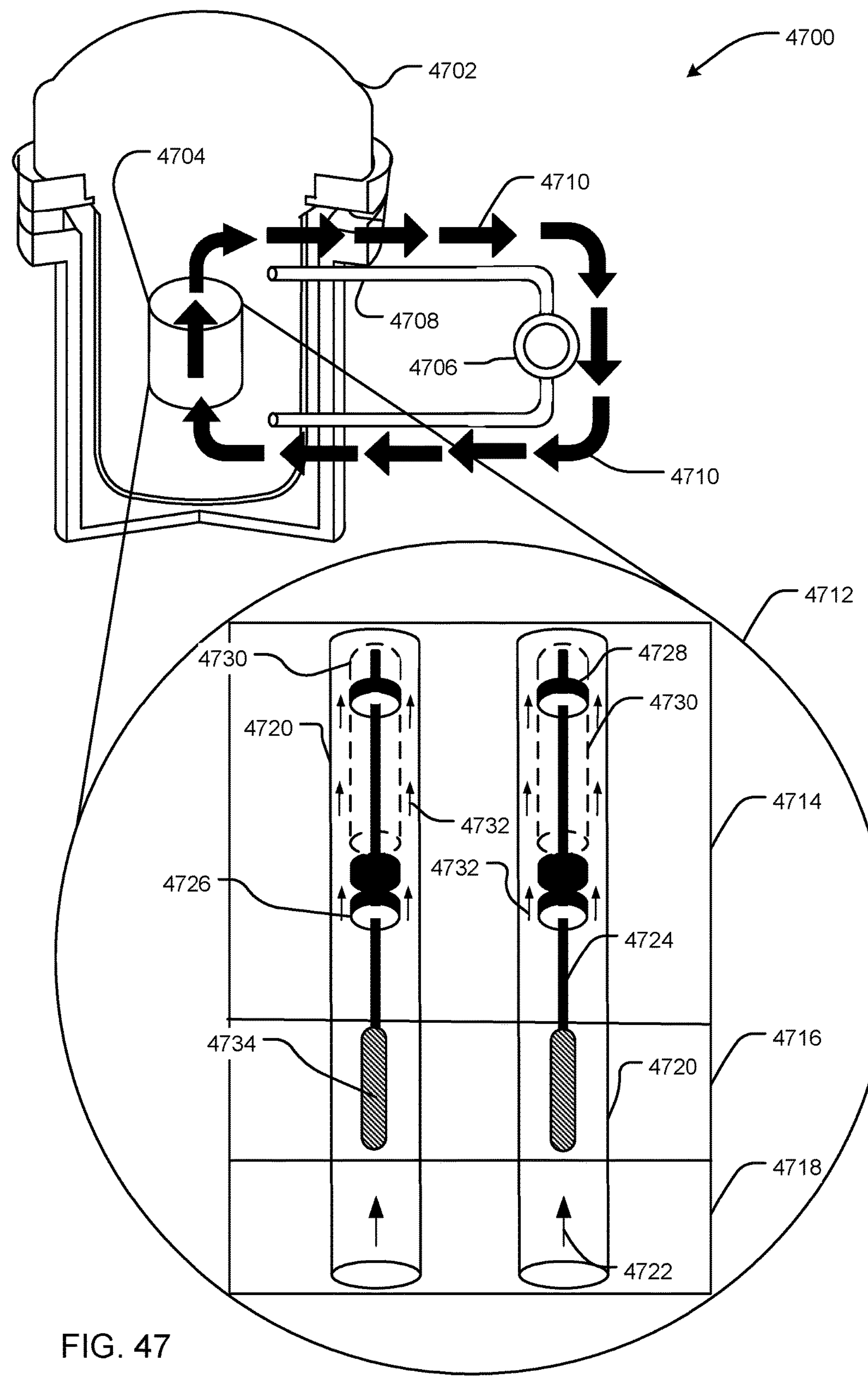
FIG. 47 is a schematic diagram of a nuclear reaction including hydropneumatic actuators with fuel rods.

FIG. 47 illustrates an apparatus 4700 including a nuclear reactor 4702 with a reactor core 4704. Nuclear reactor 4702 further includes a fluid pump 4706 configured to pump a fluid through fluid flow path 4708. The fluid pressure in fluid flow path 4708 is indicated by fluid pressure indicators 4710. In FIG. 47, fluid pressure indicators 4710 represent a high fluid flow pressure. In an implementation, high fluid flow pressure 4710 corresponds to normal operation of pump 4706, such as when nuclear reactor 4702 is undergoing normal operation.

Expanded view 4712 illustrates the interior of reactor core 4704 and is divided into three regions: a control assembly region 4714, a fuel region 4716, and a lower region 4718. FIG. 47 depicts ducts 4720 in fluid communication with fluid flow path 4708 and accepting fluid flow 4722. FIG. 47 depicts member 4724 coupled to first piston 4726 and second piston 4728 disposed within cup 4730 in a loaded position due to the pressure of fluid flow 4722. In the loaded position, the loading assembly stores energy from compressed fluid in cup 4730 and is held in the loaded position due to the force of fluid flow 4722 on at least first piston 4726 as explained in more detail below. In the loaded position, fluid flow 4732 continues to flow around cup 4730 and back into fluid flow path 4708 and into pump 4706. In an implementation, fuel material 4734 is attached to the distal end of member 4724, and disposed within fuel region 4716 when the assembly is in the loaded position.

Figure 48:
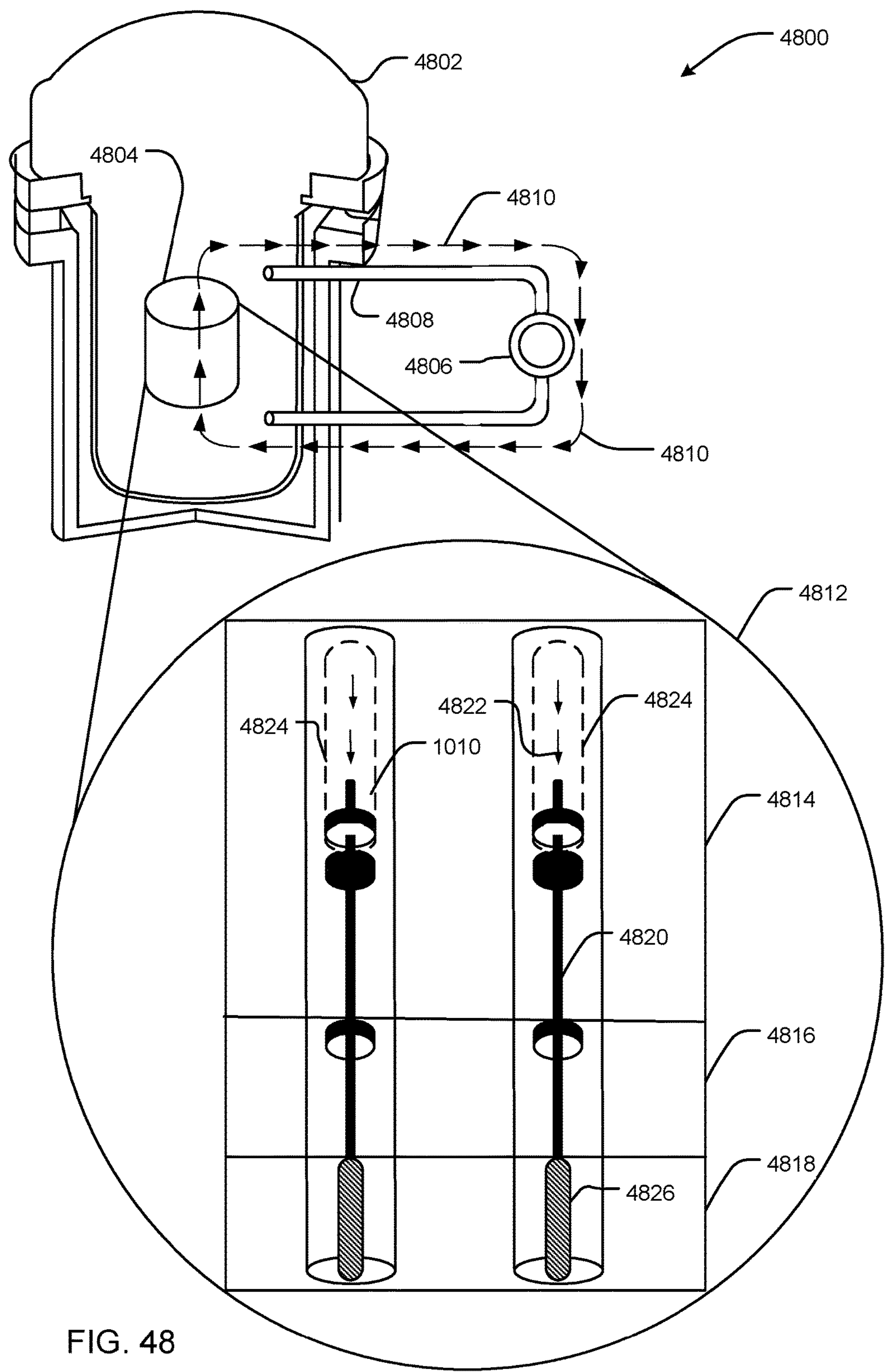
FIG. 48 is a schematic diagram of a nuclear reaction including hydropneumatic actuators with fuel rods.

FIG. 48 illustrates an apparatus 4800 including a nuclear reactor 4802 with a reactor core 4804. Nuclear reactor 4802 further includes a fluid pump 4806 configured to pump a fluid through fluid flow path 4808. The fluid pressure in fluid flow path 4808 is indicated by fluid pressure indicators 4810. In FIG. 48, fluid pressure indicators 4810 represent a reduced fluid flow pressure. In an implementation, reduced fluid flow pressure 4810 corresponds to impaired or diminished operation of pump 4806, such as when nuclear reactor 4802 is not undergoing normal operation.

Expanded view 4812 illustrates the interior of reactor core 4804 and is divided into three regions: a control assembly region 4814, a fuel region 4816, and a lower region 4818. In FIG. 48, reduced fluid flow (not shown in expanded view 4812) satisfies a firing condition for the firing assembly such that member 4820 is forced downward out of the loaded position by the expansion of fluid 4822 against cup 4824. In an implementation, the action of the firing assembly forces fuel material 4826 at the distal end of member 4820 out of fuel region 4816 and into lower region 4818.

Figure 49:
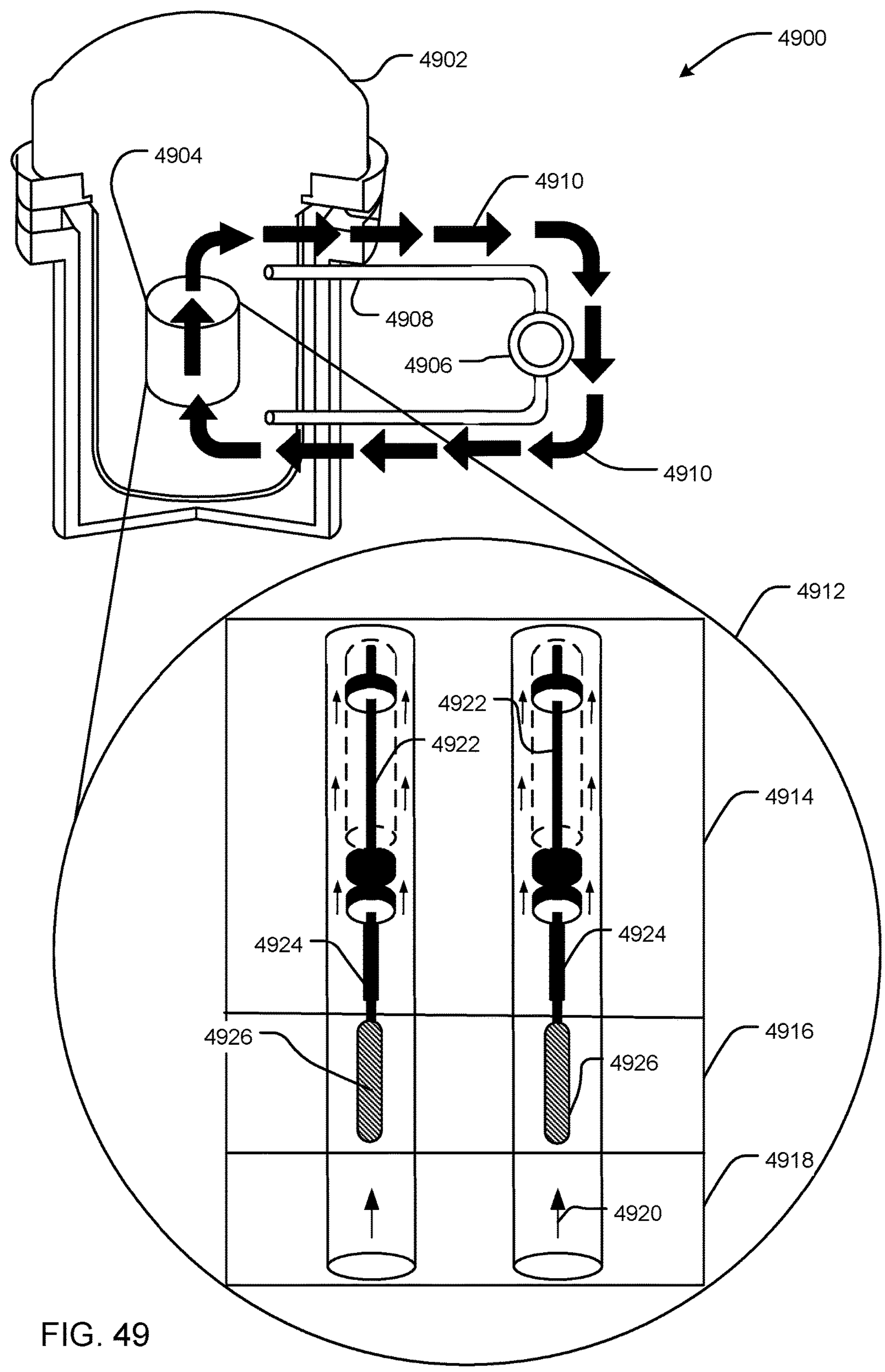
FIG. 49 is a schematic diagram of a nuclear reaction including hydropneumatic actuators with control and fuel rods.

FIG. 49 illustrates an apparatus 4900 including a nuclear reactor 4902 with a reactor core 4904. Nuclear reactor 4902 further includes a fluid pump 4906 configured to pump a fluid through fluid flow path 4908. In FIG. 49, fluid pressure indicators 4910 represent high fluid flow pressure. In an implementation, high fluid flow pressure 4910 corresponds to normal operation of pump 4906, such as when nuclear reactor 4902 is undergoing normal operation.

Expanded view 4912 illustrates the interior of reactor core 4902 and is divided into three regions: a control assembly region 4914, a fuel region 4916, and a lower region 4918. FIG. 49 depicts the assembly in the loaded position with energy stored by the firing assembly due to the pressure of fluid flow 4920. Member 4922 has attached to its distal end fuel material 4926 disposed in fuel region 4916 when the member is in the loaded position. Control material 4924 is also attached to member 4922, and is disposed above fuel material 4926 in control assembly region 4914 when the member is in the loaded position.

Figure 50:
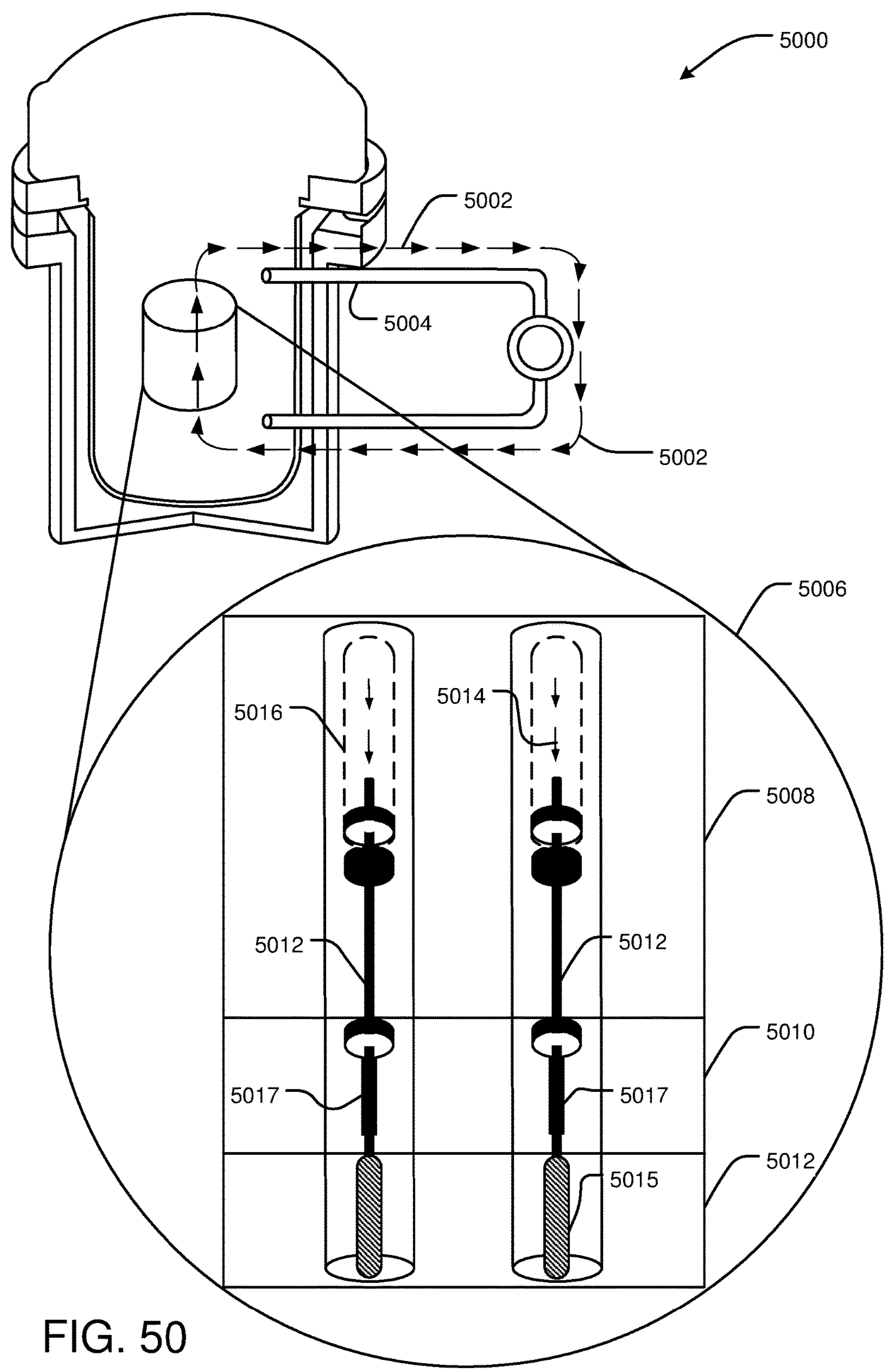
FIG. 50 is a schematic diagram of a nuclear reaction including hydropneumatic actuators with control and fuel rods.

FIG. 50 illustrates an apparatus 5000 with reduced flow 5002 through fluid flow path 5004. Expanded view 5006 illustrates the interior of the reactor core, and is divided into three regions: a control assembly region 5008, a fuel region 5010, and a lower region 5012. Reduced fluid flow 5002 satisfies a firing condition for the firing assembly such that member 5012 is forced downward out of the loaded position by the expansion of fluid 5014 against cup 5016. In an implementation, the action of the firing assembly forces fuel material 5015 out of fuel region 5010 and into lower region 5012, and forces control material 5017 out of control region 5008 and into fuel region 5010.

Figure 51:
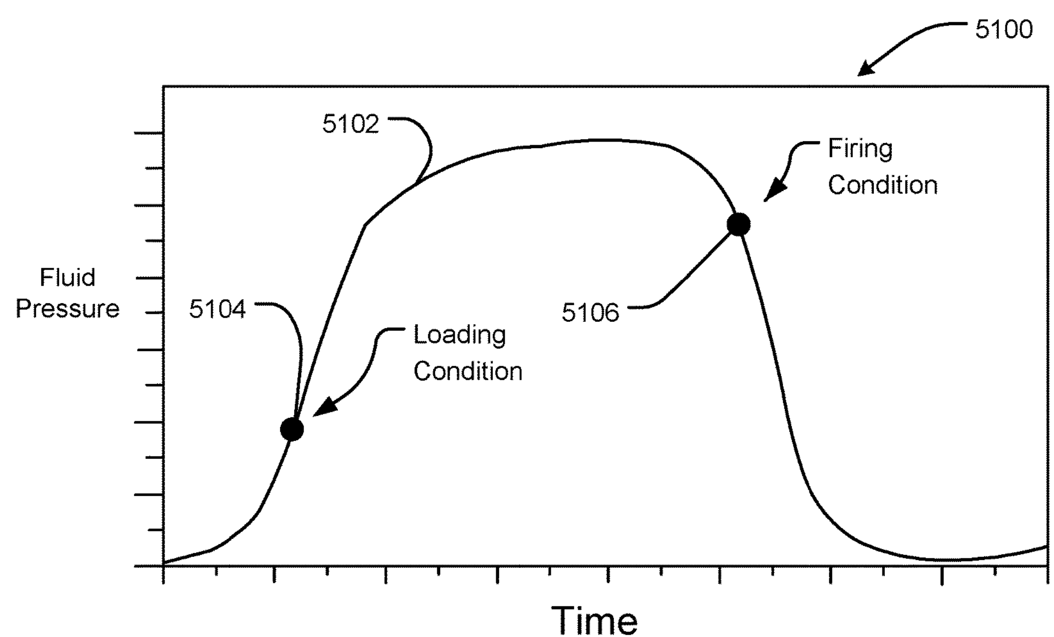
FIG. 51 is a plot of fluid pressure against time illustrating a loading condition and a firing condition.

FIG. 51 is a plot 5100 of fluid pressure 5102 against time according to one implementation. As fluid pressure rises to point 5104, a loading condition is satisfied, thus moving the apparatus into the loading position. As fluid pressure continues to climb past point 5104, the loading assembly continues to accumulate stored energy as fluid pressure increases against the cup. Further on, as fluid pressure begins to drop, a firing condition is satisfied at point 5106. Once the firing condition has been satisfied, the firing assembly releases the stored energy in a direction opposite the direction of loading to move the member and any materials, such as absorption bundles or fuel materials attached thereto.

According to the embodiment shown in FIG. 1, FIG. 2, FIG. 3, FIG. 4, FIG. 5, FIG. 6, and FIG. 7, a hydropneumatic actuator, shown as hydropneumatic actuator 100, includes a first piston, shown as piston 102, a plug, shown as plug 104, and a housing, shown as housing 106. As shown in FIG. 1, FIG. 2, FIG. 3, FIG. 4, FIG. 5, FIG. 6, and FIG. 7, housing 106 has an inner volume, and piston 102 is disposed within the inner volume. As shown in FIG. 1, FIG. 2, FIG. 3, FIG. 4, FIG. 5, FIG. 6, and FIG. 7, plug 104 is disposed within housing 106 and spaced from piston 102. In one embodiment, plug 104 may be fixed to housing 106 (e.g., welded to housing 106, etc.) although it is to be appreciated that plug 104 may be fixed in other appropriate manners, which may include removably fixing plug 104 to housing 106 or even reducing or limiting movement of plug 104 such as with friction or other techniques.

As shown in FIG. 1, FIG. 2, FIG. 3, FIG. 4, FIG. 5, FIG. 6, and FIG. 7, hydropneumatic actuator 100 includes an inlet, shown as inlet 108, and an outlet, shown as outlet 110. Inlet 108 and outlet 110 may define ports through which a fluid (e.g., a liquid, etc.) may be provided as part of a hydraulic system. In one embodiment, housing 106 defines coolant flow path 112 (e.g., a coolant flow path along which a pump provides a coolant flow, etc.) between inlet 108 and outlet 110.

Figure 8:
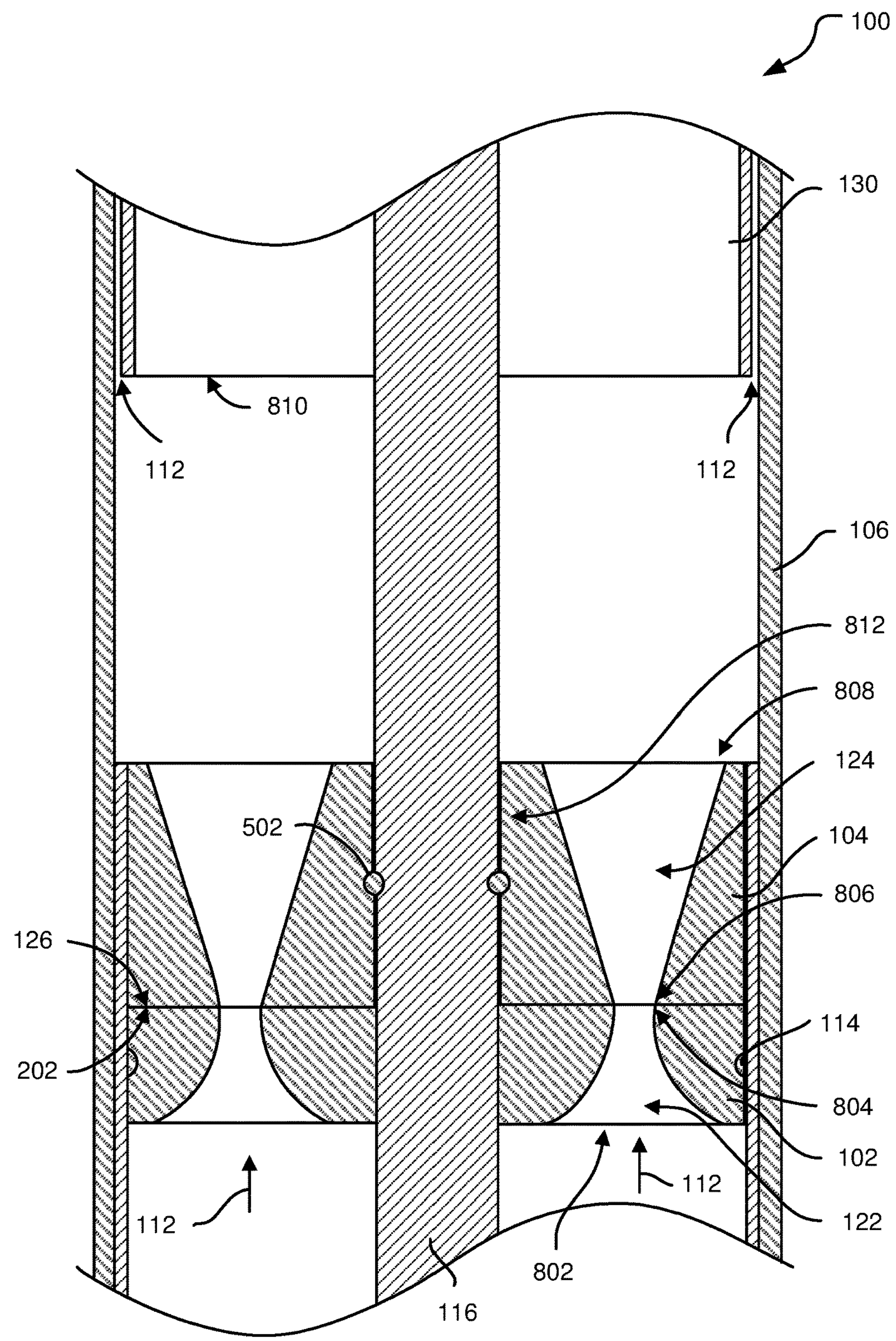
FIG. 8 is a cross-sectional view of a hydropneumatic actuator 100, according to one embodiment.
Figure 9:
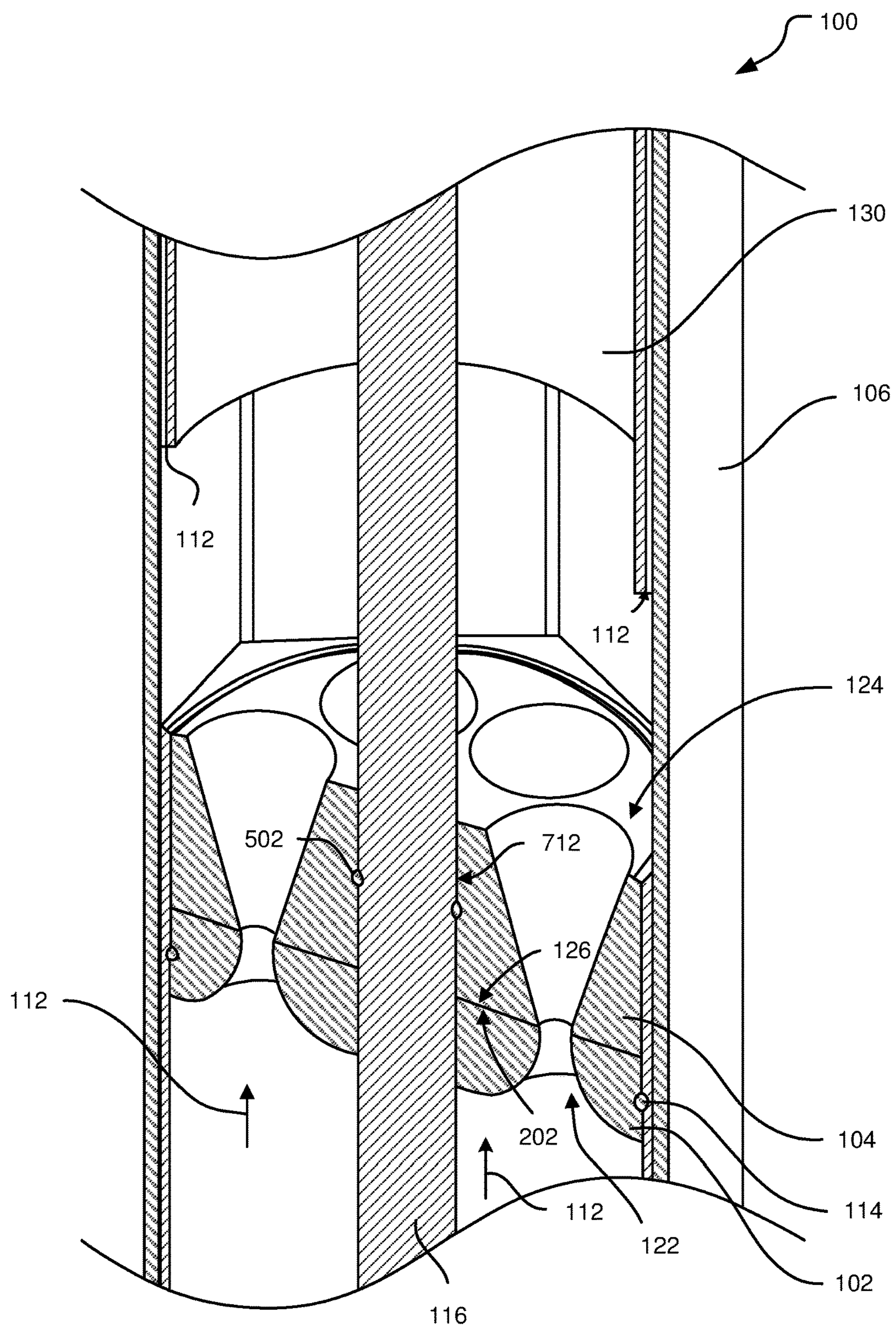
FIG. 9 is a cross-sectional view of a hydropneumatic actuator 100, according to one embodiment.

According to the embodiment shown in FIG. 1, FIG. 2, FIG. 3, FIG. 4, FIG. 5, FIG. 6, and FIG. 7, piston 102 may be slidably coupled to housing 106. Referring to FIG. 8 and FIG. 9, a seal 114 may be provided between the piston 102 and the housing 106. As shown in FIG. 1, FIG. 2, FIG. 3, FIG. 4, FIG. 5, FIG. 6, and FIG. 7, hydropneumatic actuator 100 includes a rod, shown as rod 116, that is at least partially disposed within the inner volume of housing 106. In one embodiment, piston 102 is coupled (e.g., fixed, etc.) to rod 116. As shown in FIG. 1, FIG. 2, FIG. 3, FIG. 4, FIG. 5, FIG. 6, and FIG. 7, rod 116 has first end 118. First end 118 of rod 116 may be configured to engage a remote device. The remote device is associated with a hydraulic system (e.g., a hydraulic system that hydropneumatic actuator 100 forms a portion of, etc.), according to one embodiment. Hydropneumatic actuator 100 provides an output, shown as output 120. In FIG. 1, output 120 is a linear output corresponding with the linear movement of piston 102. Hydropneumatic actuator 100 may provide the linear output along any appropriate line or direction. In some embodiments, the linear output is provided along at least one of an axial centerline defined by piston 102, an axial centerline defined by housing 106, and an axial centerline defined by rod 116. In other embodiments, hydropneumatic actuator 100 provides the linear output along still another direction as may be appropriate in many applications. In still other embodiments, hydropneumatic actuator 100 provides still another type of output 120 (e.g., a rotational output, etc.) to form a type of rotary actuator through any appropriate mechanism including rack and pinion and oscillating vane.

According to one embodiment, piston 102 and plug 104 define pairs of cooperating apertures. The pairs of cooperating apertures define at least portions of converging-diverging passages, according to the embodiment shown in FIG. 1 and FIG. 5. The converging-diverging passages may define a nearly-ideal Venturi geometry. In one embodiment, piston 102 and plug 104 define a plurality of aperture sets each including a pair of cooperating apertures, the plurality of aperture sets forming at least portions of a plurality of converging-diverging passages.

Figure 5:
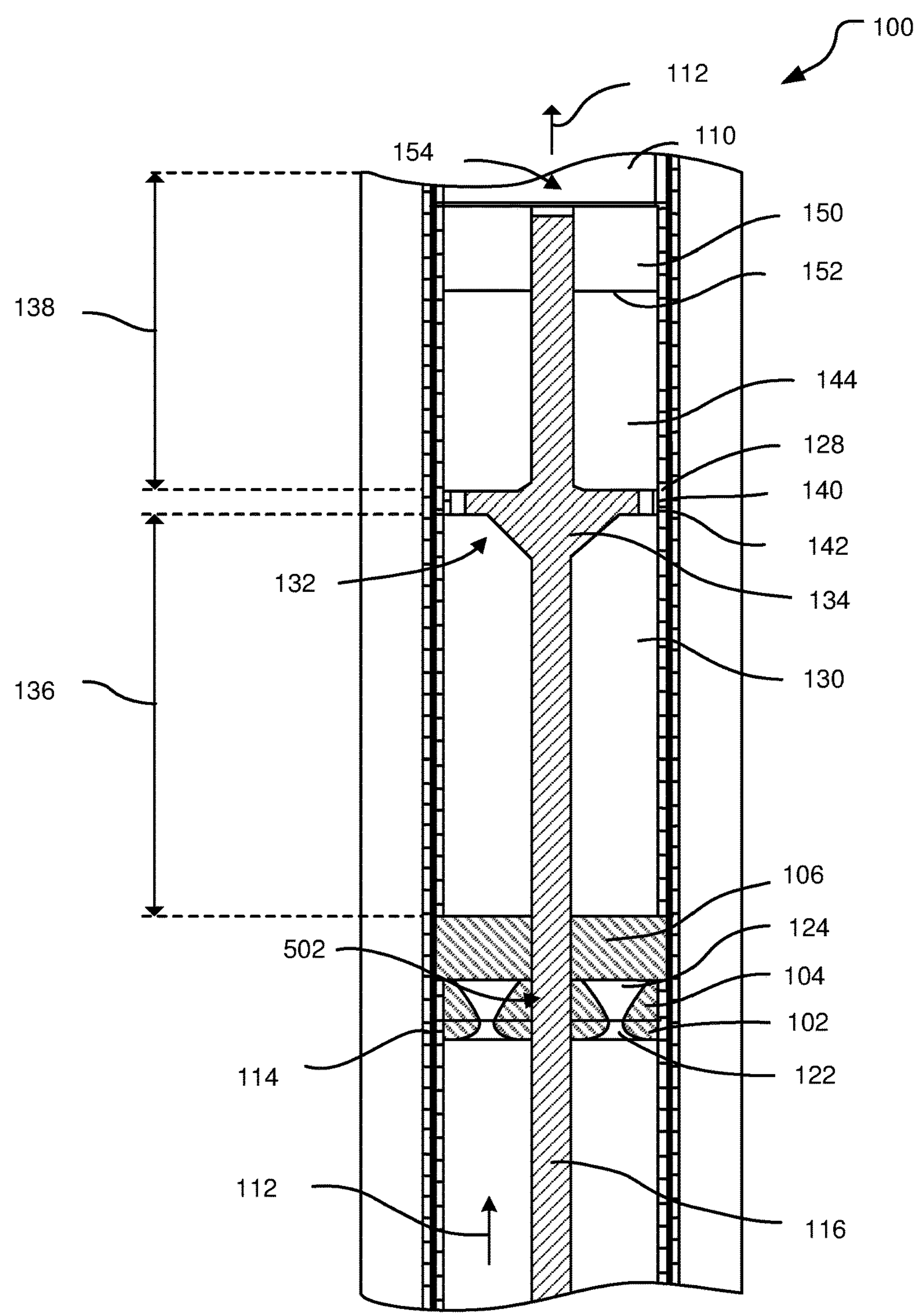
FIG. 5 is a cross-sectional view of a hydropneumatic actuator 100, according to one embodiment.
Figure 6:
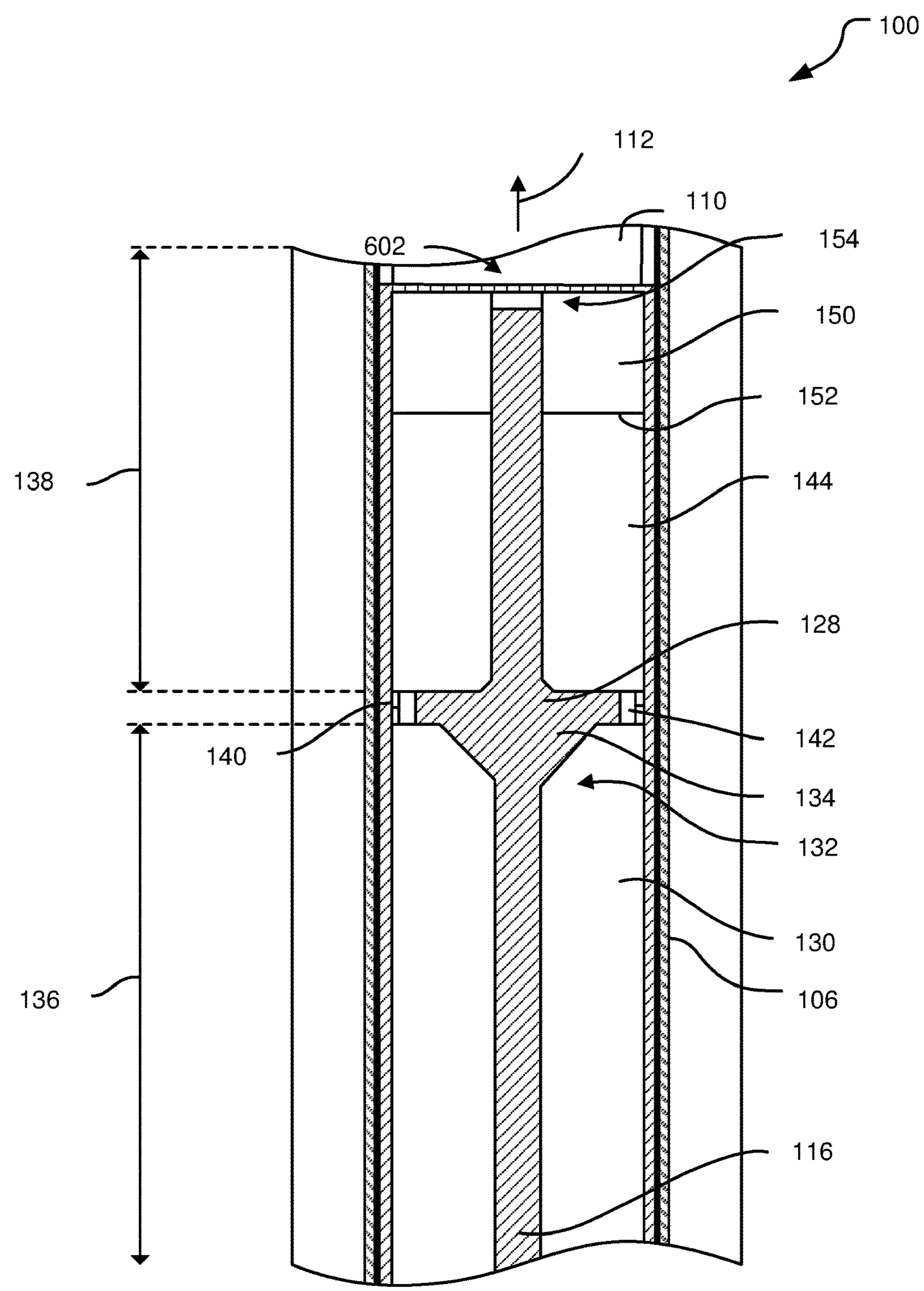
FIG. 6 is a cross-sectional view of a hydropneumatic actuator 100, according to one embodiment.

According to various embodiments, the piston 102 and plug 104 may have only a single pair of cooperating apertures. The number of apertures provided in the piston 102 and plug 104 may vary, and may not correspond in number to each other. By way of example, the piston 102 may have greater, fewer, or the same number of apertures as the plug 104. For example, a pair of cooperating apertures may include a single aperture of piston 102 matched with multiple apertures of plug 104, or vice versa. As shown in FIG. 1 and FIG. 5, piston 102 defines first apertures (e.g., a first group of apertures, etc.), shown as converging openings 122, and plug 104 defines second apertures (e.g., a second group of apertures, etc.), shown as diverging openings 124. One of the converging openings 122 defined at least partially by piston 102 and one of the diverging openings 124 defined at least partially by plug 104 define a pair of cooperating apertures. Each of the pairs of cooperating apertures may form at least a portion of a converging-diverging passage formed when piston 102 and plug 104 are in contact with one another (e.g., as shown in FIG. 3, FIG. 5, FIG. 8, and FIG. 9). As shown in FIG. 1, piston 102 and plug 104 each define six converging openings 122 and six diverging openings 124, respectively. In other embodiments, piston 102 and plug 104 each define more or fewer converging openings 122 and diverging openings 124, respectively. For example, piston 102 may have a single converging openings 122 and plug 104 may have a single diverging openings 124. Alternatively, piston 102 may have multiple converging openings 122 while plug 104 has a single diverging openings 124 and vice versa.

Converging openings 122 and diverging openings 124 may be shaped to combine into one or more passages having a constricted section, such as in a Venturi tube when piston 102 and plug 104 are in contact with one another as shown in FIG. 5, FIG. 8, and FIG. 9. FIG. 8 may be a detail view of FIG. 5 and shows a configuration where the piston 102 and plug 104 are in contact with one another. Such a configuration may occur after a fluid flow is provided along coolant flow path 112. In FIG. 8, converging openings 122 extends between an inlet end, shown as inlet end 802, and a throat, shown as inlet throat 804. Diverging openings 124 extends between a throat, shown as outlet throat 806, and an outlet end, shown as outlet end 808. The opening area of the inlet throat 804 of converging openings 122 may have an opening area that is less than the inlet end 802 of the converging openings 122. The diverging openings 124 may be shaped in any appropriate way and may have an outlet throat 806 which has an opening area that is smaller than the opening area at the outlet end 808 of the diverging openings 124. In some embodiments, as shown in FIG. 8, the converging opening area at the inlet throat 804 of converging openings 122 may be aligned and/or have an opening area that is substantially similar to that of the opening area at the outlet throat 806 of diverging openings 124. The fluid flow along fluid coolant flow path 112 may travel through inlet end 802 of the converging openings 122 towards the inlet throat 804 and then into the outlet throat 806 of the diverging openings 124 towards the outlet end 808. In one embodiment, the flow through converging openings 122 and diverging openings 124 has a constant flow rate. The pressure of the fluid flow through converging openings 122 and diverging openings 124 may decrease between inlet end 802 and inlet throat 804 (e.g., due to the reduced area and greater velocity, etc.) and then increase between outlet throat 806 and outlet end 808 (e.g., due to the larger area and reduced velocity, etc.). Specifically, the fluid pressure at inlet end 802 may be greater than the fluid pressure at inlet throat 804; the fluid pressure at outlet throat 806 may be less than the fluid pressure at outlet end 808. The greater pressure at inlet end 802 relative to the pressure at inlet throat 804 generates forces tending to biasing force piston 102 towards plug 104; the greater pressure at outlet end 808 relative to the pressure at outlet throat 806 generates a biasing force tending to biasing force piston 102 toward plug 104. As a result of fluid flow through both the converging and diverging openings of the first piston and plug respectively, the piston 102 and plug 104 are pulled together. The pressure of a fluid flow along coolant flow path 112 through converging openings 122 and diverging openings 124 may be nearly equal at outlet end 808 and inlet end 802 (i.e., the discharge pressure may recover to nearly its inlet value, etc.). In one embodiment, inlet throat 804 of converging openings 122 has a cross-sectional area that is equalized with a cross sectional area of outlet throat 806 of diverging openings 124 although it is to be appreciated that any size, shape, and/or alignment may be appropriate as one of skill in the art will recognize.

As shown in FIG. 8 and FIG. 9, the cross-sectional area of converging openings 122 transitions nonlinearly between inlet end 802 and inlet throat 804. By way of example, the cross-sectional area of converging openings 122 may transition between inlet end 802 and inlet throat 804 according to a conic section including parabolic, elliptical, circular, hyperbolic, or other nonlinear profiles. In other embodiments, the cross-sectional area of converging opening transitions linearly or even in stepwise fashion between inlet end 802 and inlet throat 804. As shown in FIG. 8 and FIG. 9, the cross-sectional area of diverging openings 124 transitions linearly between outlet throat 806 and outlet end 808.

Piston 102 defines surface 202 facing substantially toward plug 104, and plug 104 defines surface 126 facing substantially toward piston 102, according to the embodiment shown in FIG. 8 and FIG. 9. Surface 202 and surface 126 may define a pair of mating surfaces (e.g., surfaces having a shape, profile, or other features that substantially correspond with one another, etc.). As shown in FIG. 8 and FIG. 9, surface 202 engages (e.g., mates with, cooperates with, etc.) surface 126 when piston 102 is positioned in the configuration shown in FIG. 8 and FIG. 9. In one embodiment, inlet throat 804 of converging openings 122 and outlet throat 806 of diverging openings 124 are disposed along surface 202 and surface 126, respectively. Although FIG. 8 and FIG. 9 show the mating surface 202 and surface 126 as substantially planar outside of the inlet throat 804 and outlet throat 806, it is to be appreciated that any appropriate surface structure, texture, and/or shaping may be used as appropriate.

As shown in FIG. 8 and FIG. 9, piston 102 includes a body portion that defines the converging openings 122 and plug 104 includes a body portion that defines the diverging openings 124. Converging openings 122 and diverging openings 124 (i.e., the converging-diverging passage, the pair of cooperating apertures, etc.) are spaced from peripheries of piston 102 and plug 104, according to one embodiment. Converging openings 122 and diverging openings 124 may be cast, machined, or otherwise formed into the body portions of piston 102 and plug 104. The body portions of piston 102 and plug 104 may be formed of a single piece or multiple pieces according to various embodiments.

Figure 4:
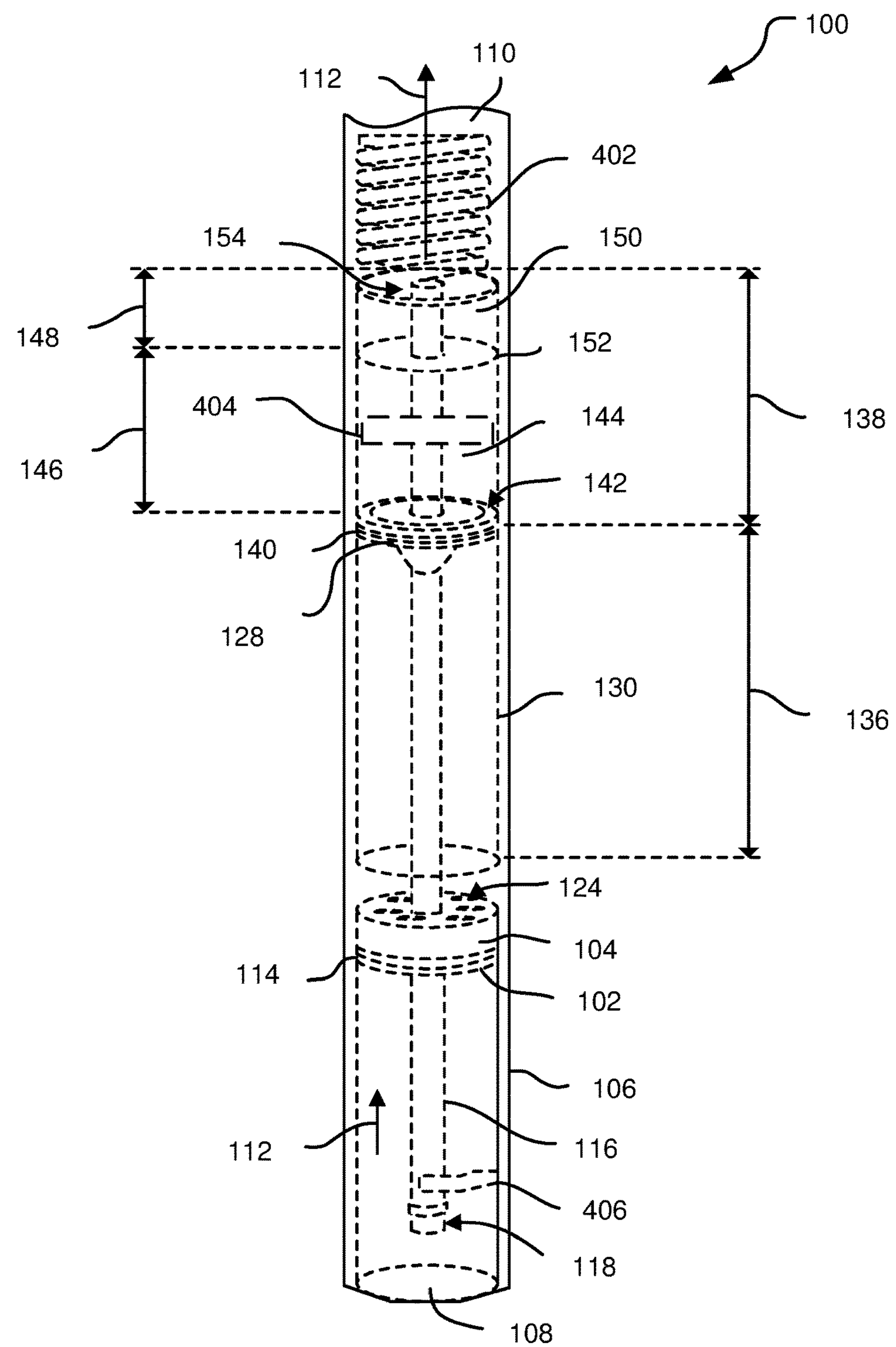
FIG. 4 is a perspective view of a hydropneumatic actuator 100, according to one embodiment.

Referring to FIG. 4, in some embodiments, hydropneumatic actuator 100 may comprise additional features including hysteresis device 402, expansion device 404, and locking mechanism 406. Hysteresis device 402 may provide a driving force that may operate independent of the biasing force, withdrawing the neutron modifying material during various coolant flow conditions. In some embodiments, hysteresis device 402 receives a hysteresis control signal to provide the driving force. In some embodiments, hysteresis device 402 is a spring mechanism. The spring mechanism may be compressed and latched, such that the hysteresis control signal unlatches the spring mechanism and the spring mechanism may return to its free length; thus, providing the driving force. In some embodiments, hysteresis device 402 may be positioned above hydropneumatic actuator 100.

Referring to FIG. 4, in some embodiments, expansion device 404 may be provided. In some embodiments, expansion device 404 may be located in the fluid 144. In some embodiments, expansion device 404 may engage with another element, such as housing 106 or cup 130. Expansion device 404 may receive an engagement control signal to remain engaged with those other elements until a separate disengagement control signal may be received, allowing expansion device 404 to return to the contracted state. In some embodiments, expansion device 404 may be comprised of a thermal expansive material. Thus, in those embodiments, as the temperature of the coolant rises, expansion device 404 may reach the expanded state. In some embodiments, expansion device 404 may be a bellows.

Referring to FIG. 4, in some embodiments, locking mechanism 406 may be provided. In some embodiments, locking mechanism 406 may be located below piston 102. Locking mechanism 406 may engage with another element, such as rod 116 and may prevent the motion of rod 116. In those embodiments the neutron modifying material may be prevented from being withdrawn or inserted, depending on the conditions that may be present when the locking mechanism 406 is engaged. In some embodiments, locking mechanism 406 has a locked state and an unlocked state. In further embodiments, locking mechanism 406 may receive a locking control signal to transition from the locked state to the unlocked state or an unlocking control signal to transition to the unlocked state. In some embodiments, locking mechanism 406 may prevent motion of rod 116, or another element, via a frictional force. In other embodiments, locking mechanism 406 may comprise a ferromagnetic material, and thus prevent movement of rod 116, or another element, by a magnetic force.

Figure 7:
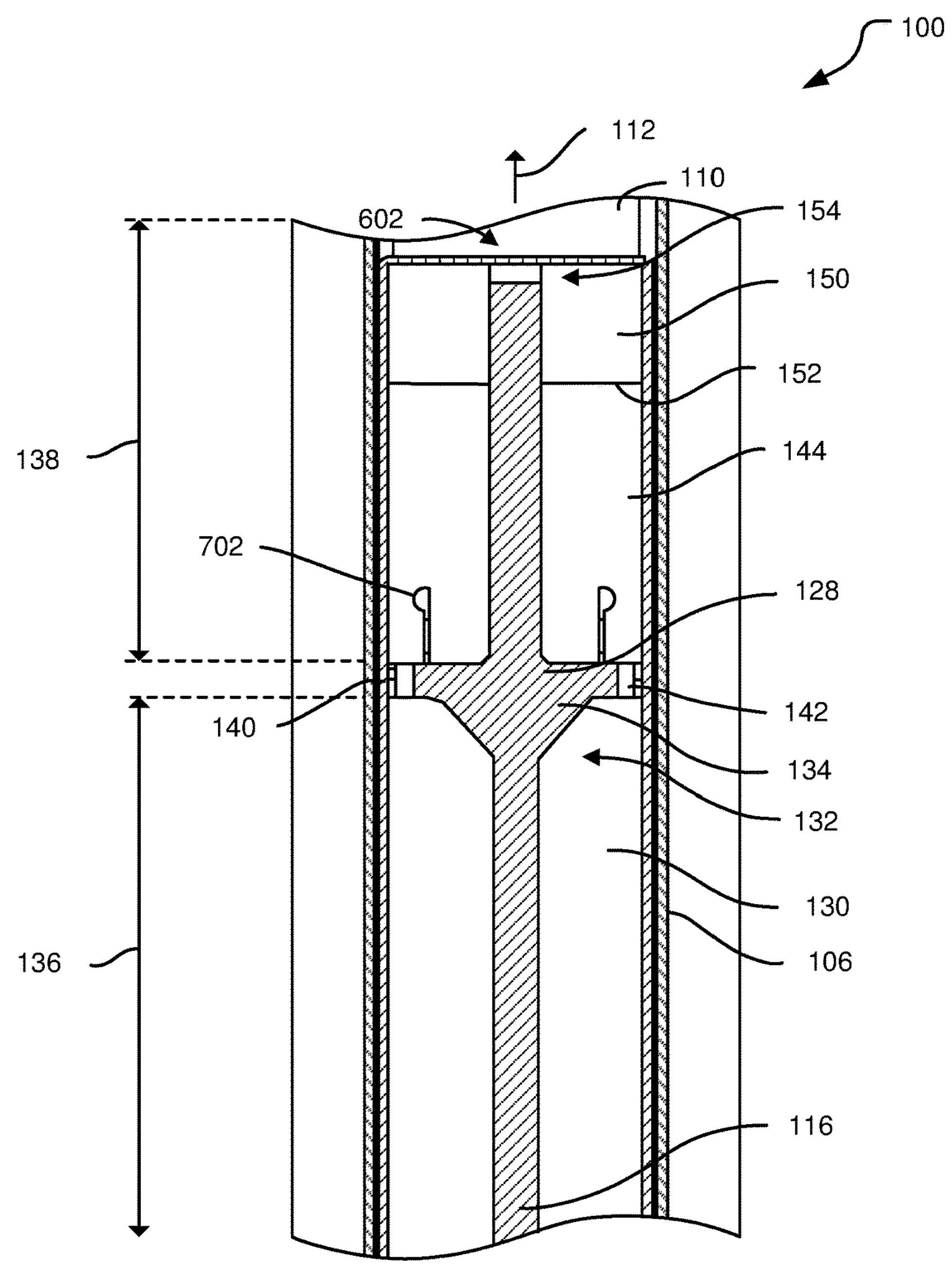
FIG. 7 is a cross-sectional view of a hydropneumatic actuator 100, according to one embodiment.

Referring to FIG. 7, in some embodiments, hydropneumatic actuator 100 may further comprise flow restricting device 702. Flow restricting device 702 may be positioned to restrict coolant flow. In some embodiments, flow restricting device 702 may be positioned above the second piston 128 in fluid 144. In some embodiments, flow restricting device 702 may be a bimetallic strip, with the characteristics to restrict coolant flow based on operating temperatures.

Figure 10:
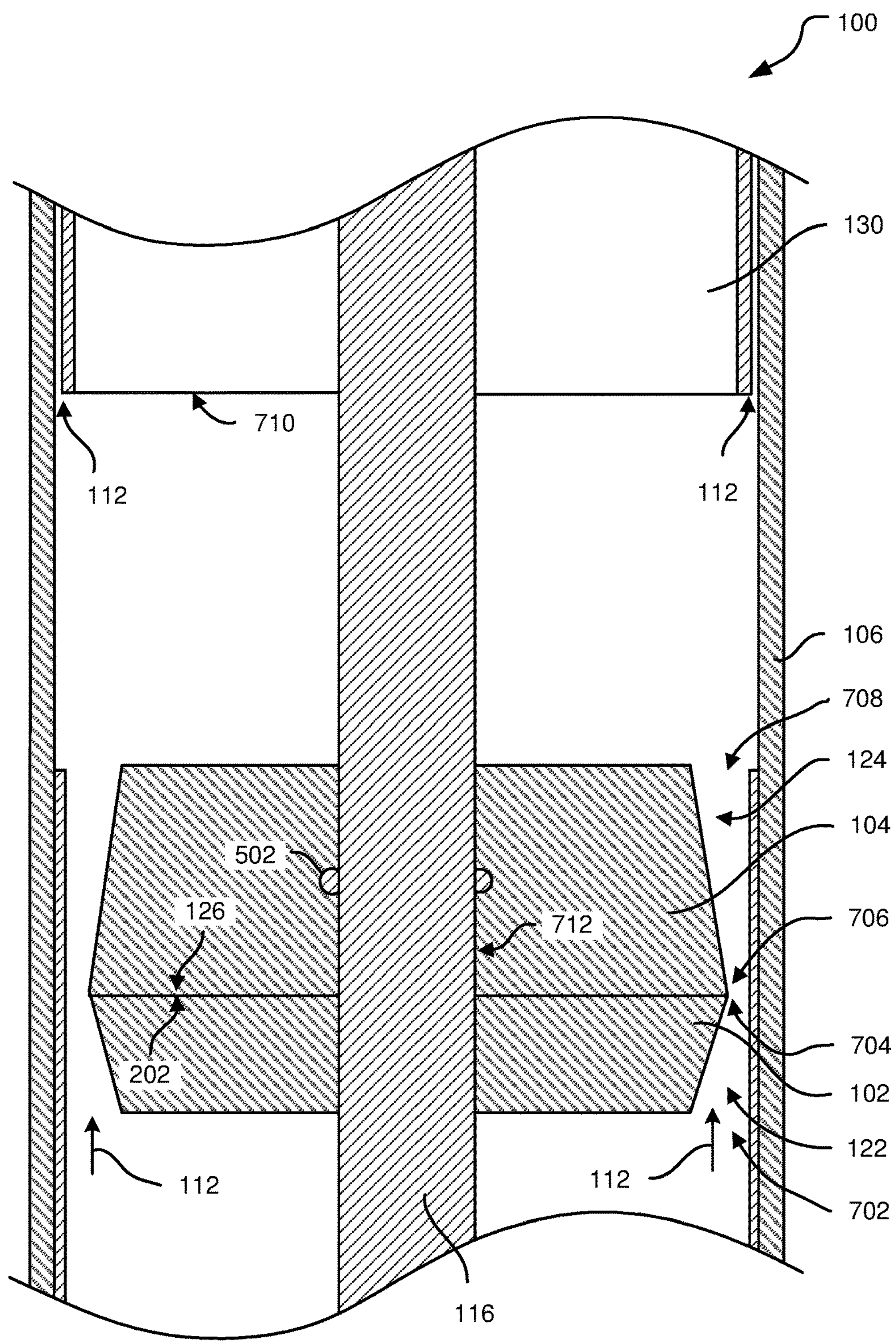
FIG. 10 is a cross-sectional view of a hydropneumatic actuator 100, according to another embodiment.
Figure 11:
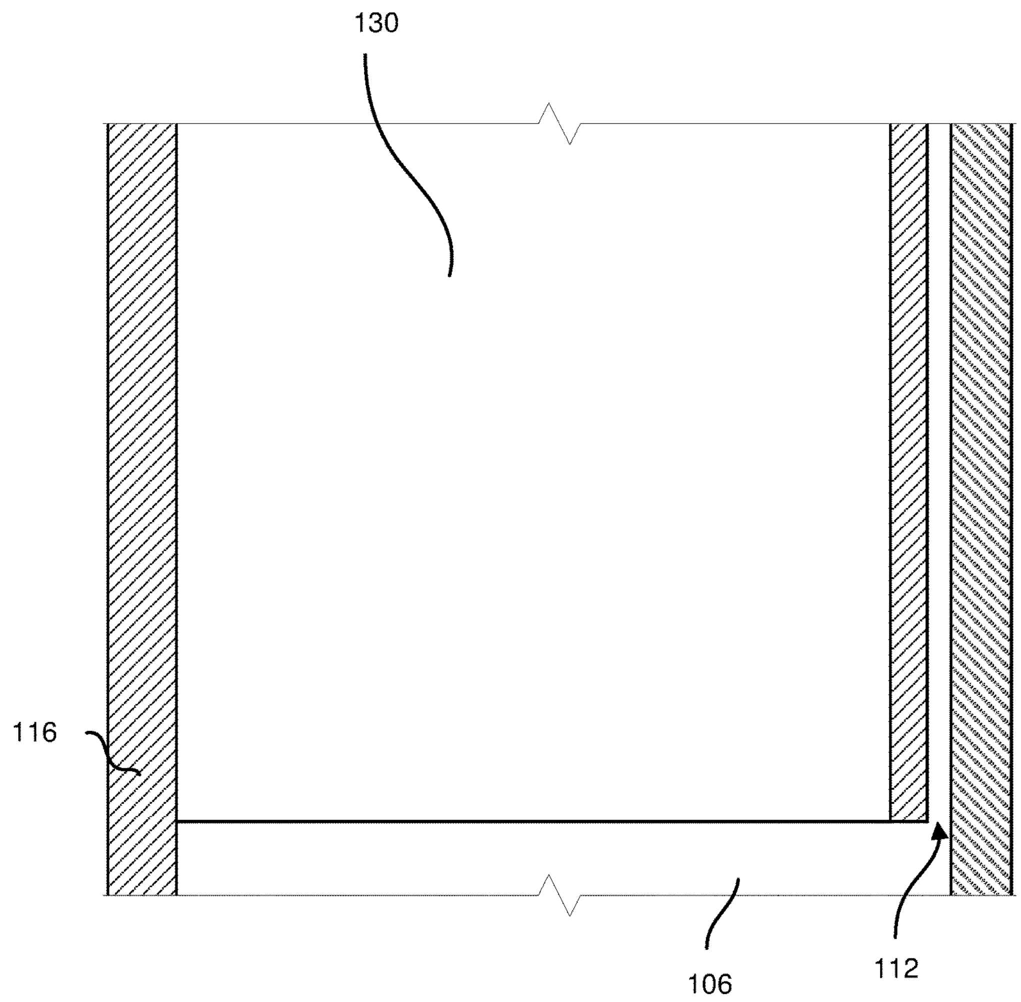
FIG. 11 is a detail cross-sectional views of a coolant flow path through a hydropneumatic actuator 100, according to one embodiment.
Figure 12:
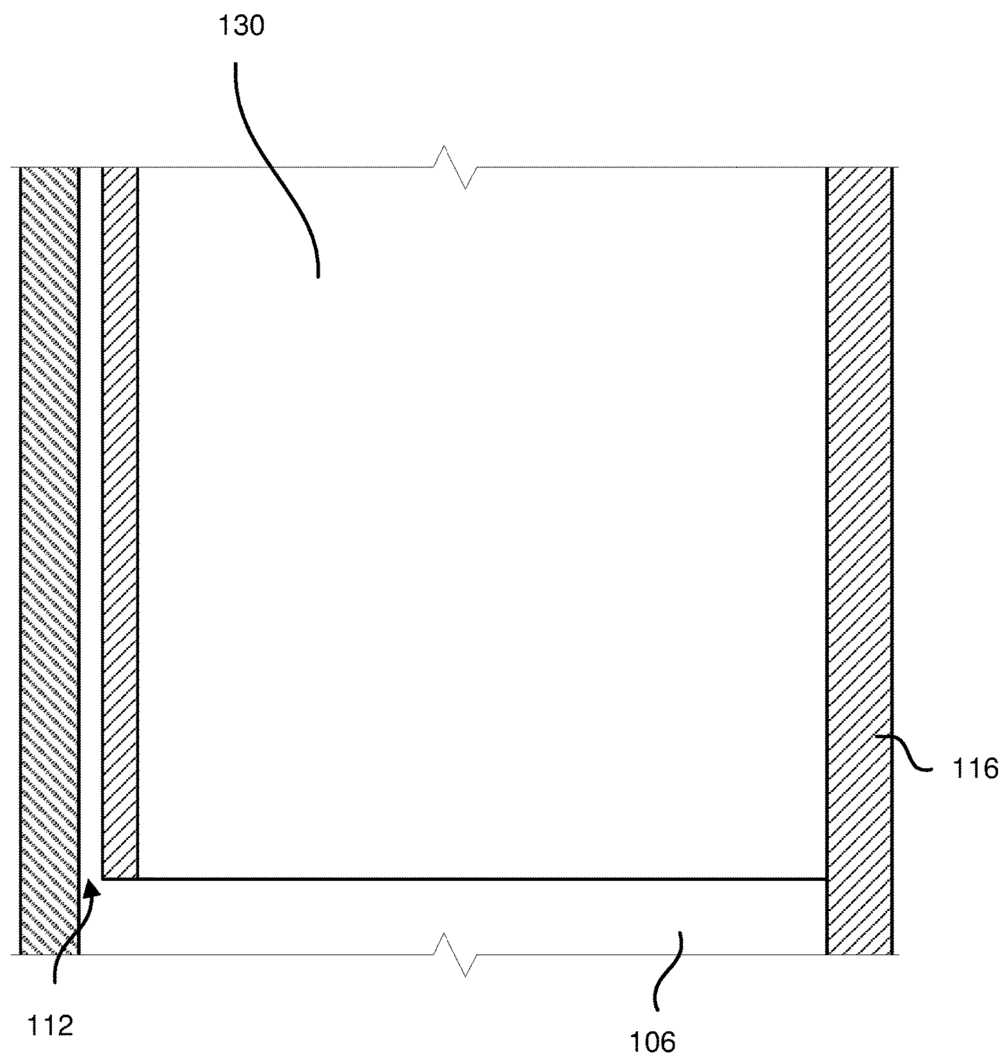
FIG. 12 is a detail cross-sectional views of a coolant flow path through a hydropneumatic actuator 100, according to one embodiment.

Referring to FIG. 10, in one embodiment, piston 102 defines a first sidewall that forms converging openings 122. Plug 104 defines a second sidewall that forms diverging openings 124. Converging openings 122 and diverging openings 124 are thereby positioned at peripheries of piston 102 and plug 104. In FIG. 10, piston 102 and plug 104 are shown in contact with one another. Housing 106 has an inner surface that forms a portion of the converging-diverging passage (i.e., piston 102, plug 104, and housing 106 cooperate to form the converging-diverging passage, etc.). Piston 102 and plug 104 may be cast, machined, or otherwise formed to have sidewalls that form portions of converging openings 122 and diverging openings 124. According to various embodiments, multiple converging-diverging passages may be formed between the piston 102 and plug 104 using the housing 106 to provide a portion of the structure of the passages. Converging-diverging passages formed at least partially by housing 106 may be considered inverted relative to those defined by only piston 102 and plug 104.

In other embodiments, the cross-sectional area of diverging openings 124 transitions nonlinearly between outlet throat 806 and outlet end 808. By way of example, the cross-sectional area of diverging openings 124 may transition between outlet throat 806 and outlet end 808 according to a conic section or other nonlinear profiles, linear profiles, or even in step-wise fashion. Any combination of linear and non-linear cross sections may be used as appropriate to produce a Venturi effect in the piston 102 and/or plug 104.

According to the embodiment shown in FIG. 1, FIG. 2, FIG. 3, FIG. 5, and FIG. 6, hydropneumatic actuator 100 includes a second piston 128 and a cup 130 (e.g., reservoir, etc.). The second piston 128 and cup 130 combine to form a biasing member. The biasing member or individual components thereof may be included or excluded as would be appropriate to one of skill in the art. As shown in FIG. 1, FIG. 2, FIG. 3, FIG. 4, FIG. 5, FIG. 6, and FIG. 7, piston 102 and the biasing member components are positioned on opposing sides of plug 104. In one embodiment, cup 130 is coupled to housing 106 (e.g., with one or more structural members, etc.). As shown in FIG. 1, cup 130 has a sidewall that defines an interior space, and second piston 128 is disposed within the interior space of cup 130. In one embodiment, cup 130 has an internal diameter of 148 millimeters although other sizes may be appropriate as needed. The biasing member is positioned to apply a force that actuates rod 116 and piston 102 in response to a loss of flow along coolant flow path 112, according to the embodiment shown in FIG. 1, FIG. 2, FIG. 3, FIG. 4, FIG. 5, FIG. 6, and FIG. 7. As shown in FIG. 1, rod 116 includes an opposing second end, shown as opposing second end 132. In one embodiment, second piston 128 is coupled to opposing second end 132 of rod 116. Rod 116 and second piston 128 may thereby move in unison within housing 106 and cup 130. As shown in FIG. 1, rod 116 includes a transition, shown as tapered portion 134, that is coupled to second piston 128.

As shown in FIG. 1, FIG. 2, FIG. 3, FIG. 4, FIG. 5, FIG. 6, FIG. 7, FIG. 8, FIG. 9, FIG. 11 and FIG. 12, cup 130 is positioned along coolant flow path 112. In other embodiments, the biasing member is otherwise at least one of positioned along, disposed along, and in fluid communication with coolant flow path 112. Cup 130 includes a sidewall having an open end, shown as open end 810 (see, e.g., FIG. 8), and an enclosed end, shown as enclosed end 602 (see, e.g., FIGS. 6 and 7), according to the embodiment shown in FIG. 1, FIG. 2, FIG. 3, FIG. 4, FIG. 5, FIG. 6, FIG. 7, FIG. 8 and FIG. 9. As shown in FIG. 1, FIG. 2, FIG. 3, FIG. 4, FIG. 5, FIG. 6, and FIG. 7, second piston 128 includes a body that separates the interior space of cup 130 into a first region, shown as first region 136, and a second region, shown as second region 138. First region 136 may be exposed to (e.g., in confronting relation with, directly exposed to, open to, etc.) coolant flow path 112 (e.g., the portion of coolant flow path 112 within housing 106 and outside of cup 130, etc.). In one embodiment, open end 810 of cup 130 has an opening configured to fluidly couple first region 136 and a fluid (e.g., liquid, gas, etc.) associated with coolant flow path 112.

In the embodiment shown in FIG. 1, FIG. 2, FIG. 3, FIG. 4, FIG. 5, FIG. 6, and FIG. 7, second piston 128 is slidably coupled to the sidewall of cup 130 with a seal, shown as seal 140. As shown in FIG. 1, FIG. 2, FIG. 3, FIG. 4, FIG. 5, FIG. 6, and FIG. 7, second piston 128 defines a plurality of orifices, shown as orifices 142, that place first region 136 in fluid communication with second region 138. A fluid (e.g., liquid, gas etc.), shown as fluid 144, is disposed within a first portion, shown as fluid portion 146, of second region 138. By way of example, a fluid associated with coolant flow path 112 may enter fluid portion 146 of second region 138 through orifices 142 and define fluid 144. In one embodiment, fluid 144 includes a liquid coolant. By way of example, the liquid coolant may include liquid sodium.

As shown in FIG. 1, FIG. 5, FIG. 6, and FIG. 7, second piston 128 includes a body portion that defines the entirety of each orifices 142. In other embodiments, second piston 128 and a sidewall of cup 130 cooperate to define orifices 142. By way of example, the sidewall of cup 130 may have a cross-sectional dimension (e.g., diameter, etc.) that is larger than a corresponding cross-sectional dimension of second piston 128 thereby forming a gap that places first region 136 in fluid communication with second region 138, particularly fluid portion 146. The gap is configured (e.g., sized, shaped, positioned, oriented, etc.) to restrict a flow of fluid 144 therethrough, according to one embodiment.

As shown in FIG. 1, FIG. 2, FIG. 3, FIG. 4, FIG. 5, FIG. 6, and FIG. 7, a second portion, shown as resilient portion 148, of second region 138 contains a resilient member. By way of example, the resilient portion 148 may contain a compressible fluid (e.g., a liquid, a gas, etc.), shown as compressible fluid 150. In one embodiment, compressible fluid 150 is different from the fluid 144 associated with the coolant flow path 112. In some cases, compressible fluid 150 includes argon gas (e.g., pure argon gas, a mixture of argon gas and one or more other gases, etc.) compressible fluid 150 may include an identifying material (e.g., such that compressible fluid 150 is tagged, colored, selectively reactive, etc.) to facilitate identification of a leak of compressible fluid 150. Fluid portion 146 interacts with resilient portion 148 at an interface, shown as interface 152. Interface 152 may include a plate, membrane, or other device that separates fluid 144 from compressible fluid 150. In other embodiments, interface 152 defines the boundary where compressible fluid 150 within resilient portion 148 directly contacts a surface of fluid 144 within fluid portion 146.

As shown in FIG. 1, FIG. 2, FIG. 3, FIG. 4, FIG. 5, FIG. 6, and FIG. 7, cup 130 is configured to contain compressible fluid 150 within second region 138 (e.g., within resilient portion 148 of second region 138, etc.). By way of example, cup 130 may include a sidewall having one or more panels that are joined to form a fluid tight chamber. By way of another example, cup 130 may be formed of a material (e.g., a metal, a polymeric material, etc.) that lacks pores large enough for compressible fluid 150 to escape therethrough.

In one embodiment, compressible fluid 150 is disposed within resilient portion 148. The compressible fluid may be contained by a sidewall of cup 130 and fluid 144 within fluid portion 146 of second region 138. In one embodiment, a pressure of compressible fluid 150 disposed within resilient portion 148 varies with the pressure of fluid 144 within fluid portion 146 of second region 138. By way of example, an increase in the pressure of fluid 144 within fluid portion 146 (e.g., due to an increase in the pressure of a fluid associated with coolant flow path 112, etc.) may increase the pressure of compressible fluid 150 within resilient portion 148. In other embodiments, second piston 128 does not define the plurality of orifices 142, and resilient portion 148 defines at least a majority of second region 138. A compressible fluid within resilient portion 148 may be contained by a sidewall of cup 130 and a surface of second piston 128.

In other embodiments, the biasing member of hydropneumatic actuator 100 includes another device or another arrangement of components. By way of example, the biasing member may include a spring (e.g., a mechanical spring, a resilient solid, etc.) disposed within resilient portion 148 of second region 138. A plate may be coupled (e.g., with a seal, etc.) to a sidewall of cup 130, and the spring may be coupled to the plate and to cup 130 (e.g., enclosed end 602 of cup 130, etc.). By way of another example, the biasing member may include a combination of a spring and a gas spring (e.g., both a compressible fluid and a spring disposed within resilient portion 148 of second region 138, etc.). In still other embodiments, the biasing member includes still other components that may be still otherwise arranged.

As shown in FIG. 8, plug 104 defines a bore, shown as bore 812, that receives rod 116. According to the embodiment shown in FIG. 8 and FIG. 9, rod 116 is slidably coupled to bore 812 of plug 104 with a seal, shown as seal 502. In one embodiment, at least a portion of rod 116 has a cross-sectional shape (e.g., along a plane within which plug 104 extends, in a plane that is orthogonal to a longitudinal axis of rod 116, etc.) that mates with (e.g., engages, cooperates with, etc.) a cross-sectional shape of bore 812 (e.g., within a plane that corresponds with the specified plane of rod 116, etc.) bore 812 may have a uniform cross-sectional shape through the thickness of plug 104 or may have a specified cross-sectional shape along only a portion of the thickness of plug 104 (e.g., top and bottom thereof, etc.), according to various embodiments. Rod 116 may have a specified cross-sectional shape along the entire length thereof or along only a portion of the length thereof (e.g., a portion of the length that interfaces with plug 104 as piston 102 and rod 116 translate between the first orientation and the second orientation, etc.), according to various embodiments. The specified cross-sectional shape of piston 102 and the specified cross-sectional shape of plug 104 may rotationally align piston 102 and plug 104, thereby reducing the risk of misalignment between converging openings 122 and diverging openings 124.

According to one embodiment, hydropneumatic actuator 100 includes a sensor positioned to provide sensing signals relating to the position of at least one or any combination of piston 102, rod 116, and second piston 128. As shown in FIG. 1, FIG. 2, FIG. 3, FIG. 4, FIG. 5, FIG. 6, and FIG. 7, hydropneumatic actuator 100 includes a position indicator, shown as magnet 154. A sensing device interfaces with magnet 154 to facilitate determining the position of piston 102, rod 116, and second piston 128, according to one embodiment. In other embodiments, hydropneumatic actuator 100 includes another device configured to monitor the position of at least one of piston 102, rod 116, and second piston 128.

In still other embodiments, hydropneumatic actuator 100 includes a fluid level sensor positioned to provide sensing signals relating to the fluid level within cup 130. A processing circuit may evaluate the sensing signals to identify a leak of compressible fluid 150 from cup 130. By way of example, the processing circuit may compare a current fluid level within cup 130 with a target fluid level within cup 130 (e.g., for the first orientation, for the second orientation, etc.). A current fluid level within cup 130 that is greater than a target fluid level within cup 130 may indicate a leak of compressible fluid 150 from cup 130.

In one embodiment, piston 102, rod 116, and second piston 128 are selectively repositionable within housing 106 and cup 130 between a first orientation (e.g., the orientation shown in FIG. 1, the orientation shown in FIG. 2, etc.) and a second orientation (e.g., the orientation shown in FIG. 3, etc.) piston 102, rod 116, and second piston 128 may be positioned in the first orientation when a fluid flow having a characteristic (e.g., pressure, flow rate, etc.) exceeding (which in some cases may be less than) a threshold level is provided along coolant flow path 112. By way of example, the first orientation may relate to an initial state (e.g., startup state, quiescent state, etc.) of a pump positioned to provide a fluid flow along coolant flow path 112. In the first orientation, the fluid portion 146 may have a height of 50 millimeters (e.g., with a volume of 0.0008 cubic meters, etc.) and resilient portion 148 may have a height of 810 millimeters (e.g., with a volume of 0.0137 cubic meters, etc.) such that second region 138 has a combined height of 860 millimeters with a gas-to-liquid volume ratio of 17.1.

A fluid flow provided along coolant flow path 112 having a characteristic (e.g., pressure, flow rate, etc.) exceeding (which in some cases may be greater than) the threshold level actuates piston 102, rod 116, and second piston 128 into the second orientation from the first orientation during a startup phase. By way of example, the fluid flow may interface with piston 102 to translate piston 102, rod 116, and second piston 128 within housing 106 and cup 130 (e.g., in an upward direction according to the orientation shown in FIG. 2, etc.). In one embodiment, second piston 128 translates 500 millimeters within cup 130 between the first and second orientations although any length of translation may be appropriate. Piston 102 and rod 116 may also translate a substantially similar distance, such as 500 millimeters, between the first and second orientations. In the second orientation, the fluid portion 146 may have a height of 250 millimeters (e.g., with a volume of 0.0041 cubic meters, etc.) and resilient portion 148 may have a height of 110 millimeters (e.g., with a volume of 0.0018 cubic meters, etc.) such that second region 138 has a combined height of 360 millimeters with a gas-to-liquid volume ratio of 0.439.

It is to be appreciated that any volume, length and size of the above components and their movements may be adjusted as appropriate for the application and size, desired force and reaction time and range of the system.

The threshold level may be related to the forces applied to first end 118 of rod 116 (e.g., weight forces, forces applied by a remote device, etc.). The force with which piston 102 is actuated may be related to the pressure of the fluid flow and the cross-sectional area of piston 102. The rate at which piston 102, rod 116, and second piston 128 translate within housing 106 and cup 130 (e.g., the rate of ascent according to the orientation shown in FIG. 2, FIG. 3, FIG. 5, and FIG. 6, etc.) may be reduced by the compression of compressible fluid 150 within cup 130. After initial compression, fluid 144 may flow through orifices 142 from fluid portion 146 of second region 138 into first region 136 until a new volume of resilient portion 148 is achieved. Piston 102, rod 116, and second piston 128 may continue to translate until piston 102 engages plug 104 (e.g., contacts plug 104, abuts plug 104, in communication with plug 104, etc.). In one embodiment, piston 102 engages plug 104 when disposed in the second orientation thereby placing converging openings 122 and diverging openings 124 in direct fluid communication. By way of example, fluid flowing from converging openings 122 may flow directly into diverging openings 124.

In one embodiment, pressure variations within the converging-diverging passages secure piston 102 and rod 116 in the second orientation during normal operation of the hydraulic system (e.g., during normal operation of a pump providing a fluid flow along coolant flow path 112, during normal operation of a nuclear reactor associated with the hydraulic system, etc.). By way of example, a fluid flow along coolant flow path 112 and through the converging-diverging passages generates a suction force (e.g., due to the Venturi effect, etc.) between piston 102 and plug 104 that retains piston 102, rod 116, and second piston 128 in the second orientation. The suction force may be generated due to pressure differentials within, between, and/or proximate converging openings 122 and diverging openings 124 (e.g., at inlet throat 804 and outlet throat 806, etc.). In one embodiment, the suction forces retain piston 102, rod 116, and second piston 128 in the second orientation to reduce the risk of undesirable movement of first end 118 of rod 116 during routine variations in the fluid flow along coolant flow path 112 (e.g., due to routine pump speed changes, etc.).

As shown in FIG. 1, FIG. 5, FIG. 8, and FIG. 9, the converging-diverging passages are disposed along coolant flow path 112. The fluid may thereby flow through the converging-diverging openings, through open end 810 of cup 130, and around cup 130 along coolant flow path 112. Fluid flow may also occur through orifices 142 of second piston 128 such that fluid 144 may have a pressure equal to that of the fluid flow along coolant flow path 112. Fluid 144 may act upon compressible fluid 150 by way of interface 152 such that compressible fluid 150 has a pressure that is related to (e.g., equal to, etc.) the pressure of the fluid flow along coolant flow path 112.

After initial actuation of piston 102, rod 116, and second piston 128 (e.g., due to the pressure applied by the pump reaching the threshold level, etc.), compressible fluid 150 may compress due to an increase in the characteristic (e.g., pressure, etc.) of the fluid flow along coolant flow path 112. Such compression may continue, thereby decreasing the volume of resilient portion 148, until the characteristic of the fluid flow reaches a normal operating range (e.g., a target range, a range of pressures, stable and/or substantially equalized state, etc.). In one embodiment, the pressure of a fluid such as a gas within resilient portion 148 is equal to the pressure of the fluid flow along coolant flow path 112 during normal operation of the hydraulic system. A fluid flow having a characteristic (e.g., pressure, etc.) within the normal operating range may be provided along coolant flow path 112 during normal operation of the hydraulic system with which hydropneumatic actuator 100 is associated (e.g., during a pressurization phase, etc.). By way of example, the hydraulic system may include a pump (which may be any flow device or mechanism for moving fluid including a mechanical pump, a gravity pump, etc.) positioned to provide a fluid flow along coolant flow path 112. The pressure of the fluid flow provided by the pump may vary within the normal operating range. The normal range is greater than the threshold level, according to one embodiment, thereby reducing the likelihood that piston 102 may disengage from plug 104 during normal operation of the hydraulic system (e.g., during normal operation of the pump, etc.). By way of example, the threshold level may be between 25% and 30% of the normal range (e.g., between 25% and 30% of a lower bound of the normal range, between 25% and 30% of a midpoint of the normal range, between 25% and 30% of an upper bound of the normal range, etc.). During normal operation of the hydraulic system, piston 102, rod 116, and second piston 128 may remain in the second orientation. Compressible fluid 150 may also be in a compressed state.

Various conditions may generate a loss of flow along coolant flow path 112. The loss of flow along coolant flow path 112 or a loss of pump flow (e.g., a loss of flow along coolant flow path 112 otherwise provided by a pump, etc.) may define a loss of flow condition. The loss of flow condition may include a total loss of flow (e.g., with a pressure equal to zero, with a flow rate equal to zero, etc.). In other embodiments, the loss of flow condition includes a characteristic of the fluid flow equaling or falling below a breakaway value (e.g., a breakaway pressure, a breakaway flow rate, etc.). The loss of flow condition may occur due to mechanical or other failure of the flow device (e.g., pump, etc.) providing the flow along coolant flow path 112, due to a loss of power to the flow device providing the flow along coolant flow path 112, due to a failure of another component of the hydraulic system with which hydropneumatic actuator 100 is associated (e.g., due to a hydraulic line rupturing, due to a fitting leaking, etc.), or for still other reasons. The pressure and flow rate of the fluid flow along coolant flow path 112 may decrease (e.g., due to pump coast down, etc.) at a characteristic rate. In one embodiment, the pressure at inlet 108 (e.g., below second piston 128 according to the orientation shown in FIG. 2, FIG. 3, FIG. 5, and FIG. 6, etc.) may follow the pump coast down or other reduction to the square of the flow rate of the fluid flow along coolant flow path 112.

In one embodiment, the biasing member, which includes the resilient member that in some cases includes compressible fluid 150, stores energy during the pressurization phase that is released in response to the loss of flow condition during an actuation phase. The biasing member may be configured to apply a force that actuates piston 102, rod 116, and second piston 128 in response to the loss of flow condition. By way of example, the pressure, volume, or other characteristic of compressible fluid 150 may be specified (e.g., in an initial state, with piston 102, rod 116, and second piston 128 in the first orientation, with piston 102, rod 116, and second piston 128 in the second orientation, etc.) to provide a target force that actuates piston 102, rod 116, and second piston 128 in response to the loss of flow condition due to the loss of pressure force holding piston 102, rod 116 and second piston 128 in the operational second position. In one embodiment, the target force applied by compressible fluid 150 overcomes the coast down or decreased suction force associated with the pressure variations within the converging-diverging passages in response to the loss of flow condition. The target force may cooperate with weight forces or other forces acting in the same direction. The biasing member thereby actuates piston 102, rod 116, and second piston 128 into the first orientation from the second orientation. In one embodiment, at least one of piston 102 and plug 104 includes a feature configured to prevent adhesion there between (e.g., sticking, welding-type phenomena, etc.). By way of example, the feature may include a micro-spacer at least one of sized and positioned to prevent the entirety of surface 202 from contacting the entirety of surface 126.

Hydropneumatic actuator 100 may thereby apply output 120. The hydraulic system may employ output 120 to actuate a remote device in response to the loss of flow condition. In one embodiment, output 120 is used to actuate a switch, an alarm, a valve, another mechanical device, another electromechanical device, or any other appropriate warning or security device. Such a warning or security device may provide an alert relating to the loss of flow condition, may disengage another component of the hydraulic system (e.g., turn off a pump in response to a loss of flow condition initiated due to a ruptured hydraulic line, turn off a valve disposed immediately downstream of hydropneumatic actuator 100, etc.), or may perform still another function (e.g., actuate a remote component, etc.).

In one embodiment, first end 118 of rod 116 engages the mechanical device, the electromechanical device, or the other remote component. By way of example, first end 118 of rod 116 may be coupled to the mechanical device, the electromechanical device, or the other remote component. By way of another example, first end 118 of rod 116 may selectively engage (e.g., depress, contact, etc.) the mechanical device, the electromechanical device, or the other remote component in response to the condition of the fluid flow along coolant flow path 112.

According to the embodiment shown in FIG. 1, FIG. 2, FIG. 3, FIG. 4, FIG. 5, FIG. 6, and FIG. 7, orifices 142 are configured (e.g., sized, shaped, positioned, oriented, etc.) to restrict a flow of fluid 144 therethrough during the actuation phase. In one embodiment, the loss of flow condition involves a loss of pressure of the fluid flow along coolant flow path 112 and up-flow of second piston 128 (e.g., the side of second piston 128 oriented towards inlet 108, etc.) that decreases according to a profile of pressure versus time. From the normal operating range, the pressure of the fluid flow along the flow path may decrease (e.g., linearly, exponentially, logarithmically, otherwise nonlinearly, etc.). The pressure of fluid 144 within fluid portion 146 and the pressure of compressible fluid 150 within resilient portion 148 is related to (which can include equal to, etc.) the pressure of the fluid flow along coolant flow path 112. In one embodiment, the pressure of fluid 144 within fluid portion 146 and the pressure of compressible fluid 150 within resilient portion 148 are equal to the pressure of the fluid flow along coolant flow path 112 at the onset of the loss of flow condition. The pressure of the fluid flow along coolant flow path 112 and toward inlet 108 of second piston 128 (e.g., according to the orientation shown in FIG. 2, FIG. 3, FIG. 5, and FIG. 6, etc.) may decay rapidly. Such rapid decay may be characterized by a time constant.

A reduction in the pressure of the fluid flow along coolant flow path 112 relative to the pressure of fluid 144 within fluid portion 146 and the pressure of compressible fluid 150 within resilient portion 148 may induce a pressure differential across second piston 128 and initiate a fluid flow of fluid 144 through orifices 142. The configuration of orifices 142 restricts the flow of fluid 144 into first region 136 such that compressible fluid 150 applies a force to second piston 128, rod 116, and piston 102 (e.g., toward inlet 108 or below according to the orientation shown in FIG. 3). At least one of the force due to the fluid flow acting on piston 102 (e.g., relating to the pressure of the fluid flow and the cross-sectional area of piston 102, etc.); the weight forces of piston 102, rod 116, and second piston 128; and the suction forces due to the fluid flow through the converging-diverging passages oppose the force generated by compressible fluid 150. The fluid flow along coolant flow path 112 (e.g., pressure, flow rate, etc.) continues to decay, thereby increasing the pressure differential across second piston 128, until it reaches the breakaway value, where the force applied by compressible fluid 150 overcomes the opposing forces. The opposing forces may be due to at least one of the fluid flow acting on piston 102; the weight forces of piston 102, rod 116, and second piston 128 (if gravity can assist in that orientation of the device); the suction forces due to the fluid flow through the converging-diverging passages; and the force applied by an optional spring or other biasing member. The biasing member may thereafter rapidly actuate or translate (e.g., accelerate, etc.) Piston 102, rod 116, and second piston 128 toward the first orientation such that hydropneumatic actuator 100 provides output 120.

After actuation of piston 102, rod 116, and second piston 128 into the first orientation, an applied fluid flow along coolant flow path 112 having a characteristic greater than the threshold value may again actuate piston 102, rod 116, and second piston 128 into the second orientation. In one embodiment, hydropneumatic actuator 100 may thereby seamlessly transition between providing output 120 in a first direction (e.g., toward outlet 110 or above according to the orientation shown in FIG. 3) and providing output 120 in a second direction (e.g., toward inlet 108 or downward according to the orientation shown in FIG. 2). hydropneumatic actuator 100 may respond to a loss of flow condition and thereafter return to normal operation without needing to be reset, reconfigured, or replaced. By way of example, the response of hydropneumatic actuator 100 to a loss of flow condition is automatic and passive (e.g., mechanical and independent of electronic feedback, etc.), and the return of hydropneumatic actuator 100 to normal operation after a loss of flow condition is resolved is also automatic and passive. Operation of hydropneumatic actuator 100 may not require the use of electricity, and as such would provide a response even in the event of a loss of electricity that results in a reduction or loss of fluid flow in coolant flow path 112.

Figure 13:
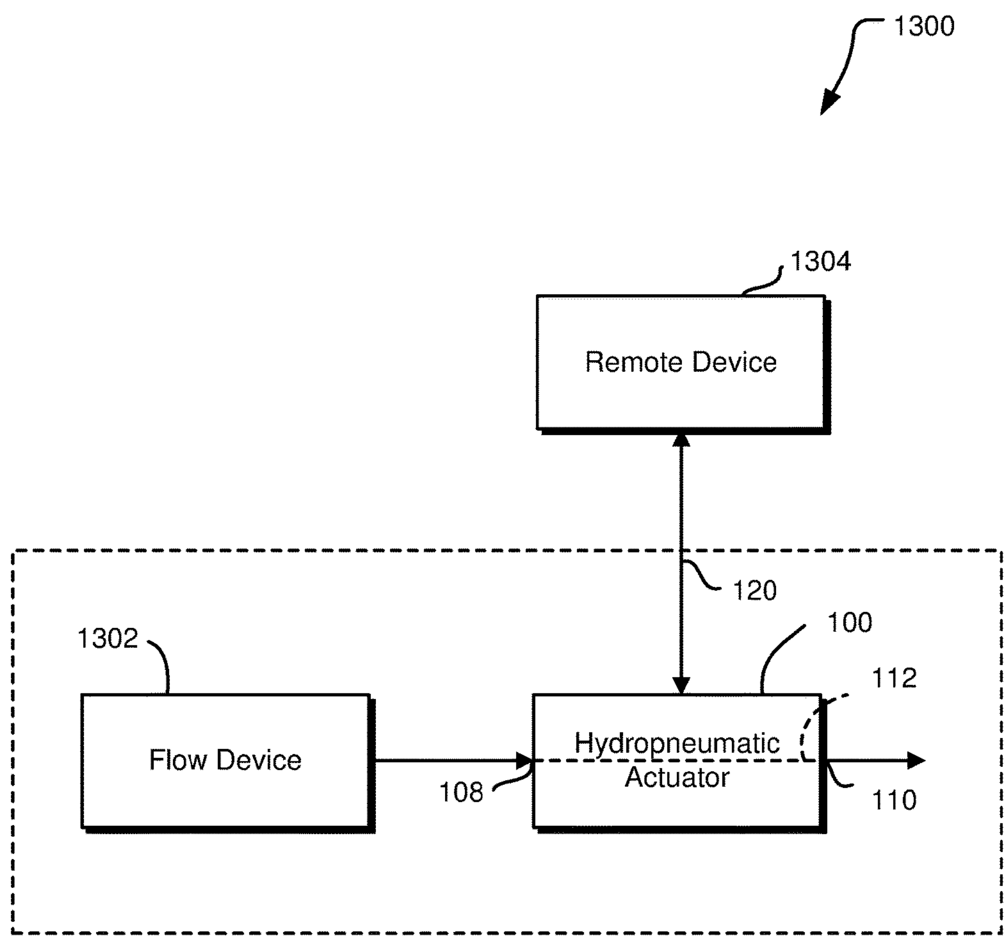
FIG. 13 illustrates an aspect of the subject matter in accordance with one embodiment.
Figure 14:
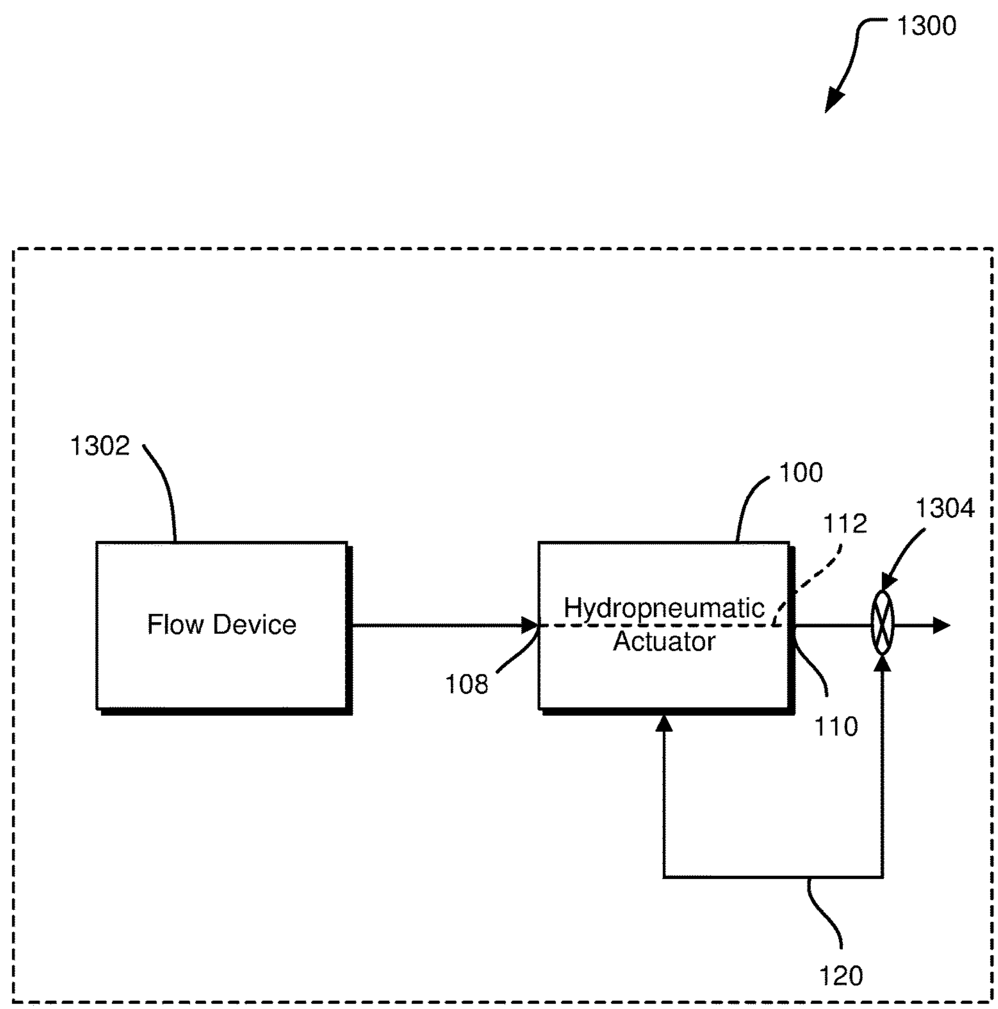
FIG. 14 illustrates an aspect of the subject matter in accordance with one embodiment.
Figure 15:
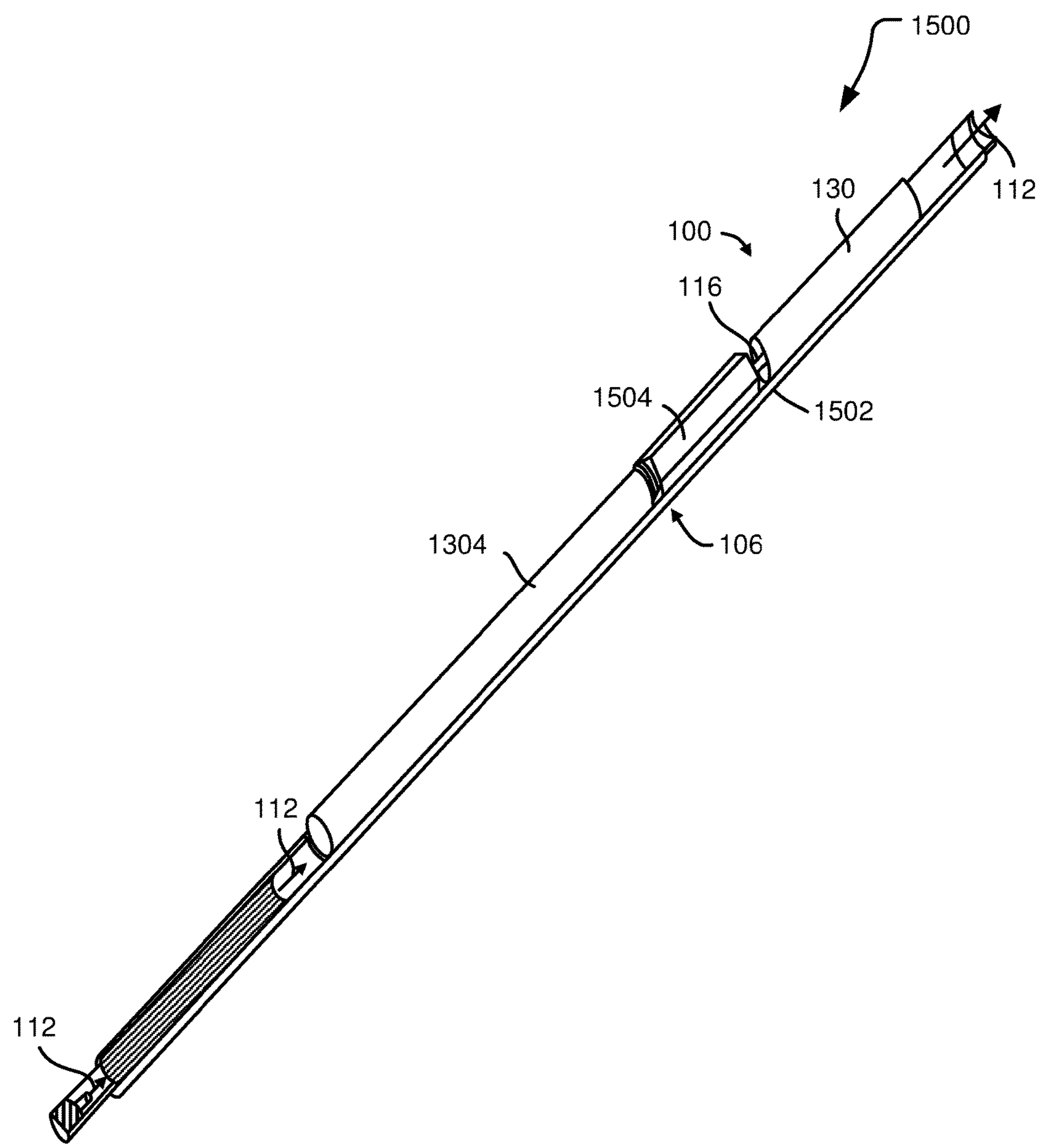
FIG. 15 is a perspective view of a control assembly 1500 for a nuclear reactor, according to one embodiment.
Figure 16:
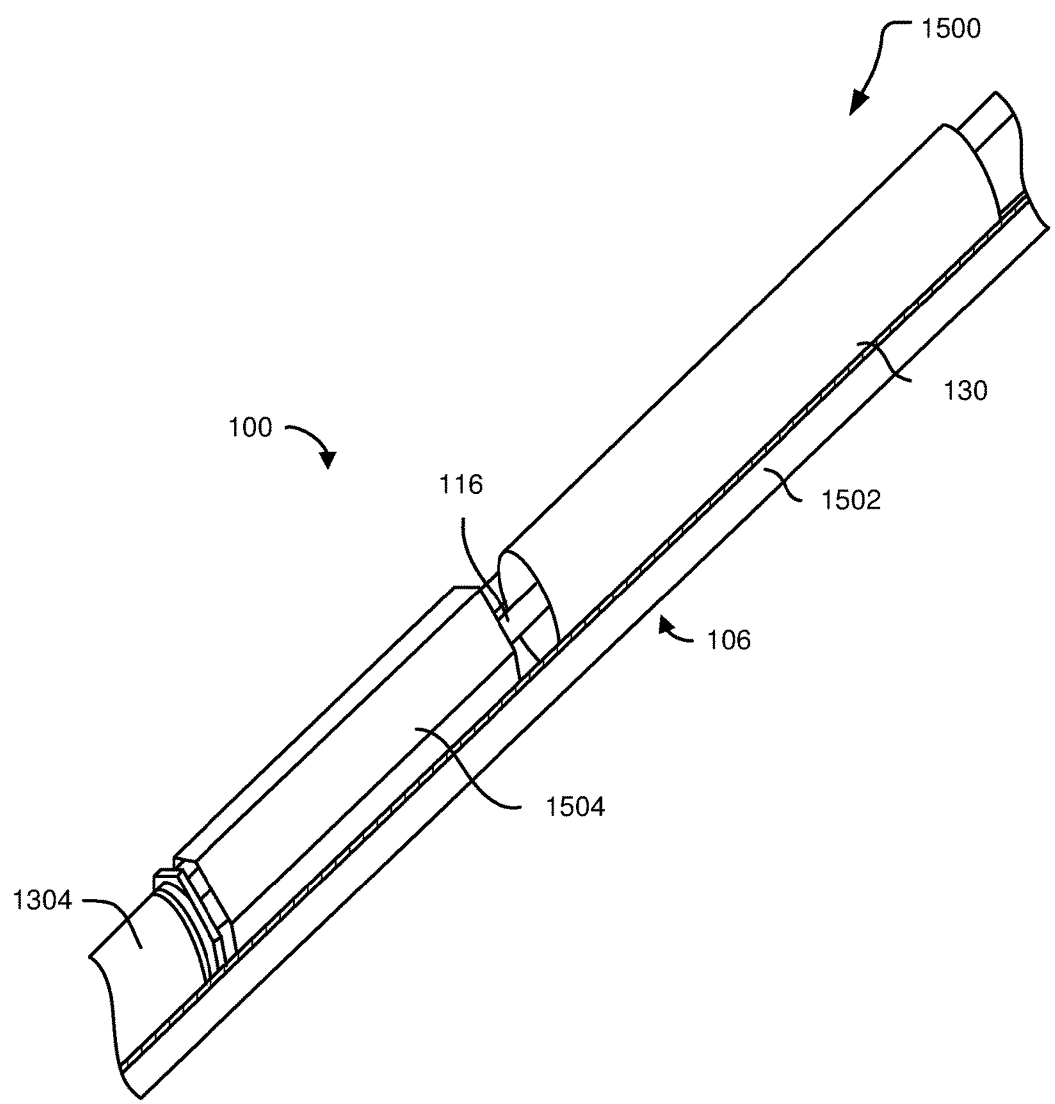
FIG. 16 is a perspective view of a control assembly 1500 for a nuclear reactor, according to one embodiment.
Figure 17:
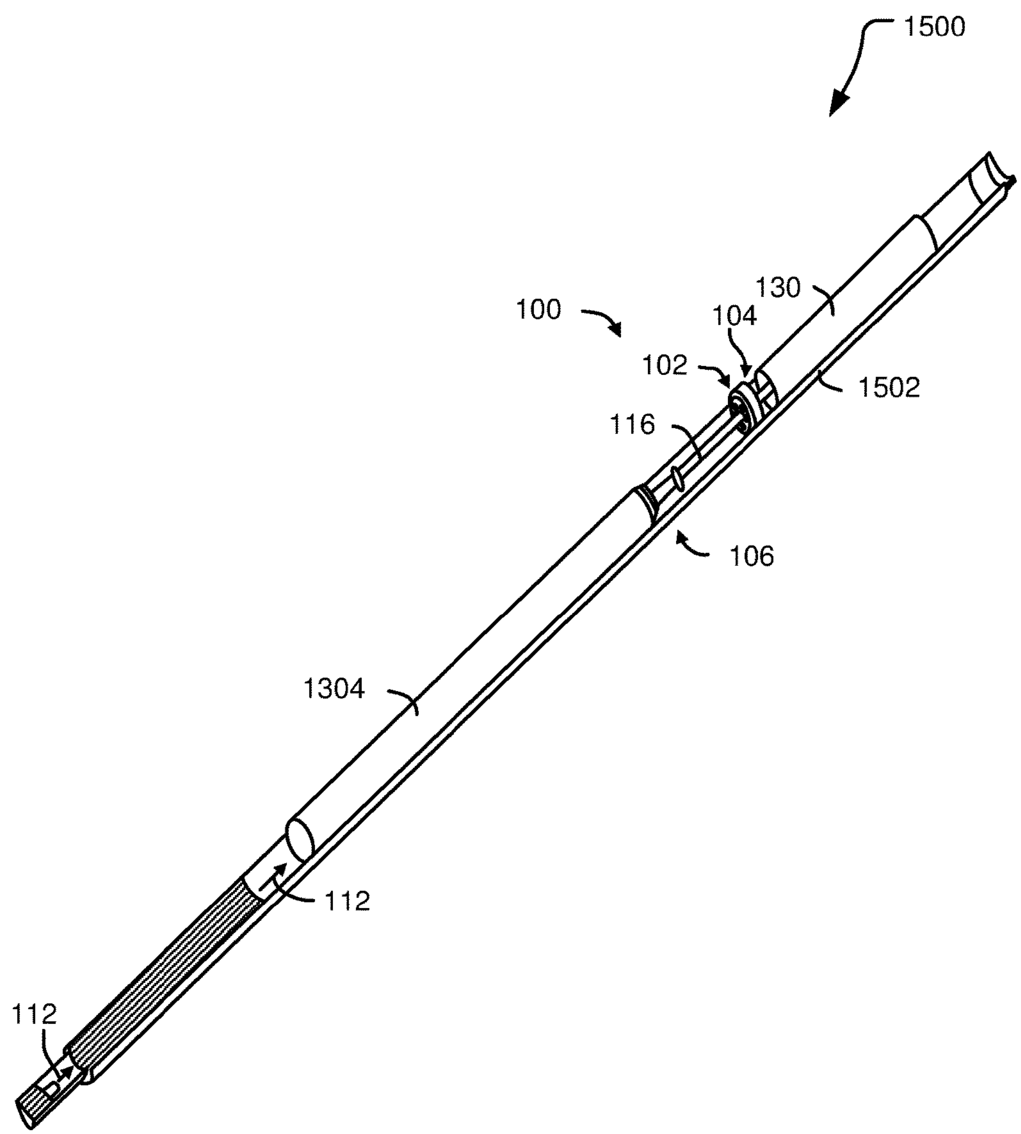
FIG. 17 is a perspective view of a control assembly 1500 for a nuclear reactor, according to one embodiment.
Figure 18:
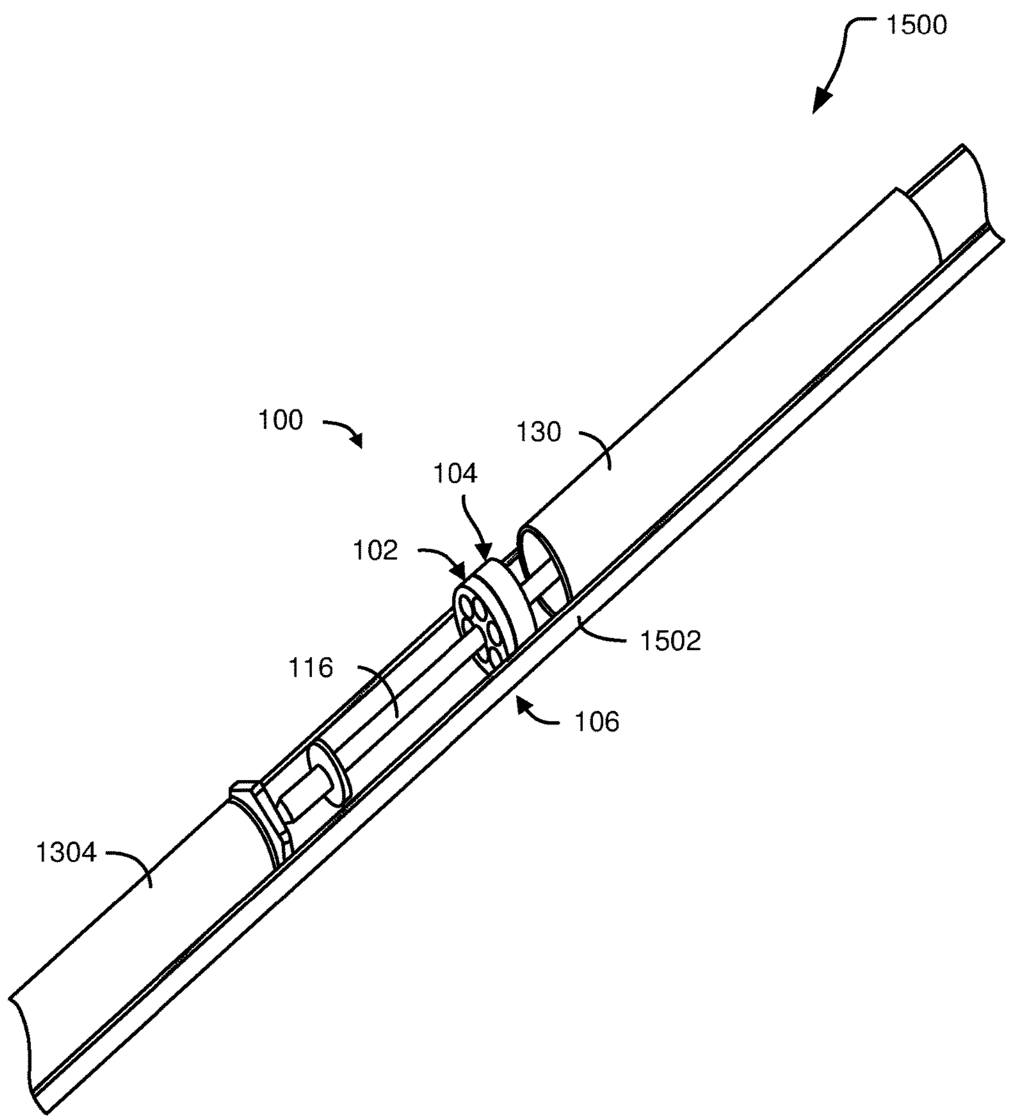
FIG. 18 is a perspective view of a control assembly 1500 for a nuclear reactor, according to one embodiment.

Referring next to the embodiment shown in FIG. 13 and FIG. 14, a hydraulic system, shown as hydraulic system 1300, includes hydropneumatic actuator 100. As shown in FIG. 13 and FIG. 14, flow device 1302 is coupled to hydropneumatic actuator 100. By way of example, flow device 1302 may include a pump, a high pressure reservoir, or still another device.

In one embodiment, flow device 1302 provides a fluid flow along a flow path. By way of example, flow device 1302 may provide a fluid flow to inlet 108 of hydropneumatic actuator 100. Hydropneumatic actuator 100 defines coolant flow path 112 between inlet 108 and outlet 110. Accordingly, the fluid flow provided to inlet 108 is provided at outlet 110.

According to the embodiment shown in FIG. 13, hydropneumatic actuator 100 provides output 120 to remote device 1304 that is associated with hydraulic system 1300. According to the embodiment shown in FIG. 14, hydraulic system 1300 includes remote device 1304. Output 120 provided by hydropneumatic actuator 100 varies based on the fluid flow along coolant flow path 112, according to one embodiment. By way of example, a rod disposed within an inner volume of a housing of hydropneumatic actuator 100 may have an end that is configured to engage remote device 1304. In one embodiment, hydropneumatic actuator 100 is configured to actuate remote device 1304 at a rate that is greater than a characteristic coast down rate associated with flow device 1302 (e.g., a flow provided due to the inertia of a pump, etc.). The actuation rate of remote device 1304 (e.g., within six to twelve seconds, etc.) may occur faster than actuation using a thermal response (e.g., within twelve to twenty-four seconds, etc.).

As shown in FIG. 14, remote device 1304 includes a valve (e.g., a ball valve, etc.). Accordingly, hydropneumatic actuator 100 may provide output 120 to close the valve in direct response to a loss of flow condition. The valve may thereby operate within hydraulic system 1300 as a check valve. Flow from the valve may be used to power various other hydraulic components. In still other embodiments, hydropneumatic actuation operates as a blowout preventer (e.g., in an underwater oil system, etc.) where a downstream loss of pressure actuates a valve.

In other embodiments, remote device 1304 includes a warning or security device which may include one or more of a switch, an alarm, another mechanical device, or another electromechanical device. Such warning or security devices may provide an alert relating to the loss of flow condition, may disengage another component of the hydraulic system (e.g., turn off flow device 1302 in response to a loss of flow condition initiated due to a ruptured hydraulic line, turn off a valve disposed immediately downstream of hydropneumatic actuator 100, turn off another valve, etc.), or may perform still another function (e.g., actuate a remote component, etc.). Output 120 actuates remote device 1304, according to one embodiment.

In still other embodiments, hydraulic system 1300 includes other hydraulic components (e.g., rotational actuators, linear actuators, etc.) coupled to flow device 1302. By way of example, the other hydraulic components may be coupled to flow device 1302 in series with hydropneumatic actuator 100. The fluid flow may be provided from outlet 110 of hydropneumatic actuator 100 to operate such devices (e.g., directly, with one or more intermediate valves, etc.). In other embodiments, the fluid flow is provided to operate such devices and thereafter flows to inlet 108. By way of another example, the other hydraulic components may be coupled to flow device 1302 in parallel with hydropneumatic actuator 100. By way of example, the fluid flow along coolant flow path 112 may be only a portion of the total fluid output provided by flow device 1302. Such parallel plumbing of hydropneumatic actuator 100 may facilitate retrofitting hydropneumatic actuator 100 into existing hydraulic system 1300.

Figure 19:
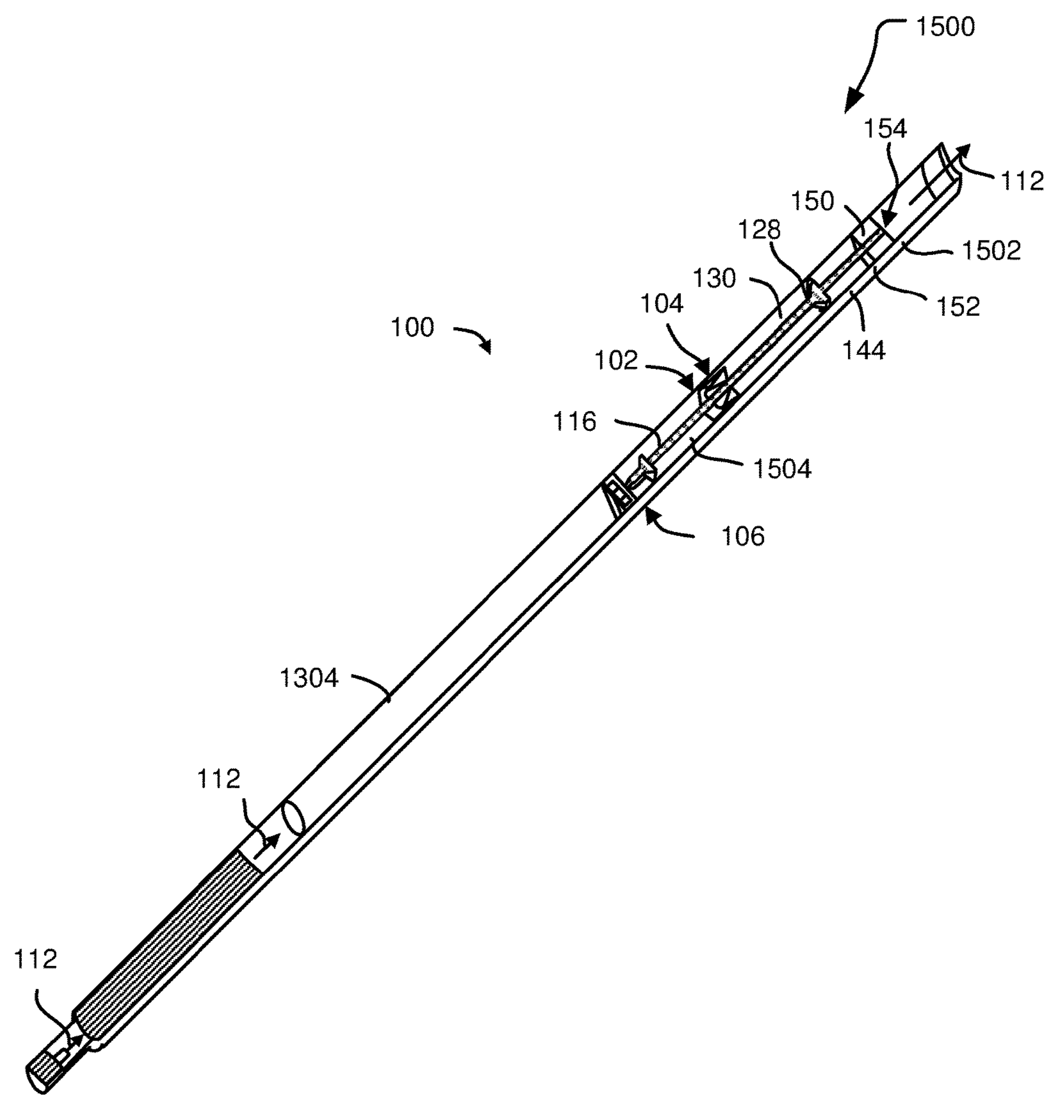
FIG. 19 is a sectional view of a control assembly 1500 for a nuclear reactor, according to one embodiment.
Figure 20:
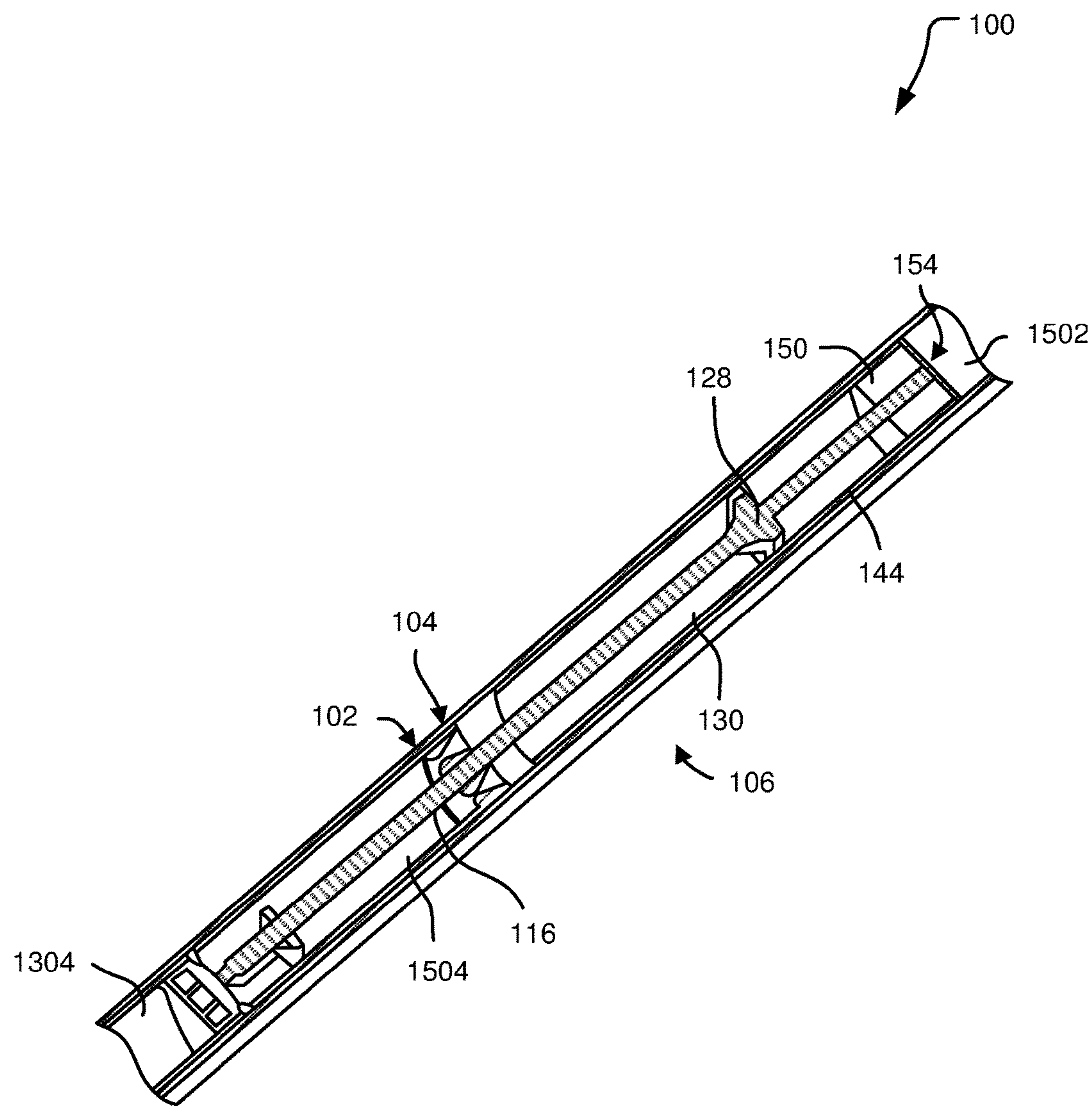
FIG. 20 is a sectional view of a control assembly 1500 for a nuclear reactor, according to one embodiment.
Figure 21:
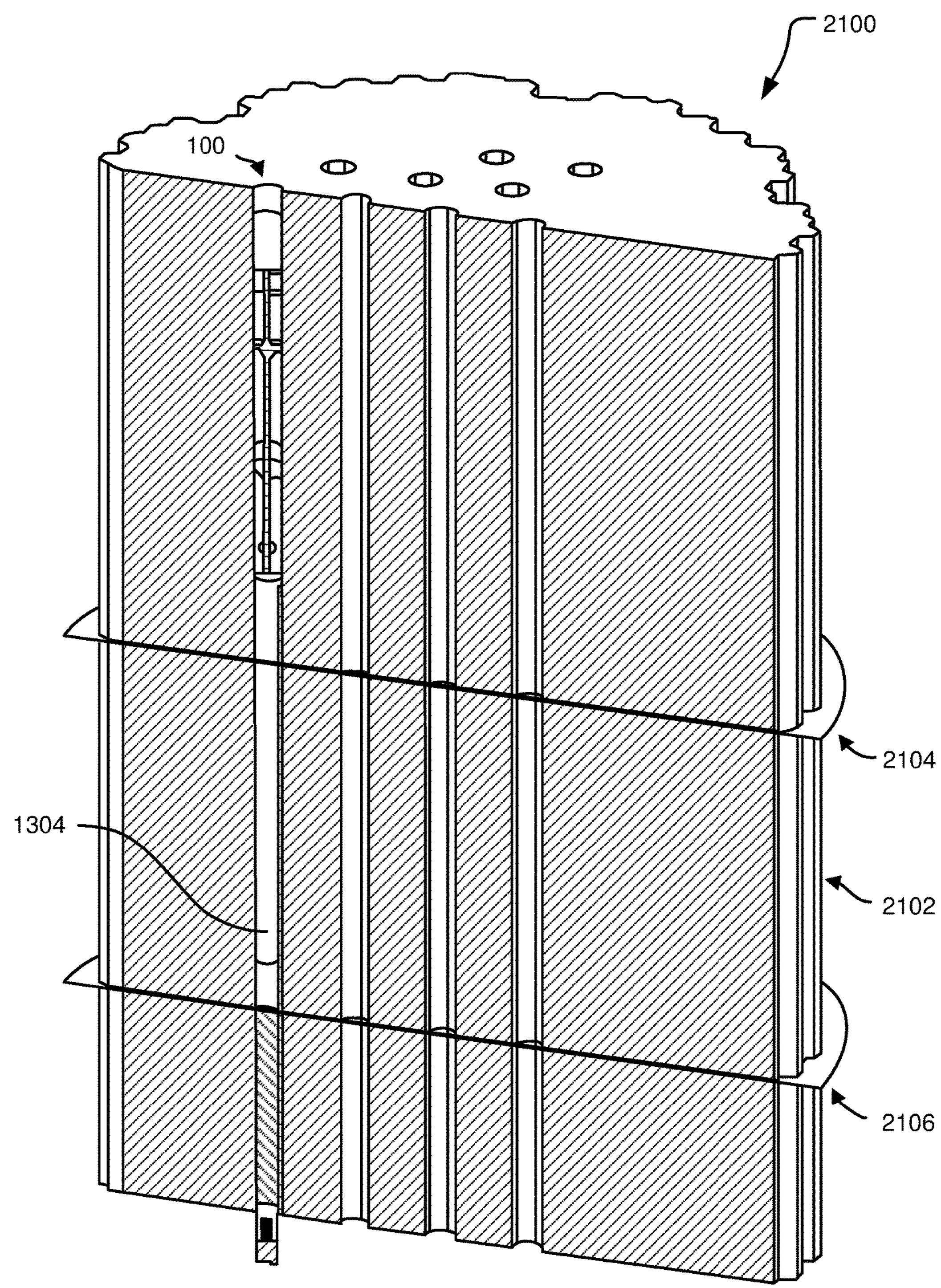
FIG. 21 is a perspective view of a control assembly 1500 provided as part of a nuclear reactor 2100, according to one embodiment.
Figure 22:
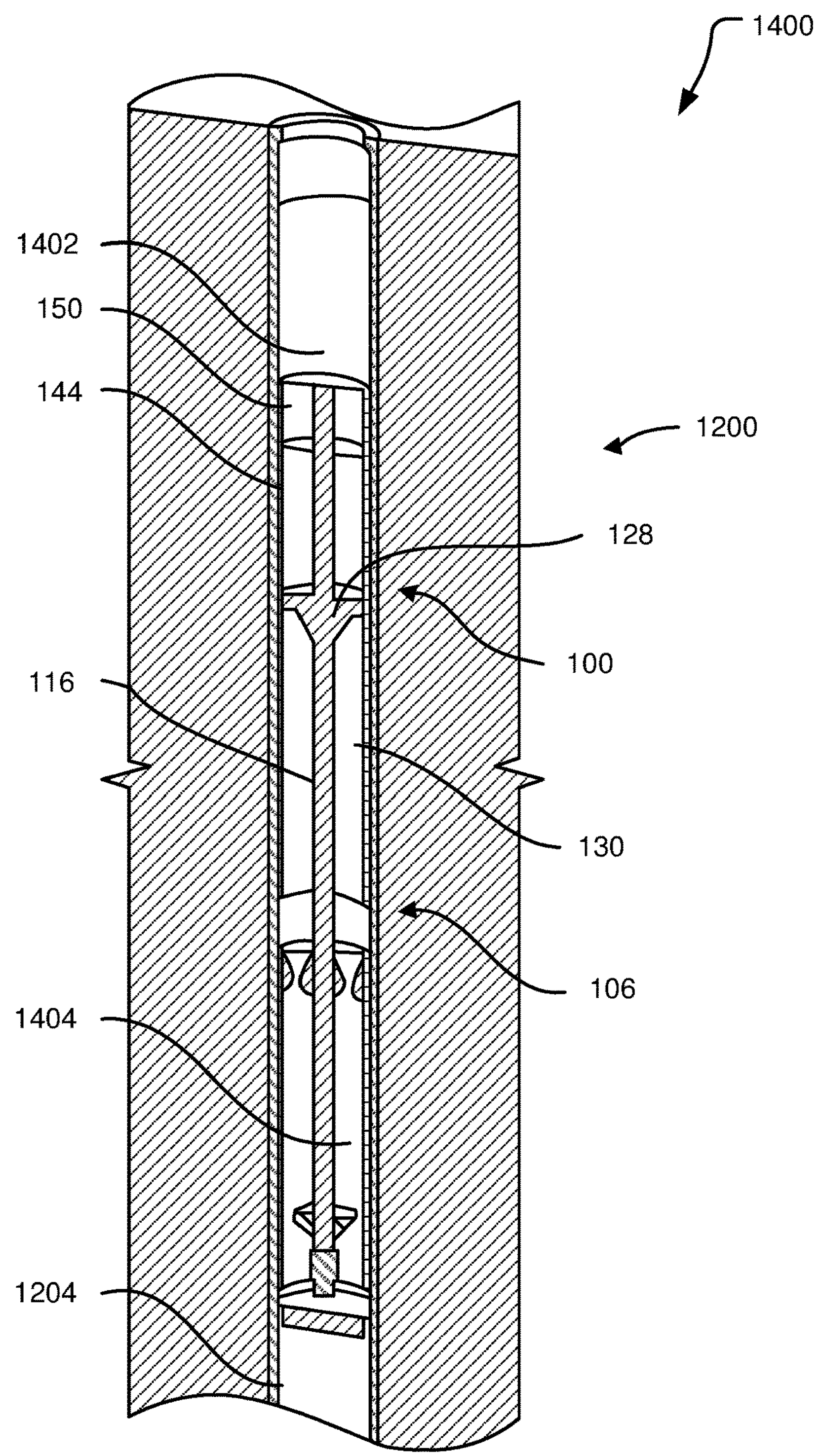
FIG. 22 is a perspective view of a control assembly 1500 provided as part of a nuclear reactor 2100, according to one embodiment.

Referring next to the embodiment shown in FIG. 15, FIG. 16, FIG. 17, FIG. 18, FIG. 19, FIG. 20, FIG. 21, and FIG. 22, hydropneumatic actuator 100 forms a portion of a control assembly 1500 for a nuclear reactor, shown as nuclear reactor 2100. In one embodiment, nuclear reactor 2100 includes a fuel assembly having a duct containing nuclear fuel. As shown in FIG. 21, the nuclear fuel is disposed within a fuel region, shown as fuel region 2102. In one embodiment, fuel region 2102 extends between a first bound (e.g., upper bound, etc.), shown as first bound 2104, and a second bound (e.g., lower bound, etc.), shown as second bound 2106. Nuclear reactor 2100 may include a pump in fluid communication with the duct of the fuel assembly and housing 106 of hydropneumatic actuator 100. In one embodiment, the pump is configured to provide a coolant flow along a coolant flow path. Housing 106 of hydropneumatic actuator 100 may have an inner volume that defines at least a portion of the coolant flow path (i.e., coolant flow path 112 may define a portion of the coolant flow path along which the pump of nuclear reactor 2100 provides a coolant flow, etc.).

As shown in FIG. 15, FIG. 16, FIG. 17, FIG. 18, FIG. 19, FIG. 20, FIG. 21, and FIG. 22, the control assembly 1500 includes remote device 1304. In one embodiment, remote device 1304 includes a neutron modifying material. As shown in FIG. 19 and FIG. 20, first end 118 of rod 116 is configured (e.g., shaped, etc.) to engage the neutron modifying material. A coolant flow along coolant flow path 112 and through the converging-diverging passages generates a suction force (e.g., due to the Venturi effect, etc.) between piston 102 and plug 104 that secures piston 102, rod 116, second piston 128, and the neutron modifying material during normal operation of nuclear reactor 2100 (e.g., during normal, uninterrupted operation of a coolant pump associated with nuclear reactor 2100, etc.). By way of example, a coolant flow above the threshold level may elevate the neutron modifying material from fuel region 2102, and the suction forces may retain the neutron modifying material in such a withdrawn position relative to fuel region 2102. The suction forces may retain the neutron modifying material even as the coolant flow experiences pressure variations within a normal range (e.g., unintended variations, variations to accommodate different power levels of nuclear reactor 2100, etc.).

In one embodiment, the biasing member of hydropneumatic actuator 100 (e.g., compressible fluid 150 within cup 130, etc.) is positioned or otherwise configured to apply a force that selectively repositions piston 102, rod 116, and the neutron modifying material in response to a loss of pump flow without scram condition. By way of example, the biasing member of hydropneumatic actuator 100 (e.g., compressible fluid 150 within cup 130, etc.) may be positioned or otherwise configured to apply a force that inserts the neutron modifying material into fuel region 2102 in response to a loss of pump flow without scram condition. The force applied by compressible fluid 150 may overcome the suction forces associated with the pressure variations within the converging-diverging passages in response to the loss of pump flow without scram condition (e.g., facilitated by orifices 142 defined at least partially by second piston 128 restricting a flow of the liquid coolant therethrough, etc.). The control assembly 1500 may thereby rapidly introduce the neutron modifying material into the fuel region 2102 of nuclear reactor 2100 to rapidly introduce negative reactivity therein.

Referring still to the embodiment shown in FIG. 15, FIG. 16, FIG. 17, FIG. 18, FIG. 19, FIG. 20, FIG. 21, and FIG. 22, housing 106 includes a duct, shown as duct 1502, and an insert, shown as duct insert 1504. In one embodiment, duct 1502 has a hexagonal cross-sectional shape. Duct insert 1504 may have an internal cross-sectional shape that corresponds with that of piston 102 and plug 104 (e.g., circular, etc.) and an external cross-sectional shape that corresponds with that of duct 1502. Duct insert 1504 may thereby prevent bypass flow along duct 1502 around piston 102 and plug 104. Duct insert 1504 may be welded to duct 1502. In other embodiments, housing 106 does not include duct insert 1504. By way of example, piston 102 and plug 104 may have a cross-sectional shape (e.g., hexagonal, etc.) that corresponds with the cross-sectional shape of duct 1502 (e.g., hexagonal, etc.).

FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, and FIG. 44 are a series of flowcharts depicting implementations. For ease of understanding, the flowcharts are organized such that the initial flowcharts present implementations via an example implementation and thereafter the following flowcharts present other implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 23, FIG. 24, FIG. 25, FIG. 26, FIG. 27, FIG. 28, FIG. 29, FIG. 30, and FIG. 31 provide illustrative flow diagrams for a method of manufacturing a control assembly for a nuclear reactor, shown as method 2300, according to one embodiment. Although the method is presented as a sequence of steps for illustrative purposes, this sequence does not limit the scope of the claimed methods, and those of ordinary skill in the art will be aware of modifications and variations that may be made to the order, timing, etc. of the sequence.

Figure 23:
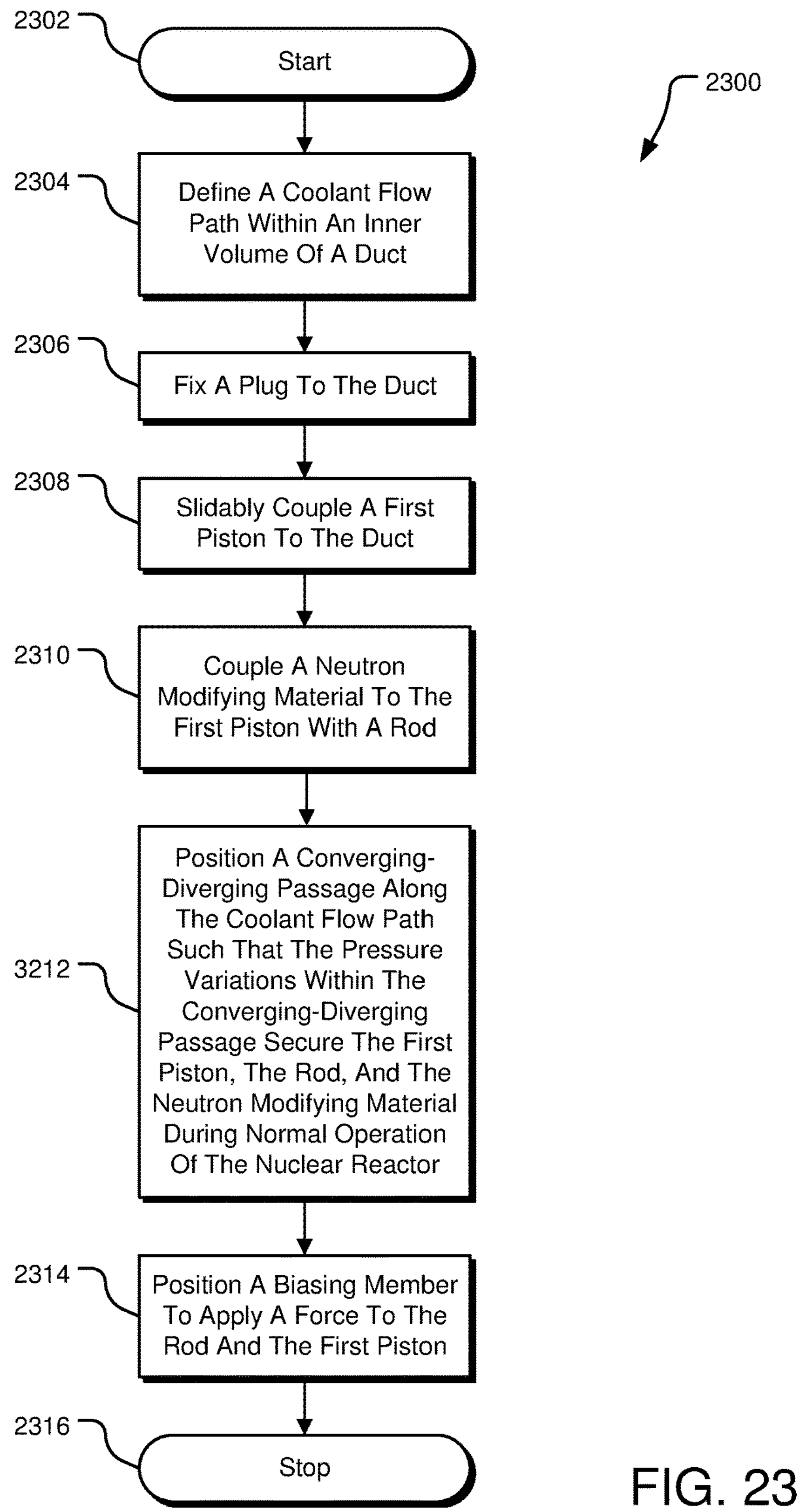
FIG. 23 is a schematic diagram of a method 2300 of manufacturing a control assembly for a nuclear reactor, according to one embodiment.

Referring to FIG. 23, method 2300 starts at start block 2302. At block 2304, a coolant flow path is defined within an inner volume of a duct. At block 2306, a plug is fixed to the duct. At block 2308, a first piston is slidably coupled to the duct. In one embodiment, the plug and the first piston define a pair of cooperating apertures that forms at least a portion of a converging-diverging passage. At block 2310, a neutron modifying material is coupled to the first piston with a rod. At block 2312, a converging-diverging passage is positioned along the coolant flow path such that pressure variations within the converging-diverging passage secure the first piston, the rod, and the neutron modifying material during normal operation of the nuclear reactor. At block 2314, a biasing member is positioned to apply a force to the rod and the first piston. In one embodiment, the force releases the first piston, the rod, and the neutron modifying material in response to a loss of pump flow without scram condition. In one embodiment, method 2300 stops at done block 2316. In other embodiments, method 2300 continues. Additional and modified method steps are set forth below by way of non-limiting example.

Figure 24:
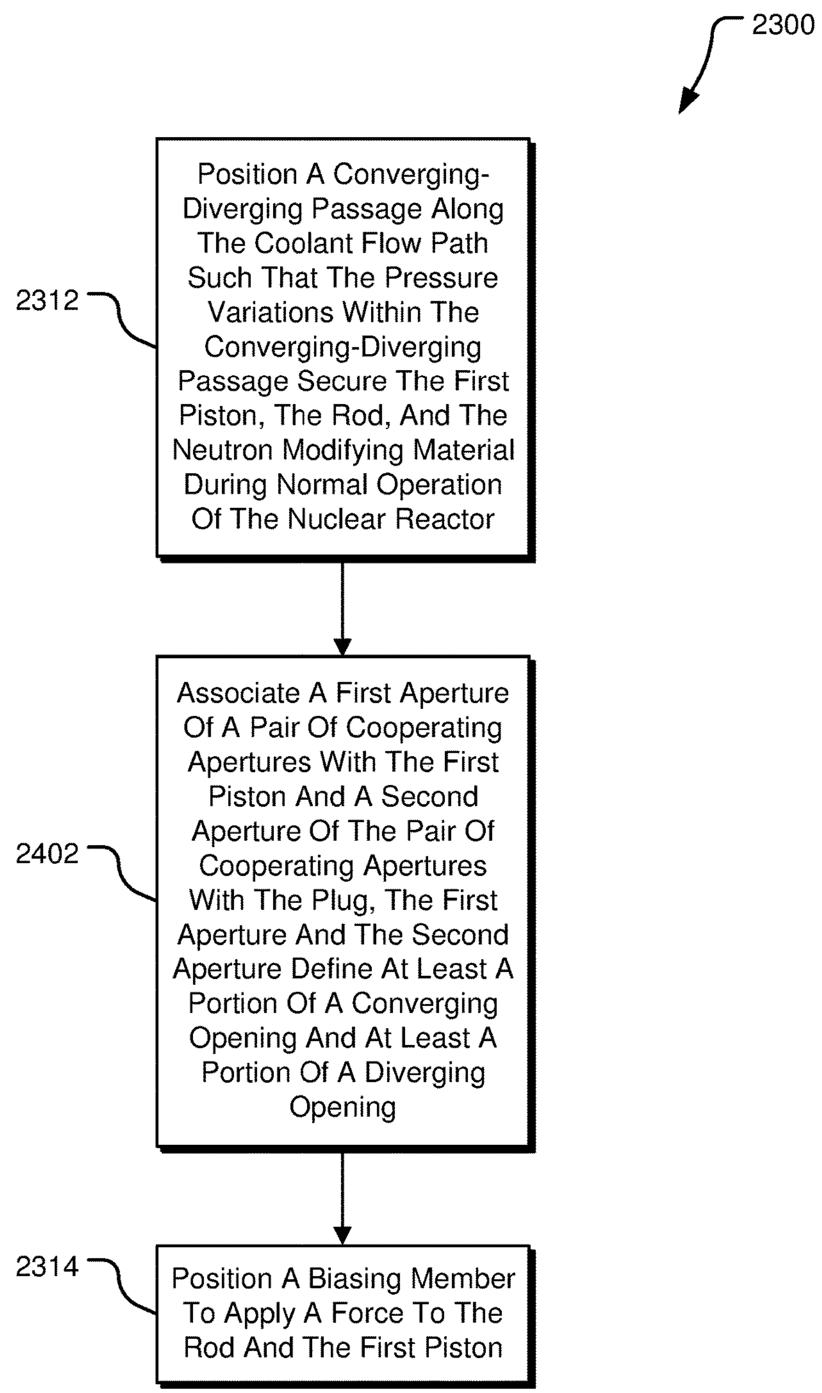
FIG. 24 is a schematic diagram of a method 2300 of manufacturing a control assembly for a nuclear reactor, according to one embodiment.

Referring to FIG. 24, a first aperture of the pair of cooperating apertures is associated with the first piston and a second aperture of the pair of cooperating apertures is associated with the plug, the first aperture and the second aperture defining at least a portion of a converging opening and at least a portion of a diverging opening at block 2402.

Figure 25:
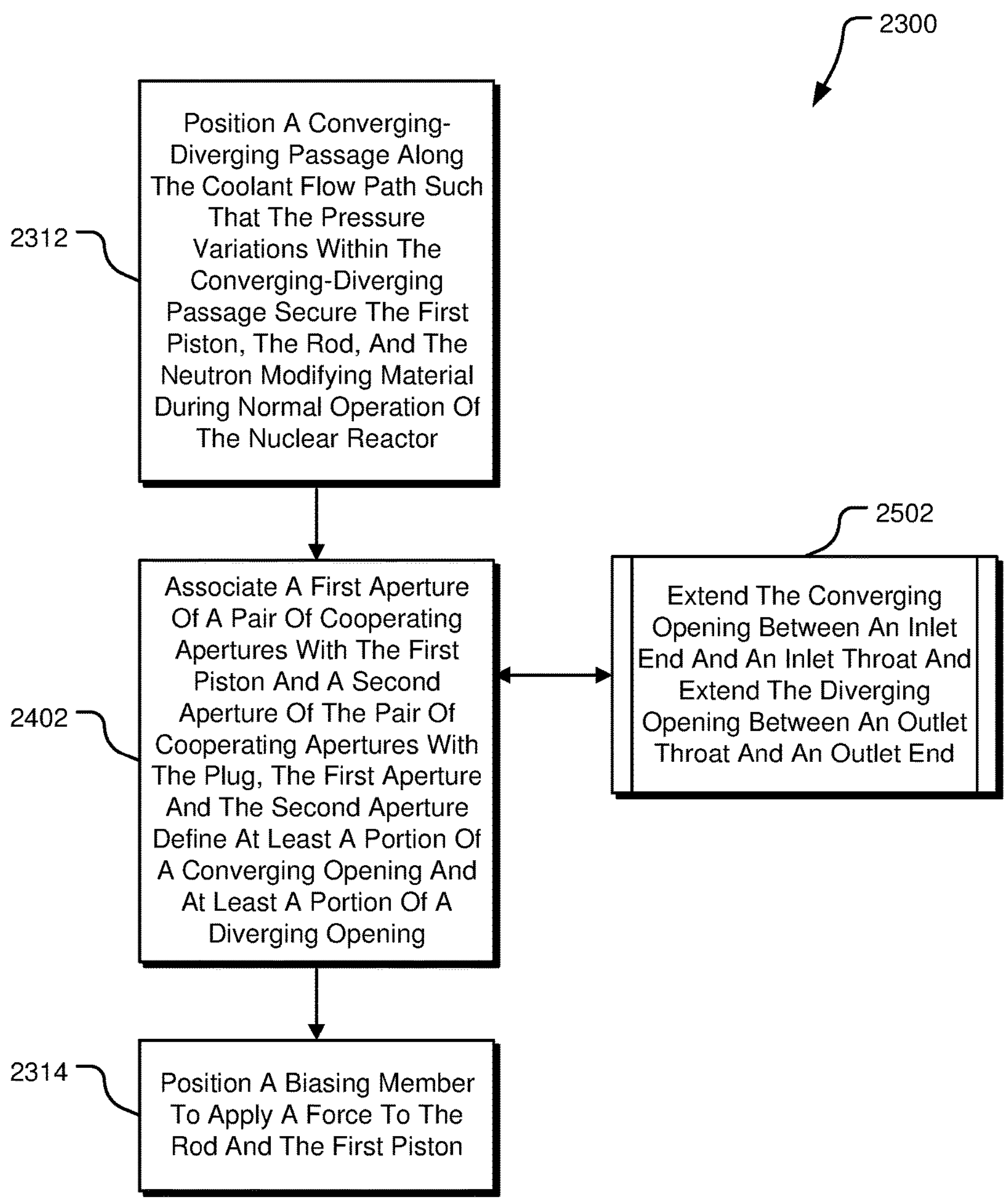
FIG. 25 is a schematic diagram of a method 2300 of manufacturing a control assembly for a nuclear reactor, according to one embodiment.

Referring to FIG. 25, associating the first aperture of the pair of cooperating apertures and associating the second aperture of the pair of cooperating apertures at block 2402 may include extending the converging opening between an inlet end and a throat and extending the diverging opening between a throat and an outlet end at block 2502.

Figure 26:
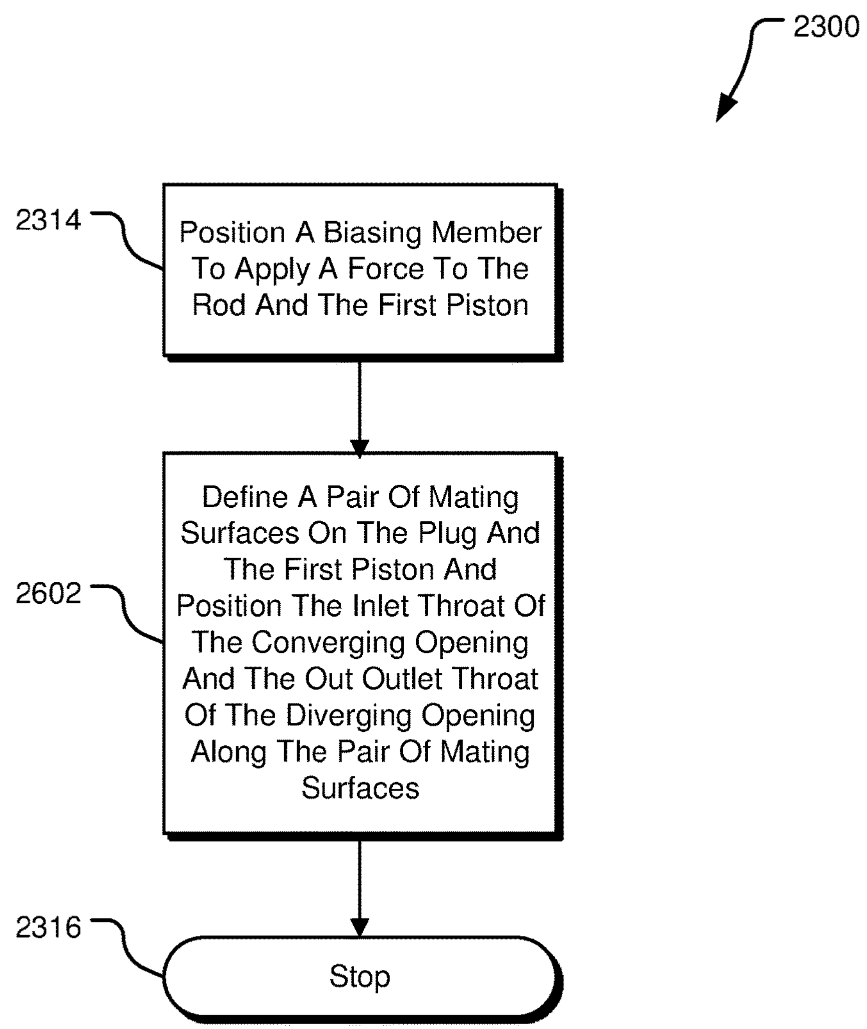
FIG. 26 is a schematic diagram of a method 2300 of manufacturing a control assembly for a nuclear reactor, according to one embodiment.

Referring to FIG. 26, a pair of mating surfaces are defined on the plug and the first piston and the throat of the converging opening and the throat of the diverging opening are positioned along the pair of mating surfaces at block 2602.

Figure 27:
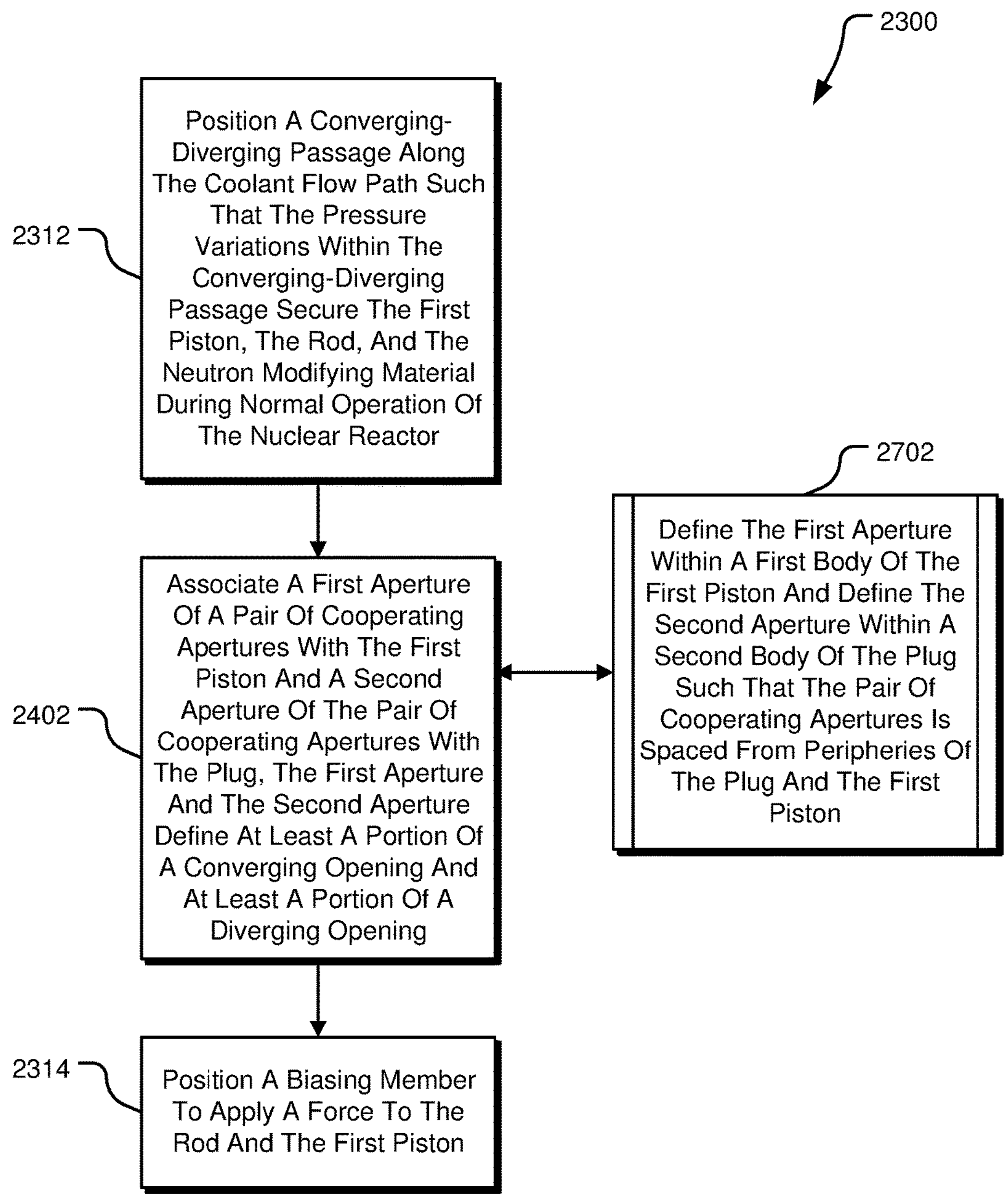
FIG. 27 is a schematic diagram of a method 2300 of manufacturing a control assembly for a nuclear reactor, according to one embodiment.

Referring to FIG. 27, associating the first aperture of the pair of cooperating apertures and associating the second aperture of the pair of cooperating apertures at block 2402 may include defining the first aperture within a first body of the first piston and defining the second aperture within a second body of the plug such that the pair of cooperating apertures is spaced from peripheries of the plug and the first piston at block 2702.

Figure 28:
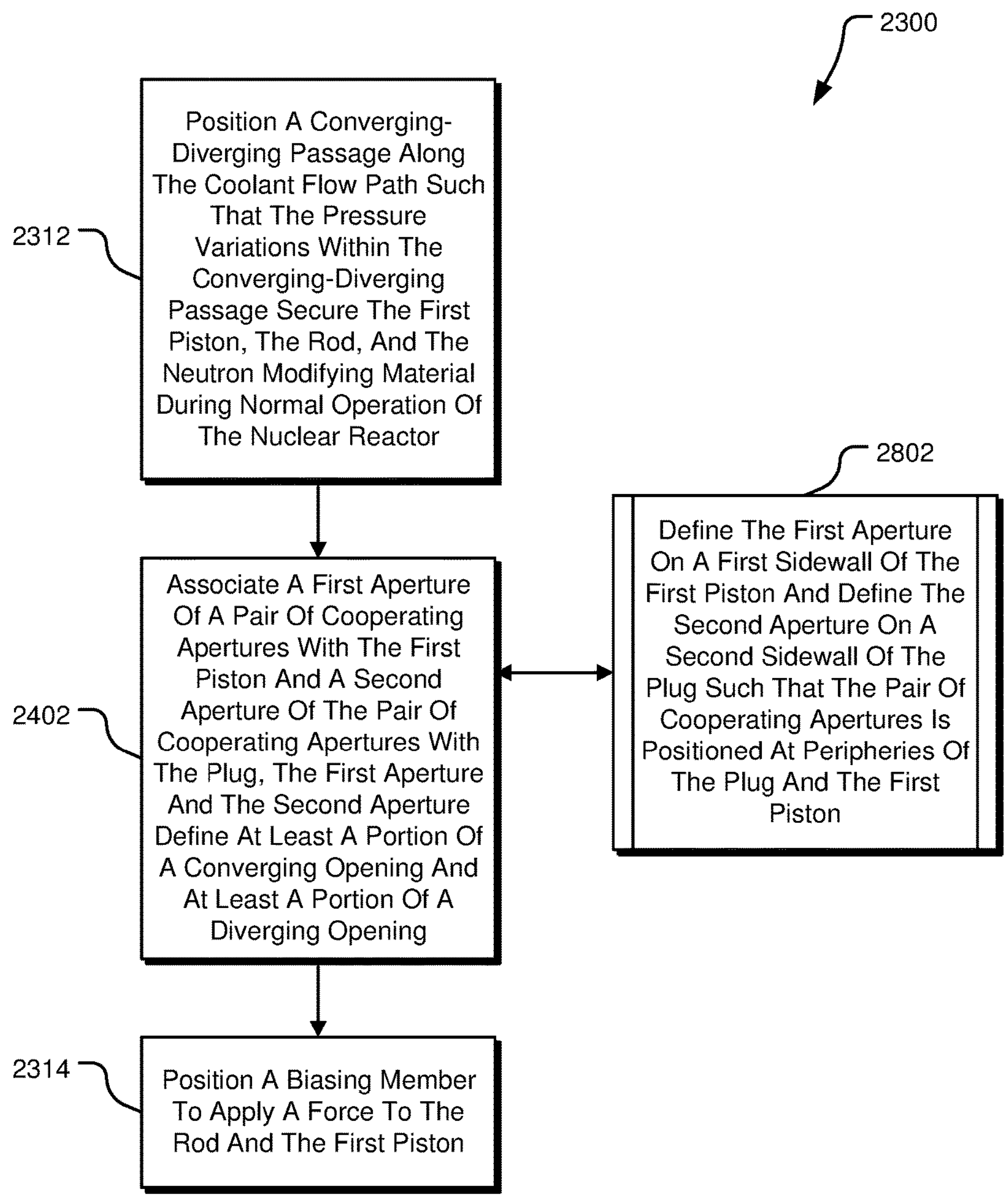
FIG. 28 is a schematic diagram of a method 2300 of manufacturing a control assembly for a nuclear reactor, according to one embodiment.

Referring to FIG. 28, associating the first aperture of the pair of cooperating apertures and associating the second aperture of the pair of cooperating apertures at block 2402 may include defining the first aperture on a first sidewall of the first piston and defining the second aperture on a second sidewall of the plug such that the pair of cooperating apertures is positioned at peripheries of the plug and the first piston at block 2802.

Figure 29:
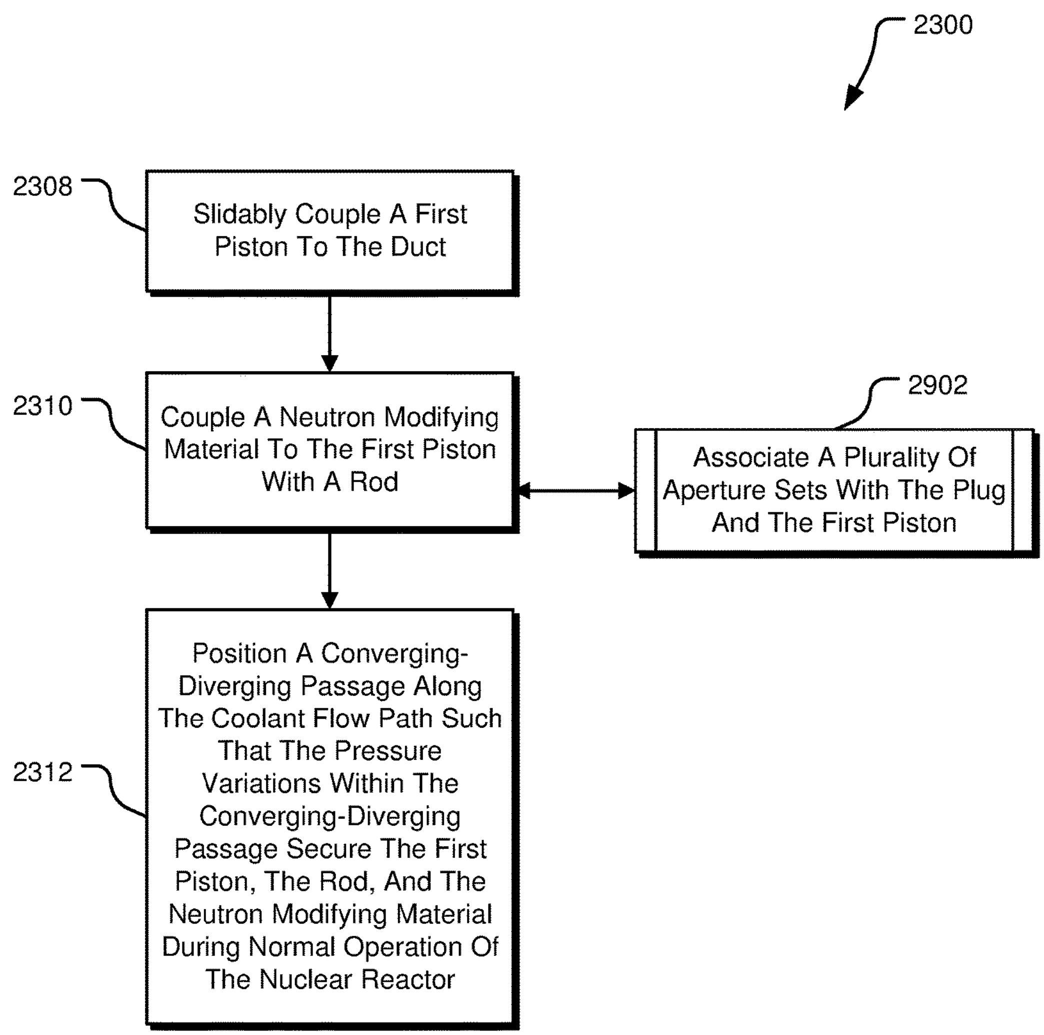
FIG. 29 is a schematic diagram of a method 2300 of manufacturing a control assembly for a nuclear reactor, according to one embodiment.

Referring to FIG. 29, in some embodiments, positioning the converging-diverging passage along the coolant flow path at block 2312 includes associating a plurality of aperture sets with the plug and the first piston at block 2902.

Figure 30:
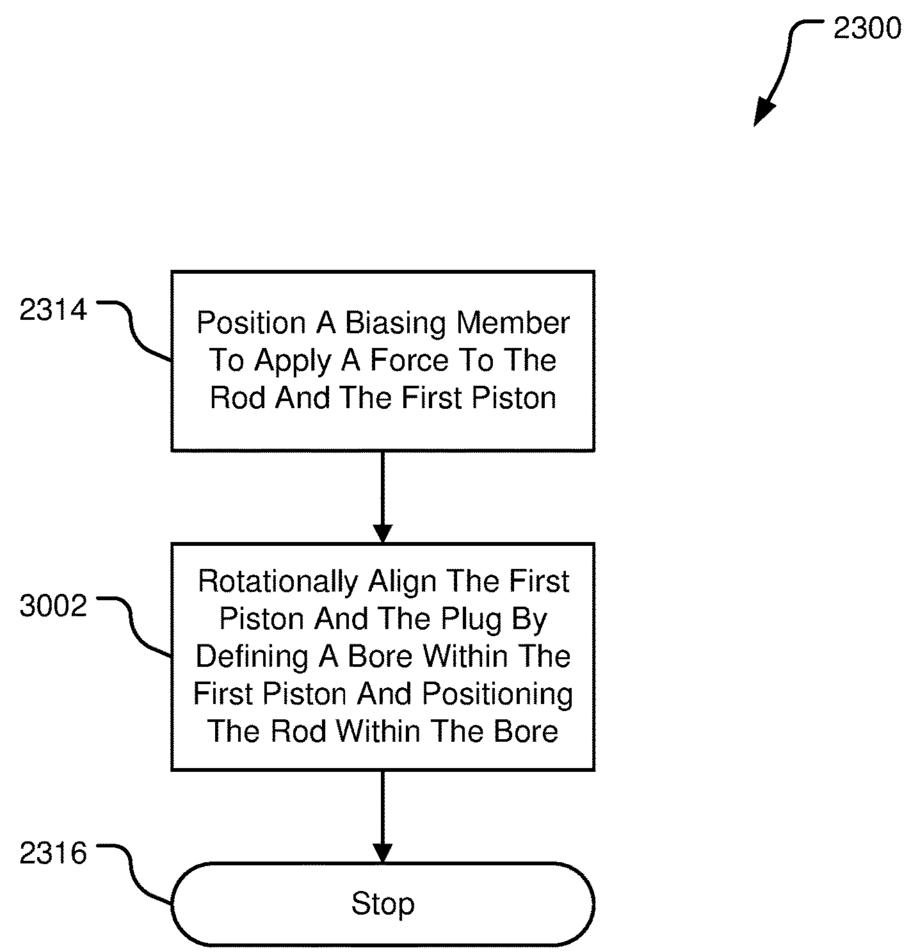
FIG. 30 is a schematic diagram of a method 2300 of manufacturing a control assembly for a nuclear reactor, according to one embodiment.

Referring to FIG. 30, the first piston and the plug are rotationally aligned by defining a bore within the first piston and positioning the rod within the bore at block 3002. In one embodiment, at least a portion of the rod has a cross-sectional shape that mates with a cross-sectional shape of the bore.

Figure 31:
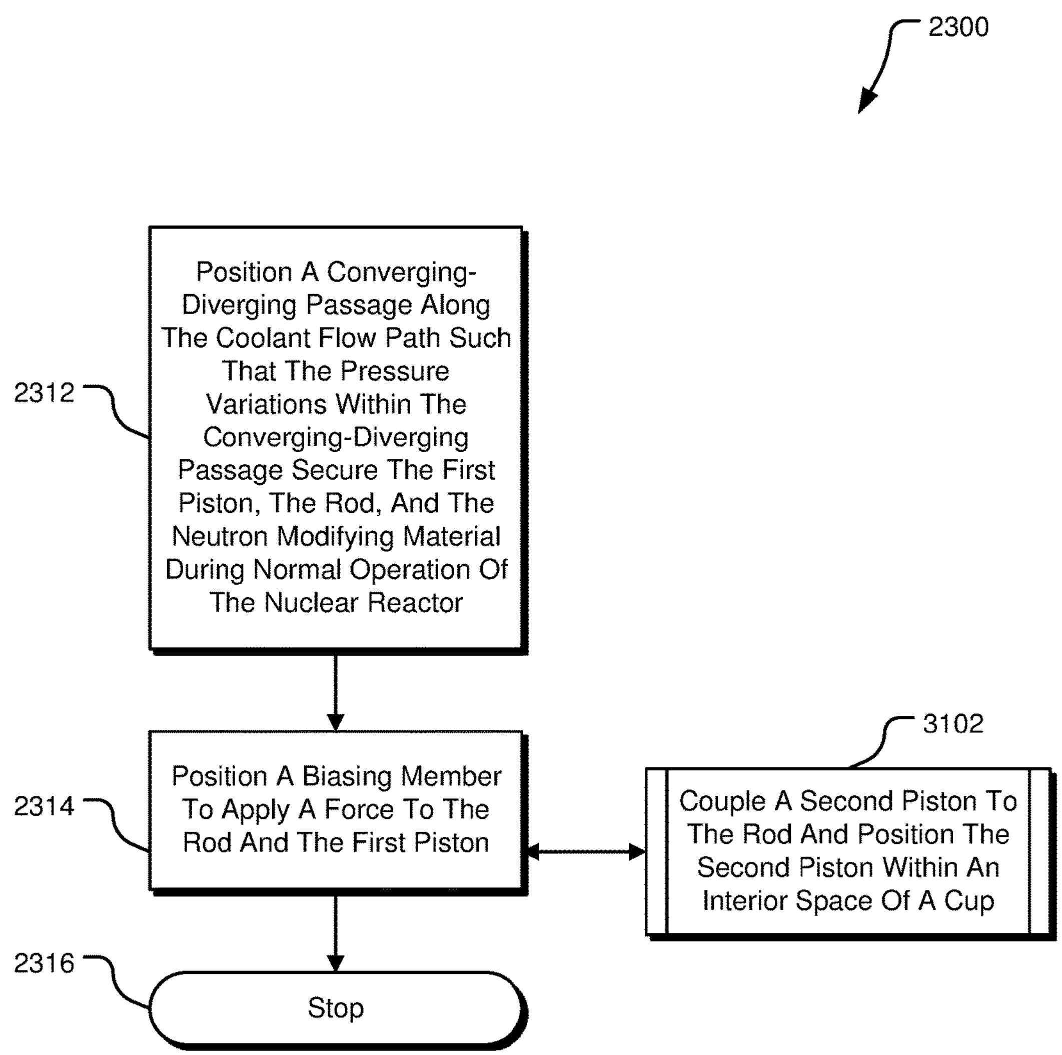
FIG. 31 is a schematic diagram of a method 2300 of manufacturing a control assembly for a nuclear reactor, according to one embodiment.

Referring to FIG. 31, positioning a biasing member to apply a force to the rod and the first piston at block 2314 may include coupling a second piston to the rod and positioning the second piston within an interior space of a cup.

FIG. 32, FIG. 33, FIG. 34, FIG. 35, FIG. 36, FIG. 37, FIG. 38, FIG. 39, FIG. 40, FIG. 41, FIG. 42, FIG. 43, and FIG. 44 provide illustrative flow diagrams for a method of operating a nuclear fission reactor having a reactor core, shown as method 3200, according to one embodiment. Although the method is presented as a sequence of steps for illustrative purposes, this sequence does not limit the scope of the claimed methods, and those of ordinary skill in the art will be aware of modifications and variations that may be made to the order timing, operation, etc. of the sequence.

Figure 32:
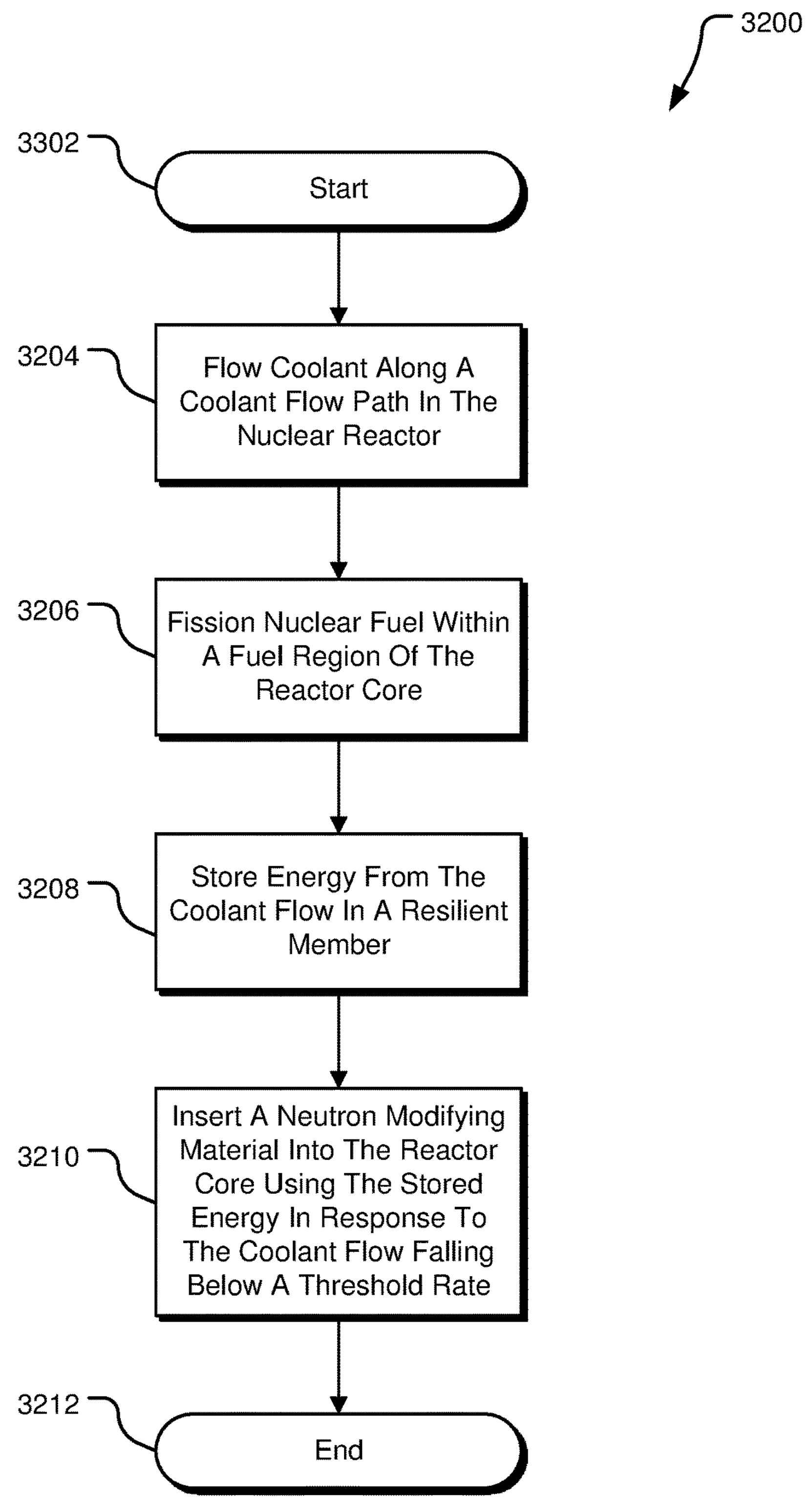
FIG. 32 is schematic diagram of a method 3200 of operating a nuclear fission reactor having a reactor core, according to one embodiment.

Referring to FIG. 32, method 3200 starts at start block 3202. At block 3204, coolant flows along a coolant flow path in the nuclear fission reactor. At block 3206, nuclear fuel is fissioned within a fuel region of the reactor core. At block 3208, energy from the coolant flow is stored in a resilient member. At block 3210, a neutron modifying material is inserted into the reactor core using the stored energy in response to the coolant flow falling below a threshold rate. In one embodiment, method 3200 ends at done block 3212. In other embodiments, method 3200 continues. Additional method steps are set forth below by way of non-limiting example.

Figure 33:
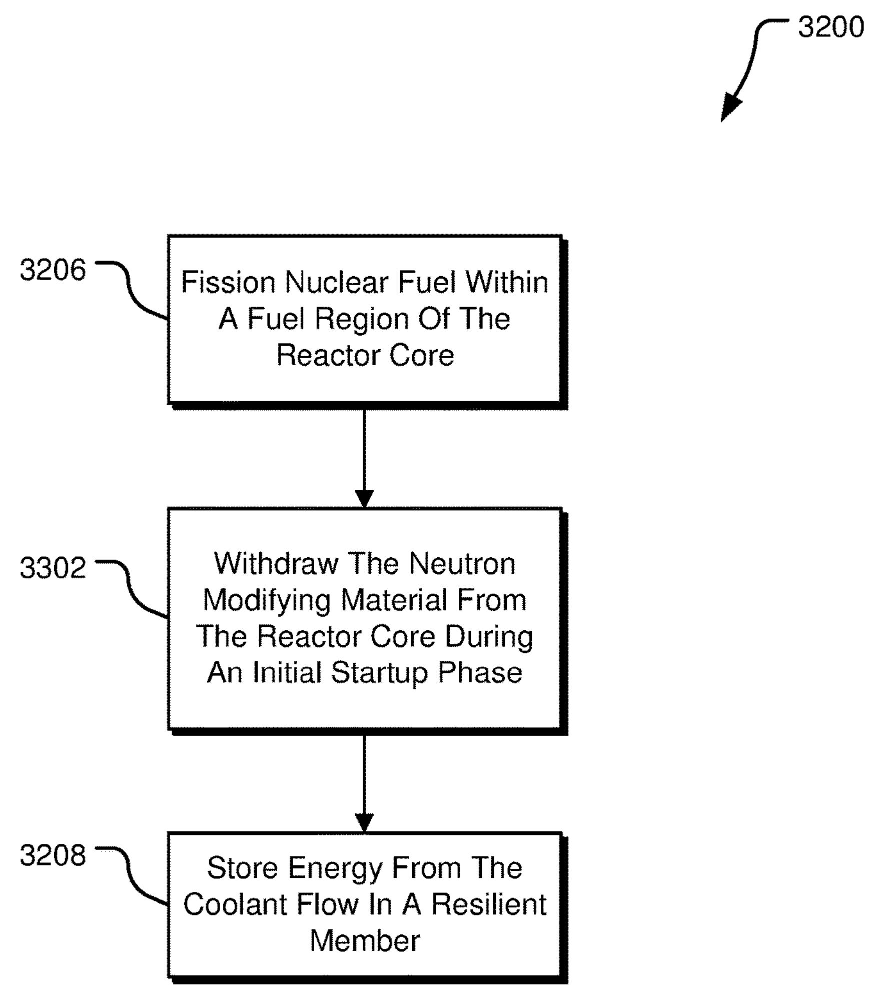
FIG. 33 is schematic diagram of a method 3200 of operating a nuclear fission reactor having a reactor core, according to one embodiment.

Referring to FIG. 33, the neutron modifying material is withdrawn from the reactor core during an initial startup phase at block 3302.

Figure 34:
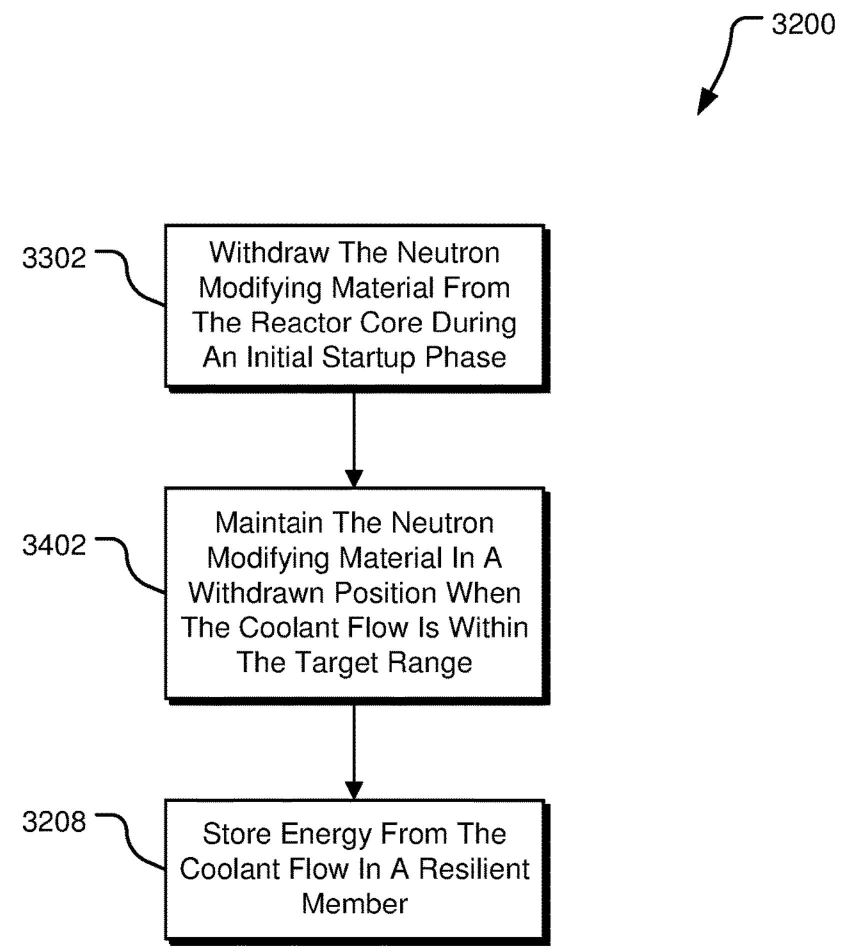
FIG. 34 is schematic diagram of a method 3200 of operating a nuclear fission reactor having a reactor core, according to one embodiment.

Referring to FIG. 34, the neutron modifying material is maintained in a withdrawn position when the coolant flow is within a target range at block 3402.

Figure 35:
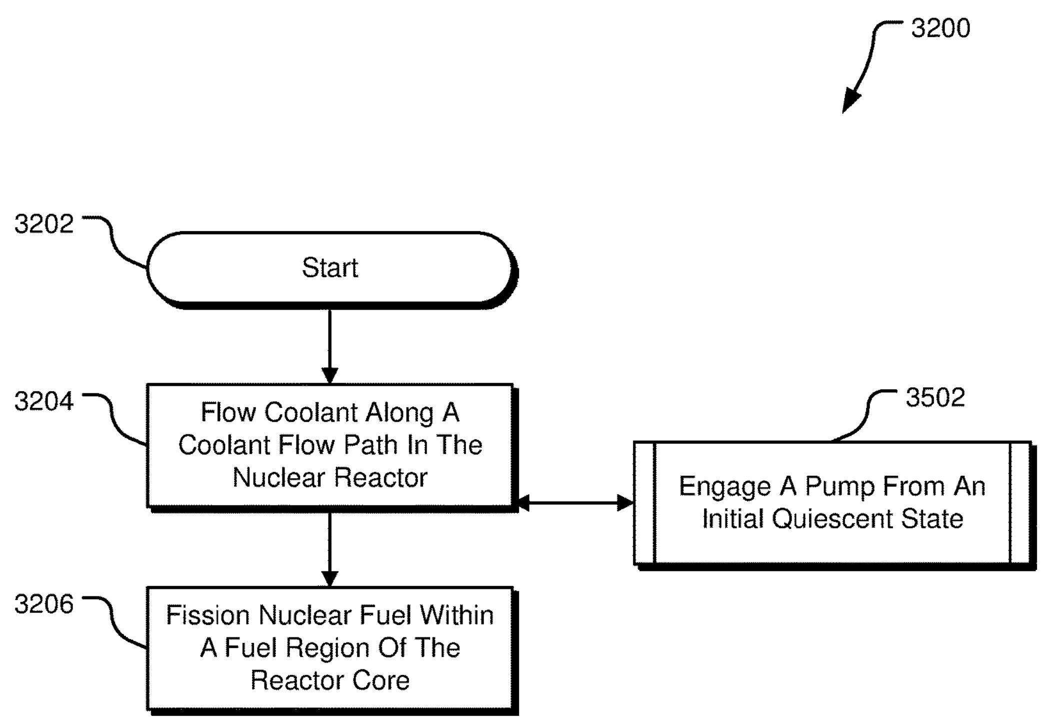
FIG. 35 is schematic diagram of a method 3200 of operating a nuclear fission reactor having a reactor core, according to one embodiment.

Referring to FIG. 35, flowing coolant along a coolant flow path in the nuclear fission reactor at block 3204 may include engaging a pump from an initial quiescent state at block 3502.

Figure 36:
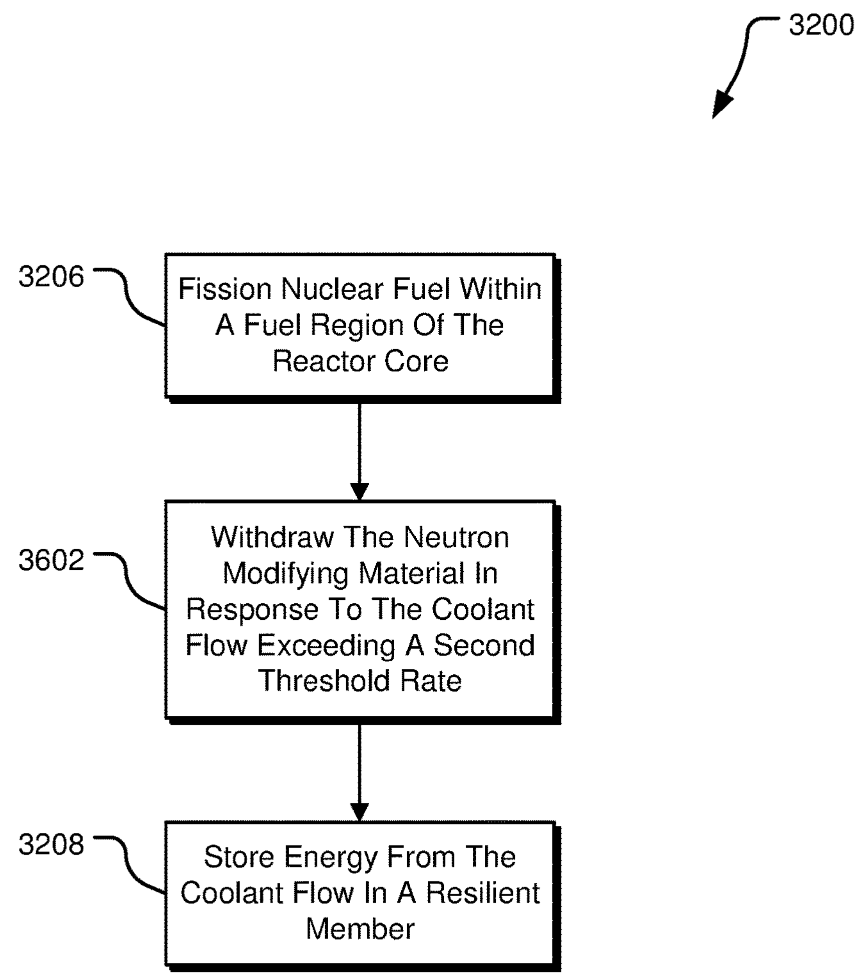
FIG. 36 is schematic diagram of a method 3200 of operating a nuclear fission reactor having a reactor core, according to one embodiment.

Referring to FIG. 36, the neutron modifying material is withdrawn in response to the coolant flow exceeding a threshold flow rate at block 3602.

Figure 37:
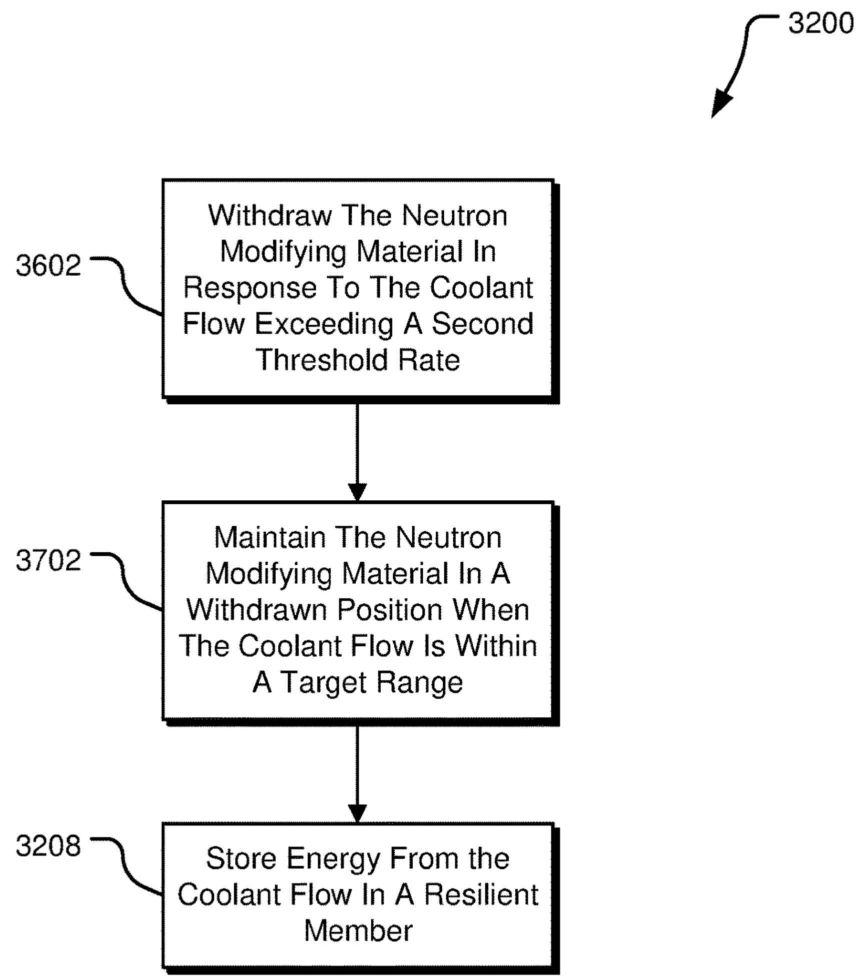
FIG. 37 is schematic diagram of a method 3200 of operating a nuclear fission reactor having a reactor core, according to one embodiment.

Referring to FIG. 37, the neutron modifying material is maintained in a withdrawn position when the coolant flow is within a target range at block 3702.

Figure 38:
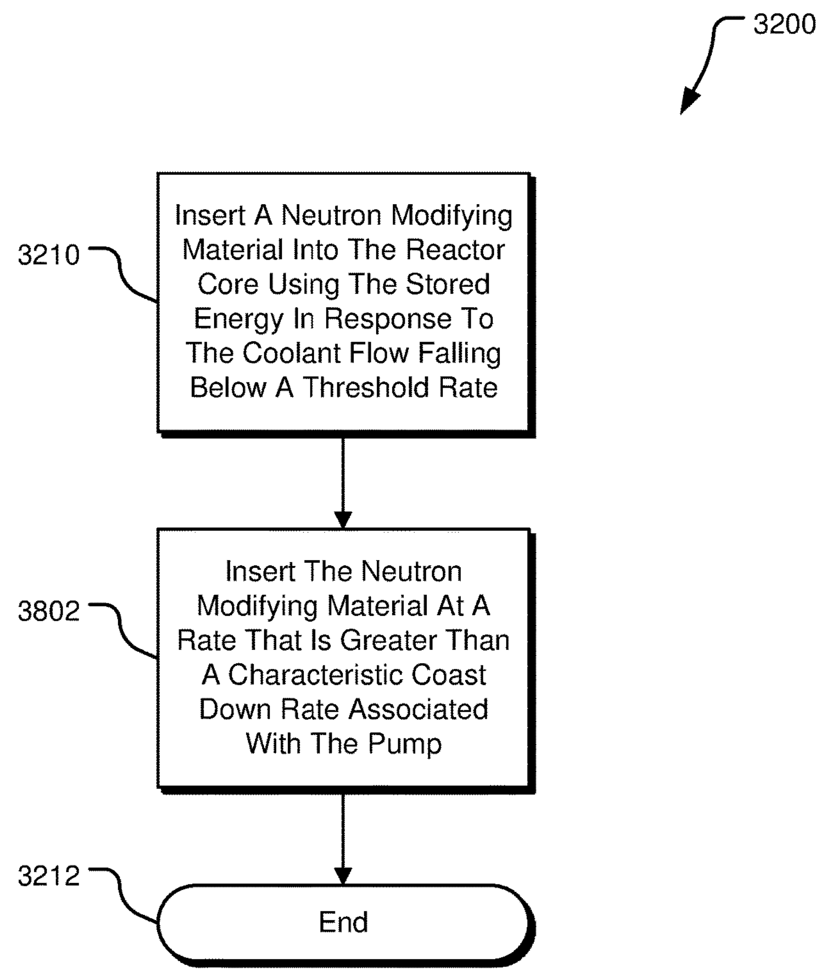
FIG. 38 is schematic diagram of a method 3200 of operating a nuclear fission reactor having a reactor core, according to one embodiment.

Referring to FIG. 38, the neutron modifying material is inserted at a rate that is greater than a characteristic coast down rate associated with the pump at block 3802.

Figure 39:
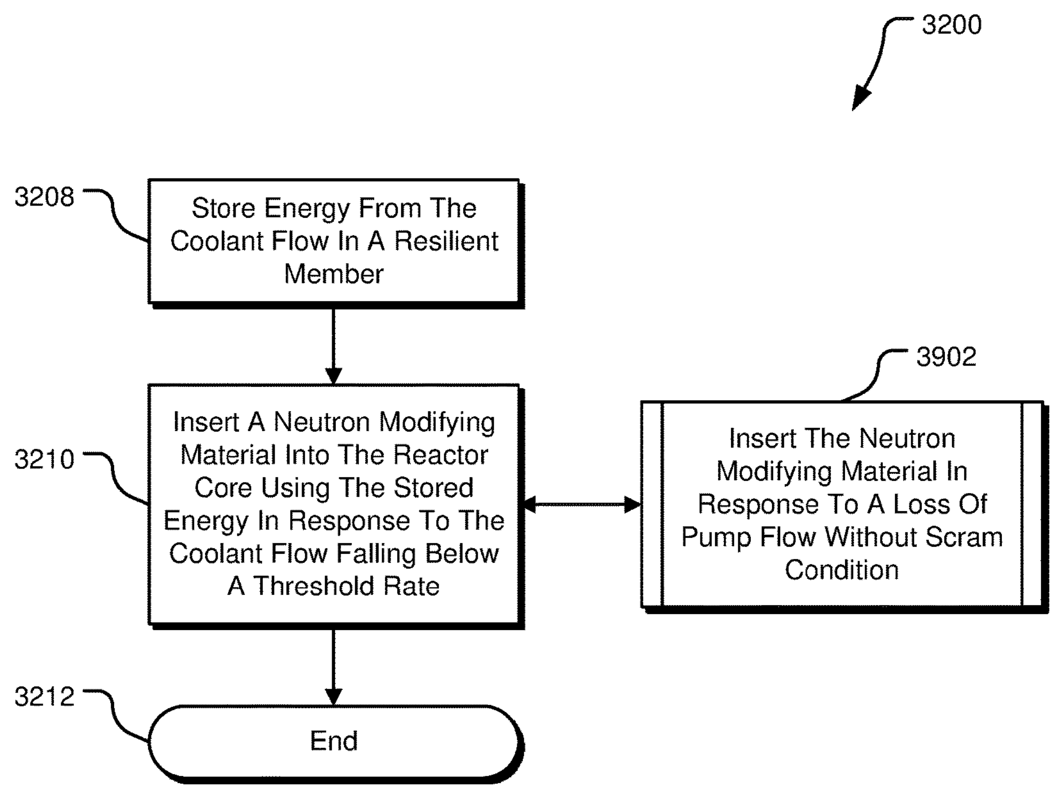
FIG. 39 is schematic diagram of a method 3200 of operating a nuclear fission reactor having a reactor core, according to one embodiment.

Referring to FIG. 39, inserting the neutron modifying material into the reactor core using the stored energy at block 3210 may include inserting the neutron modifying material in response to a loss of flow without scram condition at block 3902.

Figure 40:
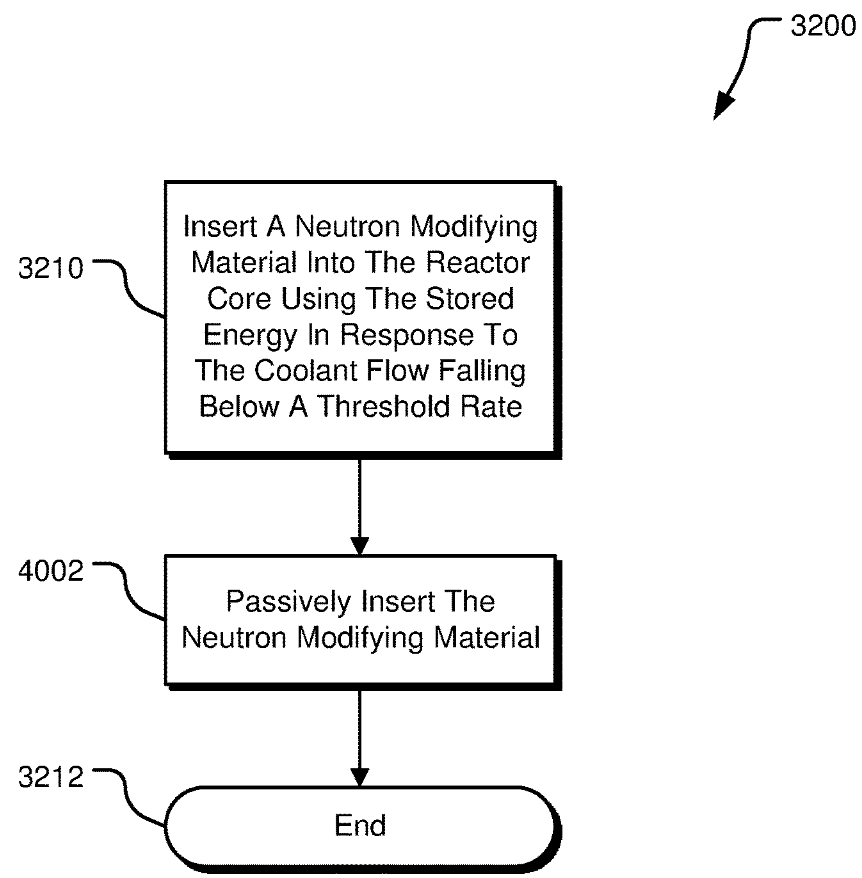
FIG. 40 is schematic diagram of a method 3200 of operating a nuclear fission reactor having a reactor core, according to one embodiment.

Referring to FIG. 40, the neutron modifying material is passively inserted at block 4002.

Figure 41:
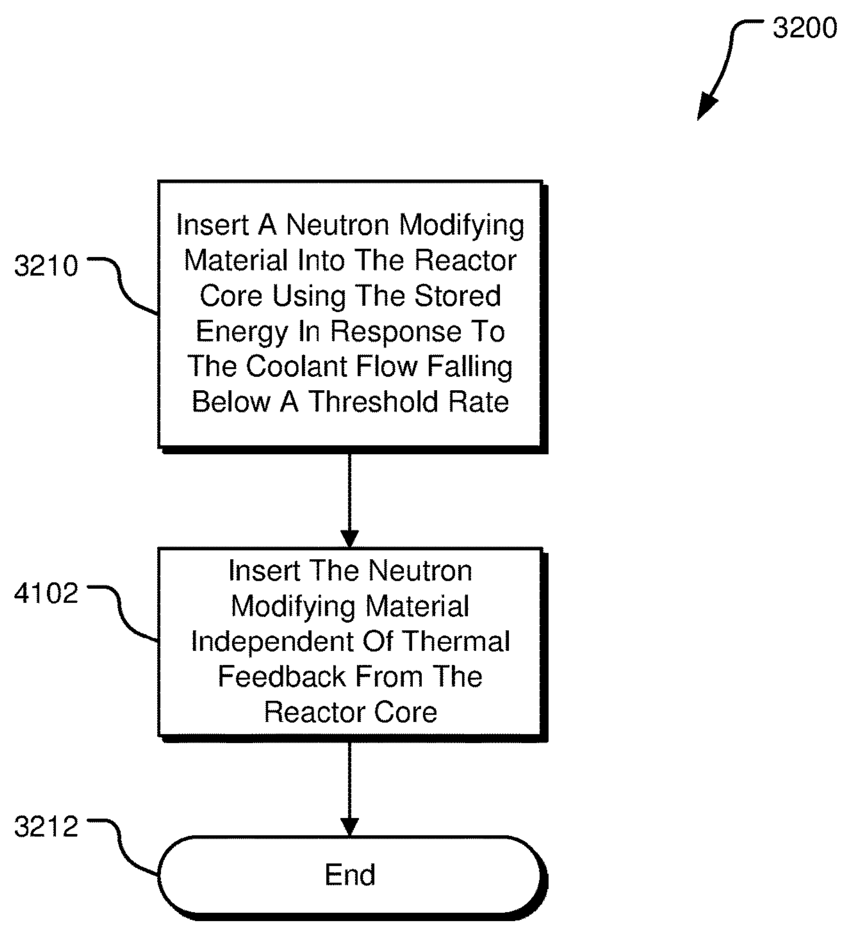
FIG. 41 is schematic diagram of a method 3200 of operating a nuclear fission reactor having a reactor core, according to one embodiment.

Referring to FIG. 41, the neutron modifying material is inserted independent of thermal feedback from the reactor core at block 4102.

Figure 42:
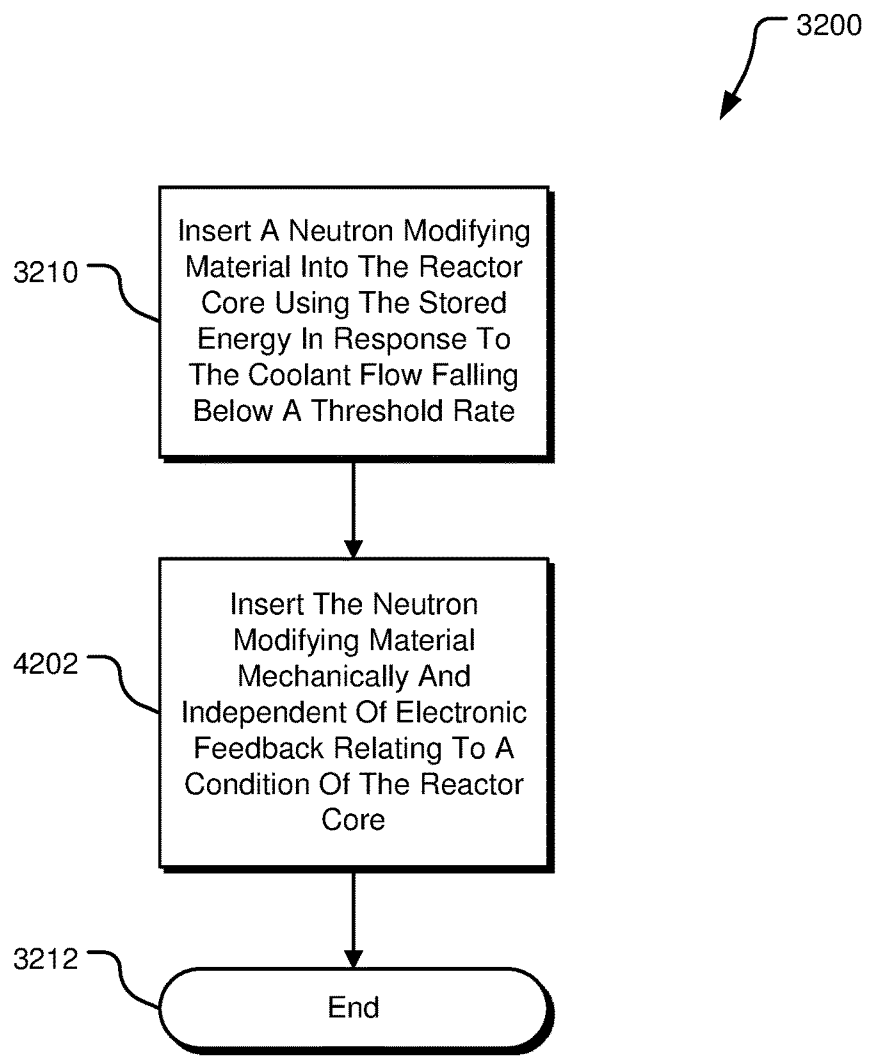
FIG. 42 is schematic diagram of a method 3200 of operating a nuclear fission reactor having a reactor core, according to one embodiment.

Referring to FIG. 42, the neutron modifying material is inserted mechanically and independent of electronic feedback relating to a condition of the reactor core at block 4202.

Figure 43:
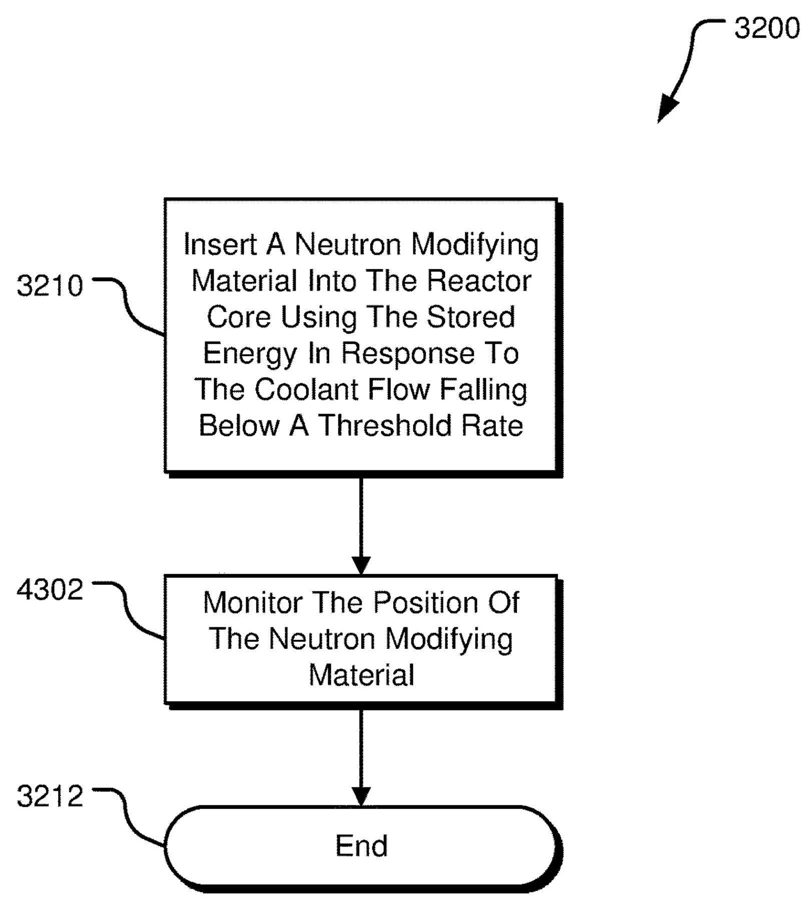
FIG. 43 is schematic diagram of a method 3200 of operating a nuclear fission reactor having a reactor core, according to one embodiment.

Referring to FIG. 43, the position of the neutron modifying material is monitored at block 4302.

Referring to FIG. 44, storing energy from the coolant flow in a resilient member at block 3208 may include pressurizing a gas within a reservoir at block 4402.

According to one embodiment, a control assembly for a nuclear reactor having a pump includes a duct having an inner volume and defining a coolant flow path, a plug fixed to the duct, a rod disposed within the inner volume and having a rod end that is configured to engage a neutron modifying material, a first piston disposed within the inner volume, slidably coupled to the duct, and coupled to the rod, and a biasing member coupled to the rod and the first piston. In one embodiment, the biasing member is positioned to apply a biasing force that repositions the first piston, the rod, and the neutron modifying material in response to a loss of pump flow without scram condition. In one embodiment, the biasing member is positioned to apply a first biasing force that positions the first piston, the rod, and the neutron modifying material into the fuel region; and a second biasing force that repositions the first piston, the rod, and the neutron modifying material out of the fuel region in response to a loss of pump flow without scram condition. In one embodiment the neutron modifying material increases positive reactivity in the fuel region. In one embodiment, the neutron modifying material includes a first neutron modifying material and a second neutron modifying material. In one embodiment, the first neutron modifying material includes a neutron absorber, and the second neutron modifying material includes fissionable material. In one embodiment the neutron absorber is positioned into the fuel region ahead of the fissionable material.

In one embodiment, the plug and the first piston define a pair of mating surfaces.

In one embodiment, a throat of a converging opening and a throat of a diverging opening are disposed along the pair of mating surfaces.

In one embodiment, the first piston defines a first sidewall that forms at least a portion of a first aperture and the plug defines a second sidewall that forms at least a portion of a second aperture. The first aperture and the second aperture define a pair of cooperating apertures positioned at peripheries of the plug and the first piston.

In one embodiment, the duct has an inner surface. The inner surface may form a portion of a converging-diverging passage.

In one embodiment, the rod and the first piston are selectively repositionable within the duct between a first orientation and a second orientation. The first piston contacts the plug when disposed in the second orientation thereby placing the pair of cooperating apertures into direct fluid communication.

In one embodiment, the plug and the first piston define a plurality of aperture sets each including a pair of cooperating apertures. The plurality of aperture sets forms at least portions of a plurality of converging-diverging passages.

In one embodiment, the plug defines a bore that receives the rod. At least a portion of the rod has a cross-sectional shape that mates with a cross-sectional shape of the bore thereby rotationally aligning the first piston and the plug.

In one embodiment, the biasing member includes a cup having a sidewall with a cross-sectional dimension that is larger than a corresponding cross-sectional dimension of a second piston thereby forming a gap that places a first region of the cup in fluid communication with a second region of the cup.

In one embodiment, the gap may be configured to restrict a flow of the liquid coolant there through such that a biasing force applied by a compressible fluid contained within the cup overcomes a suction force associated with pressure variations within the converging-diverging passage in response to a loss of pump flow without scram condition.

According to another embodiment, a nuclear reactor includes a fuel assembly including a duct containing nuclear fuel, a pump in fluid communication with the duct of the fuel assembly, and a control assembly. The pump is configured to provide a coolant flow along a coolant flow path. The control assembly includes a duct having an inner volume that defines at least a portion of the coolant flow path, a plug fixed to the duct, a neutron modifying material coupled to a rod, a first piston disposed within the inner volume, slidably coupled to the duct, and coupled to the rod, and a biasing member coupled to the first piston, the rod, and the neutron modifying material. In one embodiment, the biasing member is positioned to apply a biasing force that inserts the neutron modifying material into a fuel region of the fuel assembly in response to a loss of pump flow without scram condition.

In one embodiment, the biasing member is positioned to apply a first biasing force to positions a neutron modifying material into the fuel region of the fuel assembly; and a second biasing force that repositions the neutron modifying material out of the fuel region of the fuel assembly in response to a loss of pump flow without scram condition. In one embodiment the neutron modifying material increases positive reactivity in the fuel region. In one embodiment, the neutron modifying material includes a first neutron modifying material and a second neutron modifying material. In one embodiment, the first neutron modifying material includes a neutron absorber, and the second neutron modifying material includes fissionable material. In one embodiment the neutron absorber is positioned into the fuel region ahead of the fissionable material.

In one embodiment, the first piston defines a first sidewall that forms at least a portion of a first aperture and the plug defines a second sidewall that forms at least a portion of a second aperture. The first aperture and the second aperture define a pair of cooperating apertures positioned at peripheries of the plug and the first piston.

In one embodiment, the duct of the control assembly has an inner surface. The inner surface of the duct may form a portion of a converging-diverging passage.

In one embodiment, the plug and the first piston define a plurality of aperture sets each including a pair of cooperating apertures. The plurality of aperture sets forms at least portions of a plurality of converging-diverging passages.

In one embodiment, the plug defines a bore that receives the rod. At least a portion of the rod may have a cross-sectional shape that mates with a cross-sectional shape of the bore thereby rotationally aligning the first piston and the plug.

In one embodiment, the biasing member includes a cup. A second piston may separate an interior space of the cup into a first region and a second region. In some embodiments, the cup defines an opening configured to fluidly couple the first region and a liquid coolant associated with the coolant flow path.

In one embodiment, the biasing member includes a compressible fluid disposed within the second region of the cup. The compressible fluid may be configured to apply a biasing force that inserts the neutron modifying material into the fuel region of the fuel assembly in response to the loss of pump flow without scram condition. The pressure of the compressible fluid may vary with a pressure of the liquid coolant.

In one embodiment, the compressible fluid may be configured to apply a first biasing force to position a neutron modifying material into the fuel region; and second biasing force to reposition the neutron modifying material out of the fuel region in response to a loss of pump flow without scram condition. In one embodiment the neutron modifying material increases positive reactivity in the fuel region. In one embodiment, the neutron modifying material includes a first neutron modifying material and a second neutron modifying material. In one embodiment, the first neutron modifying material includes a neutron absorber, and the second neutron modifying material includes fissionable material. In one embodiment the neutron absorber is positioned into the fuel region ahead of the fissionable material. In one embodiment, the second piston is slidably coupled to a sidewall of the cup. The second piston may define an orifice that places the first region of the cup in fluid communication with the second region of the cup. The orifice may be configured to restrict a flow of the liquid coolant there through such that the biasing force applied by the compressible fluid overcomes a suction force associated with the pressure variations within the converging-diverging passage in response to the loss of pump flow without scram condition.

In one embodiment, the sidewall of the cup has a cross-sectional dimension that is larger than a corresponding cross-sectional dimension of the second piston thereby forming a gap that places the first region of the cup in fluid communication with the second region of the cup. The gap may be configured to restrict a flow of the liquid coolant there through such that the biasing force applied by the compressible fluid overcomes a suction force associated with the pressure variations within the converging-diverging passage in response to the loss of pump flow without scram condition.

According to still another embodiment, a method of manufacturing a control assembly for a nuclear reactor includes defining a coolant flow path within an inner volume of a duct, fixing a plug to the duct, slidably coupling a first piston to the duct, the plug and the first piston defining a pair of cooperating apertures that forms at least a portion of a converging-diverging passage, coupling a neutron modifying material to the first piston with a rod, positioning the converging-diverging passage along the coolant flow path such that pressure variations within the converging-diverging passage secure the first piston, the rod, and the neutron modifying material into a first position during normal operation of the nuclear reactor, and positioning a biasing member to apply a biasing force to the rod and the first piston, the biasing force repositioning the first piston, the rod, and the neutron modifying material into a second position in response to a loss of pump flow without scram condition. In one embodiment, the neutron modifying material includes an absorber, and wherein, the first position is outside of a fuel region and the second position is within the fuel region. In one embodiment, the neutron modifying material includes fissile material wherein, the first position is within the fuel region, and the second position is outside of the fuel region. In one embodiment, the neutron modifying material includes an absorber and fissile material wherein, the in the first position the fissile material is within the fuel region and in the second position the absorber is within the fuel region.

According to one embodiment, the method includes associating a first aperture of the pair of cooperating apertures with the first piston and a second aperture of the pair of cooperating apertures with the plug, the first aperture and the second aperture defining at least a portion of a converging opening and at least a portion of a diverging opening.

According to one embodiment of the method, the associating step includes extending the converging opening between an inlet end and a throat and extending the diverging opening between a throat and an outlet end. The throat of the converging opening may have a cross-sectional area that is equalized with a cross-sectional area of the throat of the diverging opening.

According to one embodiment of the method, the associating step includes defining a pair of mating surfaces on the plug and the first piston and positioning the throat of the converging opening and the throat of the diverging opening along the pair of mating surfaces.

According to one embodiment, the method includes defining the first aperture within a first body of the first piston and defining the second aperture within a second body of the plug such that the pair of cooperating apertures is spaced from peripheries of the plug and the first piston.

According to one embodiment of the method, the associating step includes defining the first aperture on a first sidewall of the first piston and defining the second aperture on a second sidewall of the plug such that the pair of cooperating apertures is positioned at peripheries of the plug and the first piston.

In one embodiment, the duct has an inner surface. The inner surface may form a portion of the converging-diverging passage.

According to one embodiment, the method includes associating a plurality of aperture sets with the plug and the first piston, the plurality of aperture sets each including a pair of cooperating apertures. The plurality of aperture sets may form at least portions of a plurality of converging-diverging passages.

According to one embodiment, the method includes rotationally aligning the first piston and the plug by defining a bore within the plug and positioning the rod within the bore, at least a portion of the rod having a cross-sectional shape that mates with a cross-sectional shape of the bore.

According to one embodiment of the method, the positioning the biasing member step includes coupling a second piston to the rod and positioning the second piston within an interior space of a cup. The second piston may include a piston body that separates the interior space of the cup into a first region and a second region.

According to yet another embodiment, a method of operating a nuclear fission reactor having a reactor core includes flowing coolant along a coolant flow path in the nuclear fission reactor, fissioning nuclear fuel within a fuel region of the reactor core, storing energy from the coolant flow in a resilient member, and inserting a neutron modifying material into the reactor core using the stored energy in response to the coolant flow falling below a threshold flow rate.

According to one embodiment, the method includes withdrawing the neutron modifying material from the reactor core during an initial startup phase.

According to one embodiment, the method includes maintaining the neutron modifying material in a withdrawn position when the coolant flow is within a target range.

According to one embodiment, the method includes inserting the neutron modifying material during an initial start-up phase.

According to one embodiment, the method includes maintaining the neutron modifying material in an inserted position when the coolant flow is within target range.

According to another embodiment, the method includes repositioning the neutron modifying material in a withdrawn position when the coolant flow is out of a target range.

In one embodiment, the flowing coolant step includes engaging a pump from an initial quiescent state.

According to one embodiment, the method includes withdrawing the neutron modifying material in response to the coolant flow exceeding a second threshold flow rate.

In one embodiment, the second threshold flow rate is between 25% and 30% of the first threshold flow rate.

According to one embodiment, the method includes maintaining the neutron modifying material in a withdrawn position when the coolant flow is within a target range.

According to one embodiment, the method includes inserting the neutron modifying material at a rate that is greater than a characteristic coast down rate associated with the pump.

According to one embodiment of the method, the insertion step includes inserting the neutron modifying material in response to a loss of coolant flow without scram condition.

According to one embodiment, the method includes passively inserting the neutron modifying material.

According to one embodiment, the method includes inserting the neutron modifying material independent of thermal feedback from the reactor core.

According to one embodiment, the method includes inserting the neutron modifying material mechanically and independent of electronic feedback relating to a condition of the reactor core.

According to one embodiment, the method includes monitoring the position of the neutron modifying material.

According to one embodiment of the method, the storing energy step includes pressurizing a gas within a reservoir.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to, "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., “a system having at least one of A, B, and C” would include but not be limited to systems that have A alone, B alone, C alone, A and B together, A and C together, B and C together, and/or A, B, and C together, etc.). In those instances, where a convention analogous to “at least one of A, B, or C, etc.” is used, in general such a construction is intended in the sense one having skill in the art would understand the convention (e.g., “a system having at least one of A, B, or C” would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase “A or B” will be typically understood to include the possibilities of “A” or “B” or “A and B.”

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like “responsive to,” “related to,” or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An example apparatus includes a duct configured to conduct a fluid in a first direction, a loading assembly disposed within the duct and configured to move a member in the first direction into a loaded position when pressure of the fluid in the duct satisfies a loading condition, and a firing assembly operably coupled to the loading assembly and disposed within the duct. The firing assembly and the loading assembly are configured to store energy when the member is in the loaded position and to release the stored energy and move the member out of the loaded position in a second direction opposite the first direction when the pressure of the fluid in the duct satisfies a firing condition.

Another example system of any preceding system includes a plug fixed to the duct and a first piston coupled to the member disposed within and slidably coupled to the duct.

Another example system of any preceding system a member disposed within the duct and having an end that is configured to engage a neutron modifying material.

Another example system of any preceding system includes a plug and a first piston that define a pair of cooperating apertures that forms at least a portion of a converging-diverging passage.

Another example system of any preceding system includes a converging-diverging passage is disposed along a fluid flow path such that pressure variations within the converging-diverging passage secure the first piston and the member when the pressure of the fluid in the duct satisfies the loading condition.

Another example system of any preceding system includes a pair of cooperating apertures includes a first aperture defined at least partially by the first piston and a second aperture defined at least partially by the plug, the first aperture and the second aperture defining at least a portion of a converging opening and at least a portion of a diverging opening.

Another example system of any preceding system includes the converging opening extends between an inlet end and an inlet throat, the diverging opening extends between an outlet throat and an outlet end, and the inlet throat of the converging opening has an inlet throat cross-sectional area that is equalized with an outlet throat cross-sectional area of the outlet throat of the diverging opening.

Another example system of any preceding system includes a first piston that includes a first body that defines the first aperture and the plug includes a second body that defines the second aperture such that the pair of cooperating apertures is spaced from peripheries of the plug and the first piston.

Another example system of any preceding system includes a firing assembly includes a cup and a second piston, wherein the cup has a sidewall that defines an interior space, and the second piston is disposed within the interior space of the cup.

Another example system of any preceding system includes a member that has an opposing second end, wherein the second piston is coupled to the opposing second end of the member, and a second piston includes a piston body that separates the interior space of the cup into a first region and a second region, and a member that is positioned along the fluid flow path, and a cup that has an open end such that the first region is exposed to the fluid flow path.

Another example system of any preceding system includes a cup that is configured to contain a compressible fluid within the second region. The example system also includes a cup that defines an opening configured to fluidly couple the first region and a liquid coolant associated with the fluid flow path. The example system also includes a pressure of the compressible fluid that varies with the pressure of the liquid coolant.

Another example system of any preceding system includes a second piston that is slidably coupled to the sidewall of the cup. The example system also includes a second piston that defines an orifice that places the first region in fluid communication with the second region. The example system also includes an orifice that is configured to restrict a flow of the fluid therethrough such that the release of stored energy applied by the firing assembly overcomes a suction force associated with the pressure variations within the converging-diverging passage when the pressure of the fluid in the duct satisfies a firing condition.

Another example system of any preceding system includes a hysteresis device positioned to apply a driving force independent of the release of stored energy by the firing assembly.

Another example system of any preceding system includes that the hysteresis device is configured to receive a hysteresis control signal, and the hysteresis device initiates the driving force in response to receiving the hysteresis control signal.

Another example system of any preceding system includes a hysteresis device that is a spring mechanism.

Another example system of any preceding system includes an expansion device that has a contracted state and an expanded state, and is positioned to provide a resisting force in the expanded state.

Another example system of any preceding system includes that the expansion device is an engaging member that maintains the expansion device in the expanded state.

Another example system of any preceding system includes that the expansion device is configured to receive an engagement control signal, and the engaging member maintains the expansion device in the expanded state in response to receiving the engagement control signal.

Another example system of any preceding system includes that the expansion device is configured to receive a disengagement control signal, and the engaging member disengages and allows the expansion device to return to the contracted state in response to the disengagement control signal.

Another example system of any preceding system includes that the expansion device comprises a thermal expansive material.

Another example system of any preceding system includes that the expansion device further comprises a bellows.

Another example system of any preceding system includes a locking mechanism that has a locked state and an unlocked state so that when the locking mechanism is in the locked state, it engages the loading assembly.

Another example system of any preceding system includes a locking mechanism in the locked state engages the member and inhibits movement of the member relative to the duct.

Another example system of any preceding system includes a locking mechanism that is configured to receive a locking control signal, and the locking mechanism enters and maintains the locked state in response to receiving the locking control signal.

Another example system of any preceding system includes a locking mechanism that is configured to receive an unlocking control signal, and the locking mechanism enters and maintains the unlocked state in response to the unlocking control signal.

Another example system of any preceding system includes a locking mechanism constructed of a ferromagnetic material.

Another example system of any preceding system includes a flow restricting device, such that the firing assembly releases the stored energy in response to movement of the flow restricting device.

Another example system of any preceding system includes a flow restricting device that moves in response to a change in temperature.

An example system includes a nuclear reactor including a fuel assembly including a fuel assembly duct containing nuclear fuel, a pump in fluid communication with the fuel assembly duct of the fuel assembly, such that the pump is configured to provide a coolant flow along a coolant flow path. Another example system of any preceding system includes a control assembly including a control assembly duct configured to conduct coolant along at least a portion of the coolant flow path, a firing assembly disposed within the control assembly duct, and configured to release stored energy when the pressure of the coolant in the coolant flow path satisfies a firing condition.

Another example system of any preceding system includes a control assembly including a plug fixed to the control assembly duct, a neutron modifying material coupled to a member, a first piston disposed within and slidably coupled to the control assembly duct, and coupled to the member, such that the firing assembly is coupled to the first piston and the member, and the release of stored energy inserts the neutron modifying material into a fuel region of the fuel assembly when the pressure of the coolant in the coolant flow path satisfies the firing condition.

Another example system of any preceding system includes a configuration such that the plug and the first piston define a pair of cooperating apertures that forms at least a portion of a converging-diverging passage.

Another example system of any preceding system includes a configuration such that the converging-diverging passage is disposed along the coolant flow path is such that pressure variations within the converging-diverging passage secure the neutron modifying material in a withdrawn position until the pressure of the coolant in the coolant flow path satisfies the firing condition.

Another example system of any preceding system includes a pair of cooperating apertures including a first aperture defined at least partially by the first piston and a second aperture defined at least partially by the plug, such that the first aperture and the second aperture define at least a portion of a converging opening and at least a portion of a diverging opening.

Another example system of any preceding system includes a configuration such that the converging opening extends between an inlet end and an inlet throat, and the diverging opening extends between an outlet throat and an outlet end, and the inlet throat of the converging opening has an inlet throat cross-sectional area that is equalized with an outlet throat cross-sectional area of the outlet throat of the diverging opening.

Another example system of any preceding system includes a first piston that includes a first body defining the first aperture and the plug includes a second body defining the second aperture such that the pair of cooperating apertures is spaced from peripheries of the plug and the first piston.

Another example system of any preceding system includes a firing assembly including a cup and a second piston, such that the cup has a sidewall that defines an interior space, and the second piston is disposed within the interior space of the cup.

Another example system of any preceding system includes a member that has a first end and an opposing second end, and the neutron modifying material is coupled to the first end of the member. The example system also includes a second piston that is coupled to the opposing second end of the member, such that the second piston includes a piston body that separates the interior space of the cup into a first region and a second region. The example system also includes a cup that has an open end such that the first region is exposed to the coolant flow path.

Another example system of any preceding system includes coolant that is configured to store the stored energy that inserts the neutron modifying material into the fuel region of the fuel assembly when the pressure of the coolant in the coolant flow path satisfies the firing condition.

Another example system of any preceding system includes a second piston that is slidably coupled to the sidewall of the cup, such that the second piston defines an orifice that places the first region in fluid communication with the second region. The example system also includes an orifice that is configured to restrict a flow of the coolant therethrough such that the release of stored energy applied by the coolant overcomes a suction force associated with the pressure variations within the converging-diverging passage when the pressure of the coolant in the coolant flow path satisfies the firing condition.

Another example system of any preceding system includes a control assembly including a hysteresis device positioned to apply a driving force.

Another example system of any preceding system includes a hysteresis device that is configured to receive a hysteresis control signal, such that the hysteresis device initiates the driving force in response to receiving the hysteresis control signal.

Another example system of any preceding system includes a hysteresis device that is a spring mechanism.

Another example system of any preceding system includes a control assembly including an expansion device, such that the expansion device has a contracted state and an expanded state, and the expansion device is positioned to provide a resisting force in the expanded state.

Another example system of any preceding system includes and expansion device including an engaging member, such that the engaging member maintains the expansion device in the expanded state.

Another example system of any preceding system includes an expansion device configured to receive an engagement control signal, such that the engaging member maintains the expansion device in the expanded state in response to receiving the engagement control signal.

Another example system of any preceding system includes an expansion device that is configured to receive a disengagement control signal, such that the engaging member disengages and allows the expansion device to return to the contracted state in response to the disengagement control signal.

Another example system of any preceding system includes an expansion device constructed of a thermal expansive material.

Another example system of any preceding system including an expansion device that includes a bellows.

Another example system of any preceding system includes a locking mechanism that has a locked state and an unlocked state, such that the locking mechanism in the locked state engages the control assembly.

Another example system of any preceding system includes a locking mechanism that, in the locked state, engages the control assembly to inhibit movement of the firing assembly relative to the duct.

Another example system of any preceding system includes a locking mechanism that is configured to receive a locking control signal, such that the locking mechanism enters and maintains the locked state in response to receiving the locking control signal.

Another example system of any preceding system includes a locking mechanism that is configured to receive an unlocking control signal, such that the locking mechanism enters and maintains the unlocked state in response to the unlocking control signal.

Another example system of any preceding system includes a locking mechanism constructed of at least a ferromagnetic material.

Another example system of any preceding system includes a control assembly that includes a flow restricting device, such that the firing assembly releases stored energy in response to movement of the flow restricting device.

Another example system of any preceding system includes a flow restricting device that moves in response to a change in temperature.

An example method includes defining a coolant flow path within an inner volume of a duct, fixing a plug to the duct, slidably coupling a first piston to the duct. The plug and the first piston define a pair of cooperating apertures that forms at least a portion of a converging-diverging passage. The example method further includes coupling a neutron modifying material to the first piston with a member, positioning the converging-diverging passage along the coolant flow path such that pressure variations within the converging-diverging passage secure the first piston, the member, and the neutron modifying material during normal operation of the nuclear reactor, and positioning a biasing member to apply a biasing force to the member and the first piston, such that the biasing force releases the first piston, the member, and the neutron modifying material in response to a loss of pump flow without scram condition.

Another example method of any preceding method includes associating a first aperture of the pair of cooperating apertures with the first piston and a second aperture of the pair of cooperating apertures with the plug, such that the first aperture and the second aperture defining at least a portion of a converging opening and at least a portion of a diverging opening.

What is claimed is:

1. Apparatus for translation along an axis of fluid flow, the apparatus comprising:

- a duct configured to conduct a fluid in a first direction;
- a plug fixed to the duct;
- a loading assembly disposed within the duct and configured to move a member in the first direction into a loaded position when pressure of the fluid in the duct satisfies a loading condition;
- a first piston coupled to the member, the first piston within and slidably coupled to the duct, wherein the plug and the first piston define a pair of cooperating apertures that forms at least a portion of a converging-diverging passage; and
- a firing assembly operably coupled to the loading assembly and disposed within the duct, the firing assembly and the loading assembly being configured to store energy when the member is in the loaded position and to release stored energy and move the member out of the loaded position in a second direction opposite the first direction when the pressure of the fluid in the duct satisfies a firing condition.

2. The apparatus of claim 1, wherein the member is disposed within the duct and having an end that is configured to engage a neutron modifying material.

3. The apparatus of claim 1, wherein the converging-diverging passage is disposed along a fluid flow path such that pressure variations within the converging-diverging passage secure the first piston and the member when the pressure of the fluid in the duct satisfies the loading condition.

4. The apparatus of claim 3, wherein the pair of cooperating apertures includes a first aperture defined at least partially by the first piston and a second aperture defined at least partially by the plug, the first aperture and the second aperture defining at least a portion of a converging opening and at least a portion of a diverging opening.

5. The apparatus of claim 4, further comprising:

wherein the converging opening extends between an inlet end and an inlet throat;

wherein the diverging opening extends between an outlet throat and an outlet end; and wherein the inlet throat of the converging opening has an inlet throat cross-sectional area that is equalized with an outlet throat cross-sectional area of the outlet throat of the diverging opening.

6. The apparatus of claim 4, wherein the first piston includes a first body that defines the first aperture and the plug includes a second body that defines the second aperture such that the pair of cooperating apertures is spaced from peripheries of the plug and the first piston.

7. The apparatus of claim 4, further comprising:

wherein the firing assembly includes a cup and a second piston, wherein the cup has a sidewall that defines an interior space; and wherein the second piston is disposed within the interior space of the cup.

8. The apparatus of claim 7, further comprising:

wherein the member has an opposing second end, wherein the second piston is coupled to the opposing second end of the member, wherein the second piston includes a piston body that separates the interior space of the cup into a first region and a second region;

wherein the member is positioned along the fluid flow path; and wherein the cup has an open end such that the first region is exposed to the fluid flow path.

9. The apparatus of claim 8, further comprising:

wherein the cup is configured to contain a compressible fluid within the second region;

wherein the cup defines an opening configured to fluidly couple the first region and a liquid coolant associated with the fluid flow path; and wherein a pressure of the compressible fluid varies with the pressure of the liquid coolant.

10. The apparatus of claim 8, further comprising:

wherein the second piston is slidably coupled to the sidewall of the cup;

wherein the second piston defines an orifice that places the first region in fluid communication with the second region, and wherein the orifice is configured to restrict a flow of the fluid therethrough such that release of stored energy applied by the firing assembly overcomes a suction force associated with the pressure variations within the converging-diverging passage when the pressure of the fluid in the duct satisfies a firing condition.

11. The apparatus of claim 1 further comprising a hysteresis device positioned to apply a driving force independent of release of stored energy by the firing assembly.

12. The apparatus of claim 11, further comprising:

wherein the hysteresis device is configured to receive a hysteresis control signal; and wherein the hysteresis device initiates the driving force in response to receiving the hysteresis control signal.

13. The apparatus of claim 11, wherein the hysteresis device is a spring mechanism.

14. The apparatus of claim 1 further comprising an expansion device, the expansion device having a contracted state and an expanded state, and positioned to provide a resisting force in the expanded state.

15. The apparatus of claim 14, wherein the expansion device further comprises an engaging member, the engaging member maintaining the expansion device in the expanded state.

16. The apparatus of claim 15, wherein the expansion device is configured to receive an engagement control signal, wherein the engaging member maintains the expansion device in the expanded state in response to receiving the engagement control signal.

17. The apparatus of claim 15, wherein the expansion device is configured to receive a disengagement control signal, wherein the engaging member disengages and allows the expansion device to return to the contracted state in response to the disengagement control signal.

18. The apparatus of claim 14, wherein the expansion device comprises a thermal expansive material.

19. The apparatus of claim 14, wherein the expansion device further comprises a bellows.

20. The apparatus of claim 1, further comprising a locking mechanism, wherein the locking mechanism has a locked state and an unlocked state, wherein the locking mechanism in the locked state engages the loading assembly.

21. The apparatus of claim 20, wherein the locking mechanism in the locked state engaging the member inhibits movement of the member relative to the duct.

22. The apparatus of claim 20, wherein the locking mechanism is configured to receive a locking control signal, wherein the locking mechanism enters and maintains the locked state in response to receiving the locking control signal.

23. The apparatus of claim 20, wherein the locking mechanism is configured to receive an unlocking control signal, wherein the locking mechanism enters and maintains the unlocked state in response to the unlocking control signal.

24. The apparatus of claim 20, wherein the locking mechanism comprises a ferromagnetic material.

25. The apparatus of claim 1, further comprising a flow restricting device, wherein the firing assembly releases the stored energy in response to movement of the flow restricting device.

26. The apparatus of claim 25, wherein the flow restricting device moves in response to a change in temperature.

27. A nuclear reactor, comprising:

a fuel assembly including a fuel assembly duct containing nuclear fuel;

a pump in fluid communication with the fuel assembly duct of the fuel assembly, wherein the pump is configured to provide a coolant flow along a coolant flow path; and a control assembly including:

a control assembly duct configured to conduct coolant along at least a portion of the coolant flow path;

a plug fixed to the control assembly duct;

a neutron modifying material coupled to a member;

a first piston disposed within and slidably coupled to the control assembly duct, and coupled to the member; and a firing assembly disposed within the control assembly duct and coupled to the first piston and the member, and configured to release stored energy when the pressure of the coolant in the coolant flow path satisfies a firing condition; and wherein the release of the stored energy inserts the neutron modifying material into the nuclear fuel when the pressure of the coolant in the coolant flow path satisfies the firing condition; wherein the plug and the first piston define a pair of cooperating apertures that forms at least a portion of a converging-diverging passage.

28. The nuclear reactor of claim 27, wherein the converging-diverging passage is disposed along the coolant flow path such that pressure variations within the converging-diverging passage secure the neutron modifying material in a withdrawn position until the pressure of the coolant in the coolant flow path satisfies the firing condition.

29. The nuclear reactor of claim 28, wherein the pair of cooperating apertures includes a first aperture defined at least partially by the first piston and a second aperture defined at least partially by the plug, the first aperture and the second aperture defining at least a portion of a converging opening and at least a portion of a diverging opening.

30. The nuclear reactor of claim 29, wherein the converging opening extends between an inlet end and an inlet throat, wherein the diverging opening extends between an outlet throat and an outlet end, and wherein the inlet throat of the converging opening has an inlet throat cross-sectional area that is equalized with an outlet throat cross-sectional area of the outlet throat of the diverging opening.

31. The nuclear reactor of claim 29, wherein the first piston includes a first body that defines the first aperture and the plug includes a second body that defines the second aperture such that the pair of cooperating apertures is spaced from peripheries of the plug and the first piston.

32. The nuclear reactor of claim 28, wherein the firing assembly includes a cup and a second piston, wherein the cup has a sidewall that defines an interior space, and wherein the second piston is disposed within the interior space of the cup.

33. The nuclear reactor of claim 32, wherein the member has a first end and an opposing second end, wherein the neutron modifying material is coupled to the first end of the member, and wherein the second piston is coupled to the opposing second end of the member, wherein the second piston includes a piston body that separates the interior space of the cup into a first region and a second region, and wherein the cup has an open end such that the first region is exposed to the coolant flow path.

34. The nuclear reactor of claim 33, wherein the coolant is configured to store the stored energy that inserts the neutron modifying material into the nuclear fuel of the fuel assembly when the pressure of the coolant in the coolant flow path satisfies the firing condition.

35. The nuclear reactor of claim 34, wherein the second piston is slidably coupled to the sidewall of the cup, wherein the second piston defines an orifice that places the first region in fluid communication with the second region, and wherein the orifice is configured to restrict a flow of the coolant therethrough such that release of stored energy applied by the coolant overcomes a suction force associated with the pressure variations within the converging-diverging passage when the pressure of the coolant in the coolant flow path satisfies the firing condition.

36. The nuclear reactor of claim 27, wherein the control assembly further comprises a hysteresis device positioned to apply a driving force.

37. The nuclear reactor of claim 36, wherein the hysteresis device is configured to receive a hysteresis control signal, wherein the hysteresis device initiates the driving force in response to receiving the hysteresis control signal.

38. The nuclear reactor of claim 36, wherein the hysteresis device is a spring mechanism.

39. The nuclear reactor of claim 27, wherein the control assembly further comprises an expansion device, the expansion device having a contracted state and an expanded state, wherein the expansion device is positioned to provide a resisting force in the expanded state.

40. The nuclear reactor of claim 39, wherein the expansion device further comprises an engaging member, wherein the engaging member maintains the expansion device in the expanded state.

41. The nuclear reactor of claim 40, wherein the expansion device is configured to receive an engagement control signal, wherein the engaging member maintains the expansion device in the expanded state in response to receiving the engagement control signal.

42. The nuclear reactor of claim 40, wherein the expansion device is configured to receive a disengagement control signal, wherein the engaging member disengages and allows the expansion device to return to the contracted state in response to the disengagement control signal.

43. The nuclear reactor of claim 39, wherein the expansion device comprises a thermal expansive material.

44. The nuclear reactor of claim 39, wherein the expansion device further comprises a bellows.

45. The nuclear reactor of claim 27, further comprising a locking mechanism, wherein the locking mechanism has a locked state and an unlocked state, wherein the locking mechanism in the locked state engages the control assembly.

46. The nuclear reactor of claim 45, wherein the locking mechanism in the locked state engaging the control assembly inhibits movement of the firing assembly relative to the control assembly duct.

47. The nuclear reactor of claim 45, wherein the locking mechanism is configured to receive a locking control signal, wherein the locking mechanism enters and maintains the locked state in response to receiving the locking control signal.

48. The nuclear reactor of claim 45, the locking mechanism is configured to receive an unlocking control signal, wherein the locking mechanism enters and maintains the unlocked state in response to the unlocking control signal.

49. The nuclear reactor of claim 45, wherein the locking mechanism comprises a ferromagnetic material.

50. The nuclear reactor of claim 27, wherein the control assembly further comprises a flow restricting device, wherein the firing assembly releases stored energy in response to movement of the flow restricting device.

51. The nuclear reactor of claim 50, wherein the flow restricting device moves in response to a change in temperature.

52. A method of manufacturing a control assembly for a nuclear reactor, the method comprising:

defining a coolant flow path within an inner volume of a duct;

fixing a plug to the duct;

disposing a loading assembly within the duct;

slidably coupling a first piston to the duct, wherein the plug and the first piston define a pair of cooperating apertures that forms at least a portion of a converging-diverging passage;

coupling a neutron modifying material to the first piston with a member;

positioning the converging-diverging passage along the coolant flow path such that pressure variations within the converging-diverging passage secure the first piston, the member, and the neutron modifying material during normal operation of the nuclear reactor; and positioning a biasing member to apply a biasing force to the member and the first piston, the biasing force releasing the first piston, the member, and the neutron modifying material when the pressure of the coolant in the duct satisfies a firing condition.

53. The method of claim 52, further comprising associating a first aperture of the pair of cooperating apertures with the first piston and a second aperture of the pair of cooperating apertures with the plug, the first aperture and the second aperture defining at least a portion of a converging opening and at least a portion of a diverging opening.

* * * * *